(12) United States Patent
Saotome et al.

(10) Patent No.: US 11,901,847 B2
(45) Date of Patent: Feb. 13, 2024

(54) MOTOR CONTROL DEVICE AND MOTOR CONTROL METHOD

(71) Applicant: Hitachi Astemo, Ltd., Hitachinaka (JP)

(72) Inventors: Hiroto Saotome, Hitachinaka (JP); Masaki Hano, Hitachinaka (JP)

(73) Assignee: Hitachi Astemo, Ltd., Hitachinaka (JP)

( * ) Notice: Subject to any disclaimer, the term of this patent is extended or adjusted under 35 U.S.C. 154(b) by 197 days.

(21) Appl. No.: 17/437,531

(22) PCT Filed: Mar. 11, 2020

(86) PCT No.: PCT/JP2020/010502
§ 371 (c)(1),
(2) Date: Sep. 9, 2021

(87) PCT Pub. No.: WO2020/189438
PCT Pub. Date: Sep. 24, 2020

(65) Prior Publication Data
US 2022/0149767 A1    May 12, 2022

(30) Foreign Application Priority Data

Mar. 20, 2019    (JP) ................. 2019-053784

(51) Int. Cl.
*H02P 27/04*    (2016.01)
*H02P 27/08*    (2006.01)
*H02P 21/22*    (2016.01)

(52) U.S. Cl.
CPC .............. *H02P 27/08* (2013.01); *H02P 21/22* (2016.02)

(58) Field of Classification Search
CPC ................. H02P 21/22; H02P 27/08
(Continued)

(56) References Cited

U.S. PATENT DOCUMENTS

2003/0090231 A1*   5/2003   Yoshimoto ............. H02P 21/22
                                                  318/635
2004/0232865 A1    11/2004   Suzuki
(Continued)

FOREIGN PATENT DOCUMENTS

JP    2002-112598 A    4/2002
JP    2002-276446 A    9/2002
(Continued)

OTHER PUBLICATIONS

International Preliminary Report on Patentability (PCT/IB/326, PCT/IB/338, & PCT/IB/373) issued in PCT Application No. PCT/JP2020/010502 dated Sep. 30, 2021, including English translation of document C2 (Japanese-language Written Opinion (PCT/ISA/237) filed on Sep. 9, 2021) (seven (7) pages).
(Continued)

*Primary Examiner* — Erick D Glass
(74) *Attorney, Agent, or Firm* — Crowell & Moring LLP

(57) ABSTRACT

A controller in a motor control device includes an integral operation unit 606A (608A) that performs an arithmetic operation for a d(q)-axis integrated value $I_d^{}$ ($I_q^{}$) through integral control performed on a d(q)-axis current deviation $\Delta I_d$ ($\Delta I_q$) and is configured to perform an arithmetic operation for a d(q)-axis voltage command value for controlling an output voltage of an inverter of a three-phase brushless motor. The controller further includes a limit value arithmetic operation unit 606C (608C) that performs an arithmetic operation for d(q)-axis integration upper and lower limit values $I_{dmax}$ ($I_{qmax}$) and $I_{dmin}$ ($I_{qmin}$) on the basis of a power source voltage of the inverter and the like and an integration limiting unit 606D (608E) that limits $I_d^{}$ ($I_q^{}$) within a predetermined range defined by the d(q)-axis integration upper and lower limit values.

12 Claims, 27 Drawing Sheets

(58) Field of Classification Search
USPC .......................................................... 318/901
See application file for complete search history.

(56) References Cited

U.S. PATENT DOCUMENTS

| | | | |
|---|---|---|---|
| 2005/0046369 A1 | 3/2005 | Kobayashi et al. | |
| 2005/0075766 A1 | 4/2005 | Kobayashi et al. | |
| 2011/0175558 A1* | 7/2011 | Kitanaka | H02P 21/22 318/400.3 |
| 2014/0125261 A1* | 5/2014 | Yamazaki | H02P 21/0089 318/400.02 |
| 2015/0123581 A1* | 5/2015 | Omata | H02P 29/032 318/400.17 |
| 2019/0131887 A1* | 5/2019 | Mori | H02M 1/08 |
| 2020/0021217 A1* | 1/2020 | Hano | H02M 1/0009 |

FOREIGN PATENT DOCUMENTS

| | | |
|---|---|---|
| JP | 2004-215320 A | 7/2004 |
| JP | 2004-229487 A | 8/2004 |
| JP | 2005-73307 A | 3/2005 |
| JP | 2008-173006 A | 7/2008 |
| JP | 2014-93889 A | 5/2014 |

OTHER PUBLICATIONS

Extended European Search Report issued in European Application No. 20773794.1 dated Nov. 3, 2022 (eight (8) pages).
International Search Report (PCT/ISA/210) issued in PCT Application No. PCT/JP2020/010502 dated Jun. 9, 2020 with English translation (four (4) pages).
Japanese-language Written Opinion (PCT/ISA/237) issued in PCT Application No. PCT/JP2020/010502 dated Jun. 9, 2020 (four (4) pages).

* cited by examiner

MOTOR CONTROL DEVICE AND MOTOR CONTROL METHOD

TECHNICAL FIELD

The present invention relates to motor control devices and to motor control methods for controlling motors.

BACKGROUND ART

Patent Document 1 describes a motor control device including: a power converter that converts DC into AC and supplies the AC to a motor; and a controller that performs an arithmetic operation for such voltage command values of d and q axes of a motor that cause current detection values of the d and q axes to approach current command values through feedback control including integral control performed on current deviations between the current detection values and the current command values and controls the power converter on the basis of the voltage command values.

REFERENCE DOCUMENT LIST

Patent Document

Patent Document 1: JP 2008-173006 A

SUMMARY OF THE INVENTION

Problem to be Solved by the Invention

Here, a voltage saturation state in which an output voltage of a power converter is saturated with a power source voltage (DC voltage) of the power converter can typically occur in motor control. In the voltage saturation state, motor drive is controlled in accordance with a voltage value that is different from a voltage command value obtained through an arithmetic operation. Therefore, a so-called wind-up phenomenon in which a current deviation between a current detection value and a current command value does not become zero occurs. If integral control is continuously executed during occurrence of such a wind-up phenomenon, such an integrated value that excessively increases or decreases to cause the current deviation to become zero is obtained through the arithmetic operation. In a case in which the current command value is changed thereafter, for example, it takes time to cause such an excessively changed integrated value to decrease or increase so that the current deviation becomes zero, even though the wind-up phenomenon ends. Therefore, there is a concern that stability of current control may deteriorate; for example, convergence of the current detection value to the current command value may deteriorate in a transient state such as a case in which the current command value is changed after occurrence of the wind-up phenomenon.

Thus, an object of the present invention is to provide a motor control device and a motor control method capable of improving stability of current control.

Means for Solving the Problem

A motor control device includes: a power converter that converts DC into AC and supplies the AC to a three-phase brushless motor; and a controller that performs an arithmetic operation for voltage command values of d and q axes of the three-phase brushless motor through feedback control including integral control performed on current deviations between current detection values and current command values of the d and q axes and controls the power converter on the basis of the voltage command values, the controller limiting an integrated value in the integral control within a predetermined range.

Also, a motor control method includes, by a controller that performs an arithmetic operation for voltage command values of d and q axes of a three-phase brushless motor through feedback control including integral control performed on current deviations between current detection values and current command values of the d and q axes and controls, on the basis of the voltage command values, a power converter that converts DC into AC and supplies the AC to the three-phase brushless motor; limiting an integrated value in the integral control within a predetermined range when the arithmetic operation for the voltage command values is performed.

Effects of the Invention

According to the motor control device and the motor control method, it is possible to improve stability of current control.

MODE FOR CARRYING OUT THE INVENTION

Hereinafter, embodiments for carrying out the present invention will be described with reference to the accompanying drawings.

Figure 1:
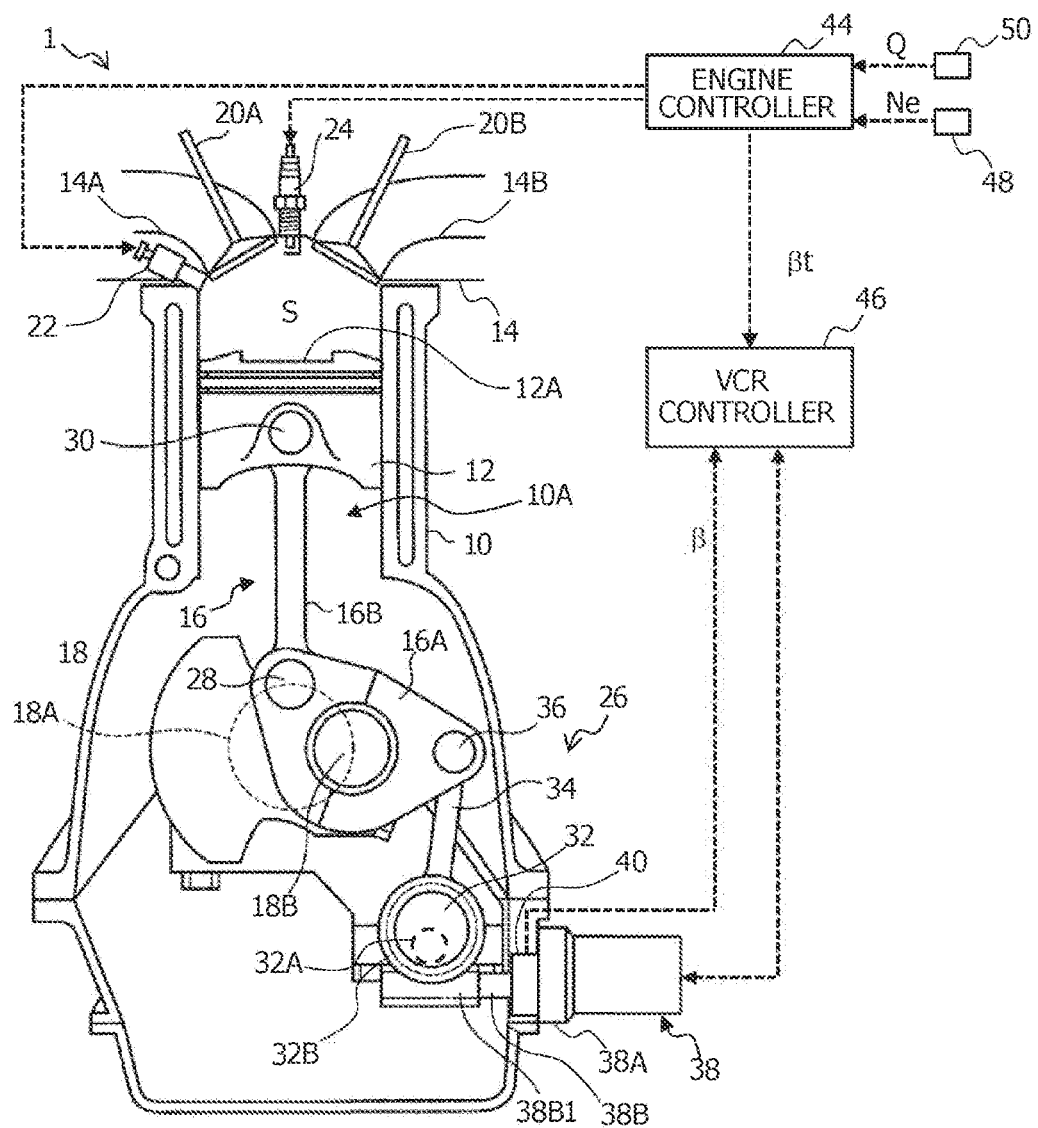
FIG. 1 is a configuration diagram illustrating an example of an internal combustion engine for a vehicle to which a motor control device is applied.

FIG. 1 is a configuration diagram illustrating an example of an internal combustion engine for a vehicle (engine) to which a motor control device is applied.

An engine 1 includes a cylinder block 10, a piston 12 that is inserted into a cylinder bore 10A of cylinder block 10 such that piston 12 can reciprocate therein, and a cylinder head 14 that is attached to an upper portion of cylinder block 10. A combustion chamber S is formed between a crown surface 12A of piston 12 and a lower surface of cylinder head 14.

Piston 12 is coupled to a crankshaft 18 via a connecting rod (conn-rod) 16. Cylinder head 14 is provided with an intake port 14A and an exhaust port 14B, each of which is open toward combustion chamber S. Also, an intake valve 20A that opens and closes an opening of intake port 14A and an exhaust valve 20B that opens and closes an opening of exhaust port 14B are attached to cylinder head 14. Moreover, a fuel injection device 22 that injects a fuel into combustion chamber S and an ignition device 24 that ignites mixture gas of the fuel and air are attached to cylinder head 14.

Also, engine 1 includes a variable compression ratio (VCR) mechanism 26 having a compression ratio that can be varied by a double-link mechanism as disclosed in JP 2002-276446 A, for example, changing the volume of combustion chamber S.

The double-link mechanism of VCR mechanism 26 is configured as follows, for example.

Conn-rod 16 has a lower link 16A and an upper link 16B. Lower link 16A is formed from two substantially triangular members. A coupling hole for coupling to crankshaft 18 is formed at substantially the center of lower link 16A. Upper link 16B is coupled, on its lower end side, to one end of lower link 16A with a first coupling pin 28 such that upper link 16B can turn and is coupled, on its upper end side, to piston 12 with a piston pin 30 such that upper link 16B can turn. Crankshaft 18 has a plurality of journal portions 18A and a plurality of crankpin portions 18B. Each journal portion 18A is rotatably supported by a main bearing (not illustrated) of cylinder block 10. Each crankpin portion 18B is inserted into the coupling hole of lower link 16A. In this manner, lower link 16A is rotatably coupled to crankpin portion 18B. Also, crankpin portion 18B is decentered from journal portions 18A by a predetermined amount. A control shaft 32 is rotatably supported by a lower portion of cylinder block 10. Control shaft 32 has an eccentric cam portion 32A that is decentered from its rotation center. Control shaft 32 and the other end of lower link 16A are coupled to each other via a control link 34. An upper end of control link 34 is coupled to the other end of lower link 16A with a second coupling pin 36 such that the upper end of control link 34 can turn. A lower end of control link 34 is coupled to the lower portion of cylinder block 10 via control shaft 32 such that the lower end of control link 34 can turn. More specifically, control link 34 is rotatably fitted, on its lower end side, to eccentric cam portion 32A.

In VCR mechanism 26 using such a double-link mechanism, a turning position of control shaft 32 is controlled by an electric actuator 38. Electric actuator 38 includes a motor, which will be described later in detail, a decelerator 38A, and an output shaft 38B. A gear (a worm gear, for example) 38B1 is formed at output shaft 38B. A gear (a worm wheel, for example) 32B that is engaged with gear 38B1 of output shaft 38B is formed at control shaft 32. A rotational output of the motor is decelerated by decelerator 38A first and is then transmitted to output shaft 38B. After the rotational output is transmitted to output shaft 38B, the rotational output is transmitted to control shaft 32 through the engagement between gear 38B1 of output shaft 38B and gear 32B of control shaft 32. A rotational angle (actual angle) of output shaft 38B is detected by, for example, a rotational angle sensor 40 such as a resolver with a rotor attached to output shaft 38B. Rotational angle sensor 40 outputs an actual angle signal corresponding to actual angle $\beta$.

In addition, when control shaft 32 is turned by output shaft 38B of electric actuator 38 being caused to rotate forward or backward, then the center position of eccentric cam portion 32A changes in VCR mechanism 26. In other words, the relative position of eccentric cam portion 32A with respect to cylinder block 10 changes. When the swinging support position of the lower end of control link 34 thus changes, the position of piston 12 at a piston top dead center (TDC) becomes high or low, and the volume of combustion chamber S increases or decreases. Therefore, a compression ratio of engine 1 is changed to a low compression ratio or a high compression ratio. In other words, the compression ratio of engine 1 changes in accordance with rotational angle $\beta$ of output shaft 38B.

Figure 2:
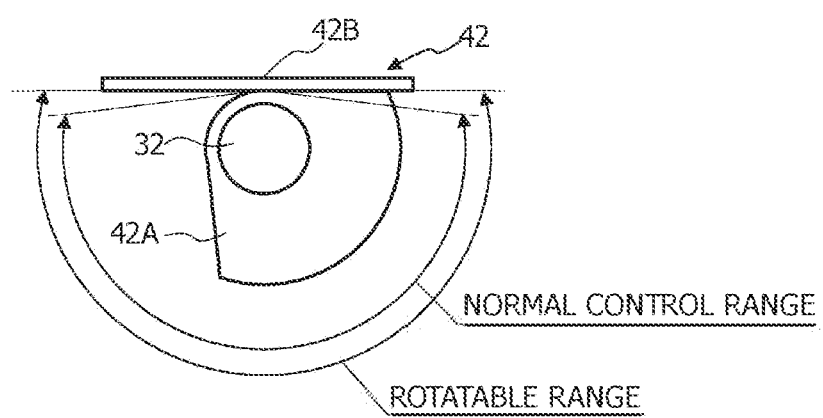
FIG. 2 is a partially enlarged view illustrating an example of a stopper mechanism for a VCR mechanism in the internal combustion engine for a vehicle.

A stopper mechanism 42 that restricts turning over a normal control range when control shaft 32 is about to turn over the normal control range is attached to VCR mechanism 26 as illustrated in FIG. 2. Stopper mechanism 42 has a first member 42a with substantially a fan shape including a rivet portion of the fan being secured to control shaft 32 and a second member 42B with a plate shape secured to cylinder block 10.

First member 42A rotates integrally with control shaft 32. Second member 42B abuts on one of two sides that define a center angle of first member 42A when control shaft 32 turns over a maximum compression ratio (or a minimum compression ratio) that is the normal control range. In this manner, displacement of control shaft 32 is restricted. Here, stopper mechanism 42 functions when control shaft 32 is about to exceed the normal control range. Therefore, since first member 42A does not abut second member 42B under normal control, it is possible to curb generation of abnormal noise, for example.

Combustion control of engine 1 is performed by an engine controller 44 incorporating a microcomputer performing electronic control regarding the amount of injection and the timing of the injection of fuel injection device 22, the ignition timing of ignition device 24, and the like. A VCR controller 46 that performs electronic control on VCR mechanism 26 is connected to engine controller 44 via a controller area network (CAN), which is an example of an in-vehicle network, for example. Therefore, engine controller 44 and VCR controller 46 can transmit and receive any data via the CAN. Note that the in-vehicle network is not limited to the CAN, and it is possible to use a known network such as FlexRay (registered trademark).

An output signal from each of a rotational speed sensor 48 and a load sensor 50 is input to engine controller 44 via input and output ports or input and output circuits, which are not illustrated, for example. Rotational speed sensor 48 detects a rotational speed Ne of engine 1. Load sensor 50 detects a load Q of engine 1. Here, it is possible to use the amount of a state closely related to a torque, such as an intake negative pressure, an intake flow rate, a boost pressure, an accelerator position, or a throttle position, for example, as the load Q of engine 1.

Engine controller 44 obtains a target compression ratio in accordance with the rotational speed Ne and load Q with reference to a map in which a target value adapted to the rotational speed and the load is set, for example. Also, engine controller 44 performs an arithmetic operation for a rotational angle (target angle) $\beta t$ of output shaft 38B in accordance with the obtained target compression ratio. Then, engine controller 44 outputs a target angle signal corresponding to target angle $\beta t$ to VCR controller 46 via the CAN.

VCR controller 46 controls motor drive in electric actuator 38 on the basis of the target angle signal output from engine controller 44 and the actual angle signal output from rotational angle sensor 40. Therefore, it is possible to exemplify VCR controller 46 as an example of the motor control device. Forward and backward rotation drive of output shaft 38B is controlled through the control of the motor drive, and the compression ratio of engine 1 is thus changed.

Figure 3:
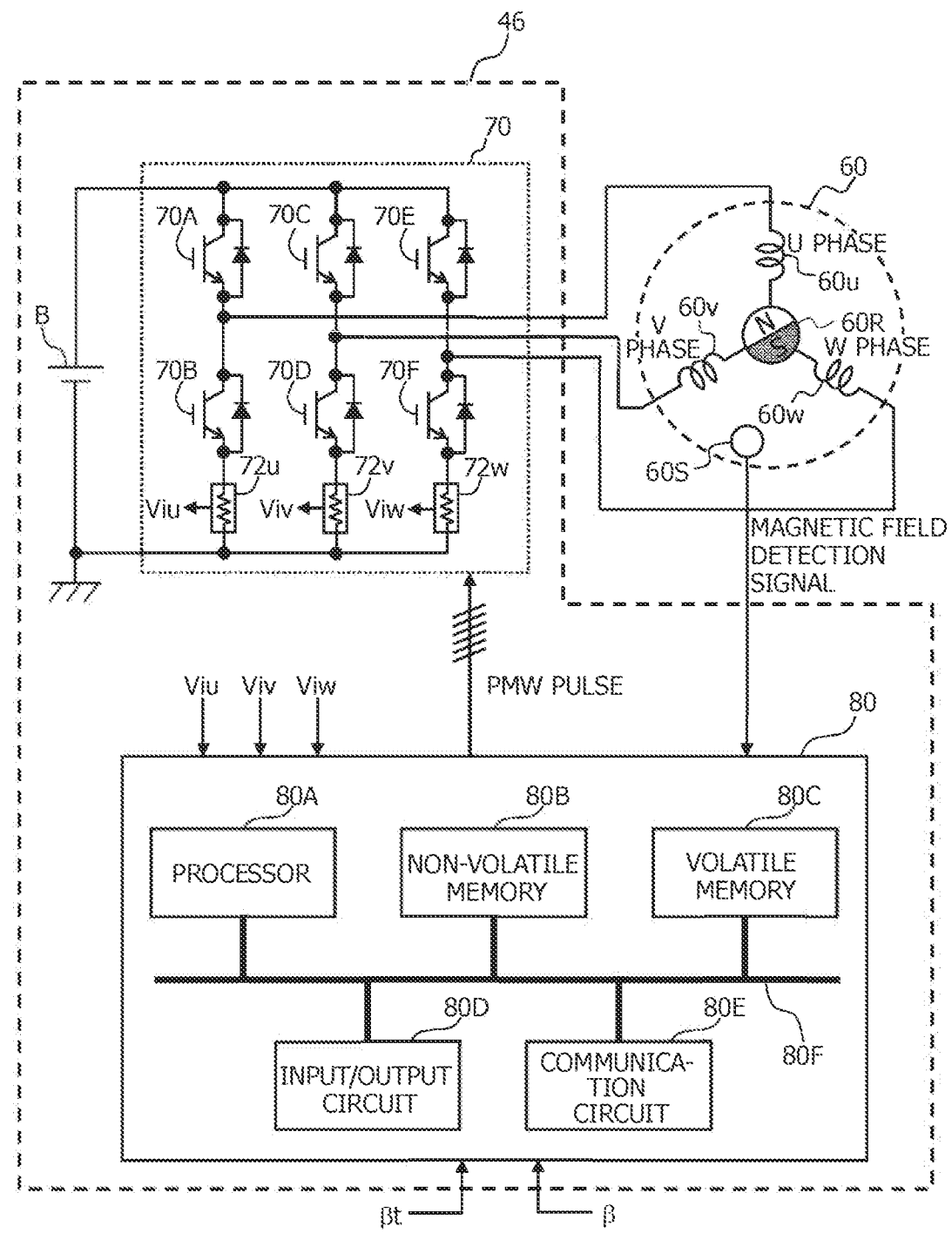
FIG. 3 is a configuration diagram illustrating an example of a motor and a motor control device in the VCR mechanism.

FIG. 3 is a configuration diagram illustrating internal configurations of the motor of electric actuator 38 and VCR controller 46. It is possible to exemplify a three-phase brushless motor 60 or the like as an example of the motor in electric actuator 38. Three-phase brushless motor 60 (hereinafter, simply referred to as a "motor 60") includes a stator (not illustrated) with substantially a cylindrical shape around which a three-phase coil including a U-phase coil 60u, a V-phase coil 60v, and a W-phase coil 60w in star connection is wound and a rotor (permanent magnet rotor) 60R disposed to be rotatable about an axial line of the stator in a space formed at the central portion of the stator.

Motor 60 incorporates, for example, a rotor angle sensor 60S such as a Hall element or an encoder that detects a change in magnetic field that accompanies rotation of rotor 60R and outputs a magnetic field detection signal in accordance with a rotational angle $\theta$ of rotor 60R. However, rotor angle sensor 60S is not limited thereto and may be, for example, a resolver that detects a signal in accordance with the rotational angle $\theta$ of rotor 60R.

VCR controller 46 has an inverter 70 and a controller 80. Inverter 70 is a power converter that drives motor 60 by converting a DC (voltage) of an in-vehicle battery B into an AC (voltage) and supplying the AC power to (the three-phase coil of) motor 60.

Inverter 70 has a U-phase arm in which switching elements 70A and 70B are connected in series, a V-phase arm in which switching elements 70C and 70D are connected in series, and a W-phase arm in which switching elements 70E and 70F are connected in series. These U, V, and W-phase arms are connected to each other in parallel between a bus on a positive side of in-vehicle battery B and a bus on a negative side of in-vehicle battery B. A three-phase bridge circuit is configured by the two switching elements in each of the U, V, and W-phase arms being connected to the coil of the corresponding phase of motor 60.

FIG. 3 illustrates switching elements 70A to 70F as an IGBT in which diodes are connected in antiparallel. However, switching elements 70A to 70F are not limited thereto and may be another semiconductor device for power control such as an FET in which diodes are connected in antiparallel. Control terminals (gate terminals, for example) of switching elements 70A to 70F are connected to an output port of controller 80.

The U, V, and W-phase arms are provided with current detection means (a U-phase current detection unit 72u, a V-phase current detection unit 72v, and a W-phase current detection unit 72w) for detecting currents Iu, Iv, and Iw of the phases using shunt resistances, for example. These current detection means 72u, 72v, and 72w detect potential differences between both ends of the shunt resistances using operational amplifiers, for example. Then, current detection means 72u, 72v, and 72w outputs potential difference signals corresponding to potential differences Viu, Viv, and Viw between both ends at the shunt resistances to controller 80.

Controller 80 includes a microcomputer including a processor 80A, a non-volatile memory 80B, a volatile memory 80C, an input/output circuit 80D, a communication circuit 80E, and a bus 80F connecting these components to each other.

Processor 80A is hardware that executes various control programs through execution of command sets described in software programs and is formed from, for example, a central processing unit (CPU). Non-volatile memory 80B is a semiconductor memory storing the control programs and the like and capable of storing various kinds of data, and examples thereof include an electrical erasable programmable read only memory (EEPROM) and a flash read only memory (ROM). Volatile memory 80C is a semiconductor memory that serves as a temporary storage region, and examples thereof include a dynamic random access memory (DRAM) and a static random access memory (SRAM).

Input/output circuit 80D is a device that reads analog signals or digital signals from various sensors and outputs analog or digital drive signals to an actuator and the like, and examples thereof include an A/D converter and a D/D converter. Communication circuit 80E is a device for communicating with other controllers, in-vehicle devices (not illustrated), and the like via networks such as CAN, and examples thereof include a CAN transceiver.

Processor 80A of controller 80 generates predetermined control signals on the basis of the potential difference signal output from the current detection means and the magnetic field detection signal output from rotor angle sensor 60S in addition to the target angle signal output from engine controller 44 and the actual angle signal output from rotational angle sensor 40. The control signals are signals output to control terminals of switching elements 70A to 70F to control ON/OFF states of switching elements 70A to 70F. In this manner, output shaft 38B of electric actuator 38 rotates, and the top dead center position of piston 12 is changed. Thus, the compression ratio of engine 1 is changed in a direction in which the compression ratio decreases or in a direction in which the compression ratio increases.

Figure 4:
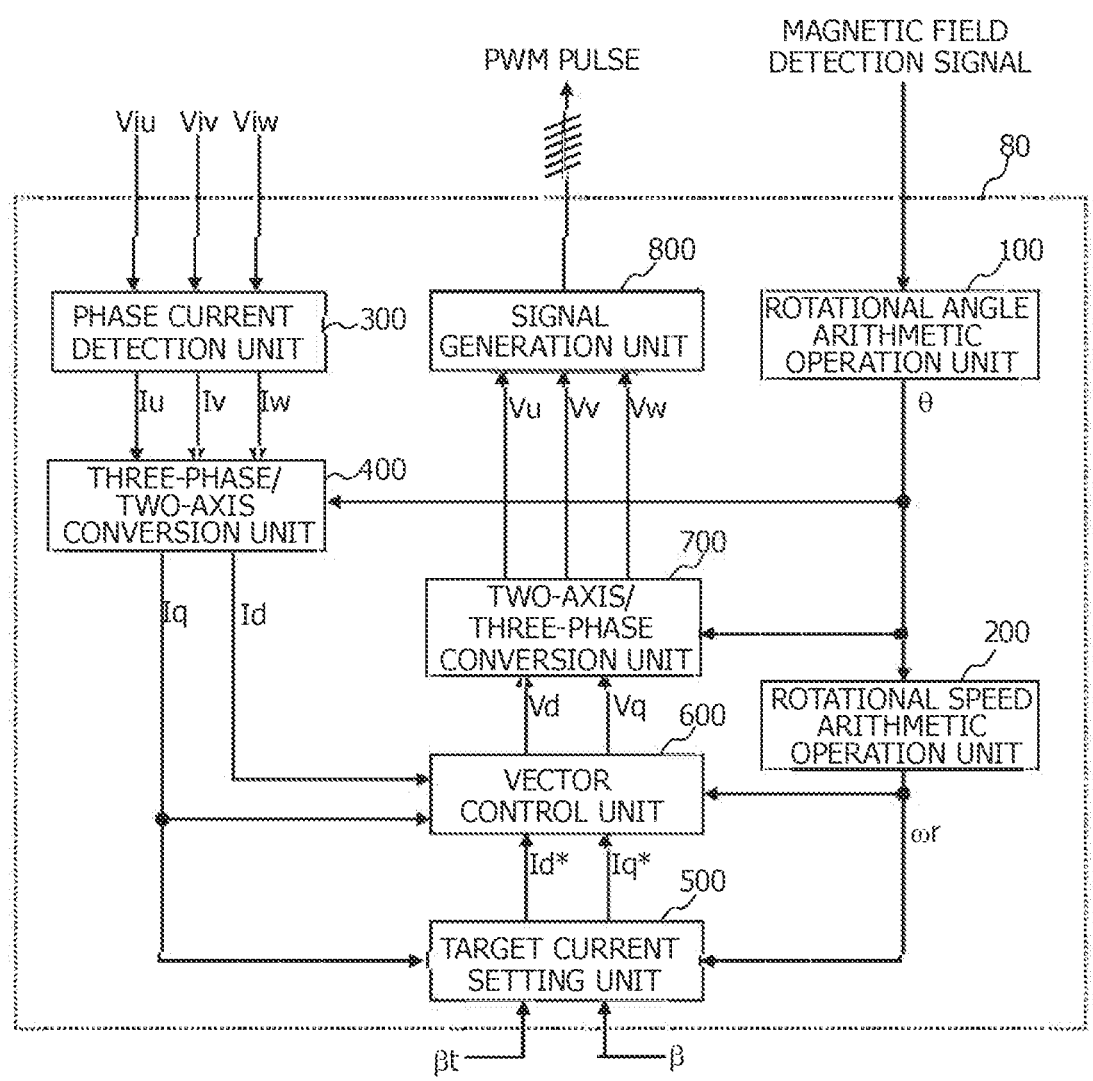
FIG. 4 is a configuration diagram illustrating an example of an internal configuration of a controller in the motor control device.

Controller 80 has, as functional blocks, a rotational angle arithmetic operation unit 100, a rotational speed arithmetic operation unit 200, a phase current detection unit 300, a three-phase/two-axis conversion unit 400, a target current setting unit 500, a vector control unit 600, a two-axis/three-phase conversion unit 700, and a signal generation unit 800 as illustrated in FIG. 4.

Rotational angle arithmetic operation unit 100 performs an arithmetic operation for rotational angle θ of rotor 60R on the basis of the magnetic field detection signal output from rotor angle sensor 60S.

Rotational speed arithmetic operation unit 200 performs detection through an arithmetic operation for an angular speed (actual rotational speed) $\omega_r$ of motor 60 from a temporal change in rotational angle θ obtained by rotational angle arithmetic operation unit 100 through the arithmetic operation. Note that it is assumed that motor 60 rotates in a direction in which the compression ratio increases in a case in which $\omega_r$ is a negative value while motor 60 rotates in a direction in which the compression ratio decreases in a case in which $\omega_r$ is a positive value.

Phase current detection unit 300 performs analog-to-digital (A/D) conversion on each of the potential difference signals output from U, V, and W-phase current detection units 72u, 72v, and 72W and detects phase currents Iu, Iv, and Iw of the phases on the basis of the values after the conversion.

Three-phase/two-axis conversion unit 400 converts phase current detection values Iu, Iv, and Iw into a d-axis current detection value $I_d$ and a q-axis current detection value $I_q$ in dq rotating coordinates using the rotational angle θ. The dq rotating coordinates are rotating coordinates in which a field direction rotating in synchronization with rotor 60R (permanent magnet rotor) of motor 60 is defined as a d axis and a torque generation direction that perpendicularly intersects the d axis is defined as a q axis.

Target current setting unit 500 sets a first d-axis current command value $I_d^*$ and a first q-axis current command value $I_q^*$ that are target current values on the basis of the target angle signal (target angle βt) output from engine controller 44, the actual angle signal (actual angle β) output from rotational angle sensor 40, an angular speed detection value $\omega_r$ detected by rotational speed arithmetic operation unit 200, and the q-axis current detection value $I_q$ obtained by three-phase/two-axis conversion unit 400.

More specifically, target current setting unit 500 performs an arithmetic operation for an angular deviation between target angle βt and actual angle β first. Then, target current setting unit 500 executes feedback control processing such as proportional integral control (PI control) based on the angular deviation obtained through the arithmetic operation, for example. In this manner, a command torque for controlling drive of motor 60 such that an actual angle β approaches the target angle βt is obtained through an arithmetic operation, and the first q-axis current command value $I_q^*$ in accordance with the command torque is obtained through an arithmetic operation. Note that the fact that the angular deviation is a negative value means that it is necessary to drive motor 60 in the direction in which the compression ratio increases to cause β to approach βt. Also, the fact that the angular deviation is a positive value means that it is necessary to drive motor 60 in the direction in which the compression ratio decreases to cause β to approach βt.

On the other hand, target current setting unit 500 sets the first d-axis current command value $I_d^*$ to a negative value (−20 A, for example) or 0 A. $I_d^*$ is set to the negative value when the top dead center position of piston 12 is changed to the direction in which the compression ratio decreases using VCR mechanism 26. In other words, $I_d^*$ is set to a negative value when a torque is applied in the same direction as the rotation direction of motor 60 by a combustion pressure of engine 1. $I_d^*$ is set to the negative value, and so-called flux weakening control in which such currents that intentionally weaken a field flux of motor 60 are caused to flow through three-phase coils 60u, 60v, and 60w is thus executed. In this manner, the rotational speed of motor 60 is more likely to increase as compared with a case in which the top dead center position of piston 12 is changed to the direction in which the compression ratio increases. It is thus possible to improve responsiveness of VCR mechanism 26 through execution of the flux weakening control.

The first d-axis current command value $I_d^*$ is set to 0 A when the top dead center position of piston 12 is changed to the direction in which the compression ratio increases, that is, when a torque is applied in the opposite direction of the rotation direction of motor 60 by a combustion pressure of engine 1. When the flux weakening control is executed at this time, a torque generated by motor 60 is reduced due to a decrease in field flux in addition to the aforementioned torque in the opposite direction of the rotation direction of motor 60. Therefore, there is a concern that responsiveness of VCR mechanism 26 may deteriorate. Thus, when the top dead center position of piston 12 is changed to the direction in which the compression ratio increases, $I_d^*$ is set to 0 A, and the flux weakening control is not executed. In this manner, the deterioration of the responsiveness of VCR mechanism 26 when the top dead center position of piston 12 is changed to the direction in which the compression ratio increases is curbed. In this manner, target current setting unit 500 performs an arithmetic operation for the current command values (first d and q-axis current command values $I_d^*$ and $I_q^*$) for controlling the drive of motor 60.

Vector control unit 600 executes vector control to perform an arithmetic operation for d and q-axis voltage command values $V_d$ and $V_q$ every predetermined cycle on the basis of d and q-axis current detection values $I_d$ and $I_q$, first d and q-axis current command values $I_d^*$ and $I_q^*$, and the angular speed detection value $\omega_r$. Details of the vector control unit 600 will be described later.

Two-axis/three-phase conversion unit 700 converts the d and q-axis voltage command values $V_d$ and $V_q$ obtained by vector control unit 600 through the arithmetic operation into three-phase voltage command values, that is, a U-phase voltage command value Vu, a V-phase voltage command value Vv, and a W-phase voltage command value Vw using rotational angle θ.

Signal generation unit 800 generates signals to be output to switching elements 70A to 70F on the basis of the three-phase voltage command values Vu, Vv, and Vw and, for example, a carrier wave, which is a triangular wave carrier. More specifically, signal generation unit 800 generates pulse width modulation (PWM) pulses as the aforementioned signals by determining PWM pulse widths for driving switching elements 70A to 70F on the basis of comparison between modulation waves (sine waves, for example) generated on the basis of Vu, Vv, and Vw with the carrier wave. Then, signal generation unit 800 outputs the generated PWM pulses to switching elements 70A to 70F.

Figure 5:
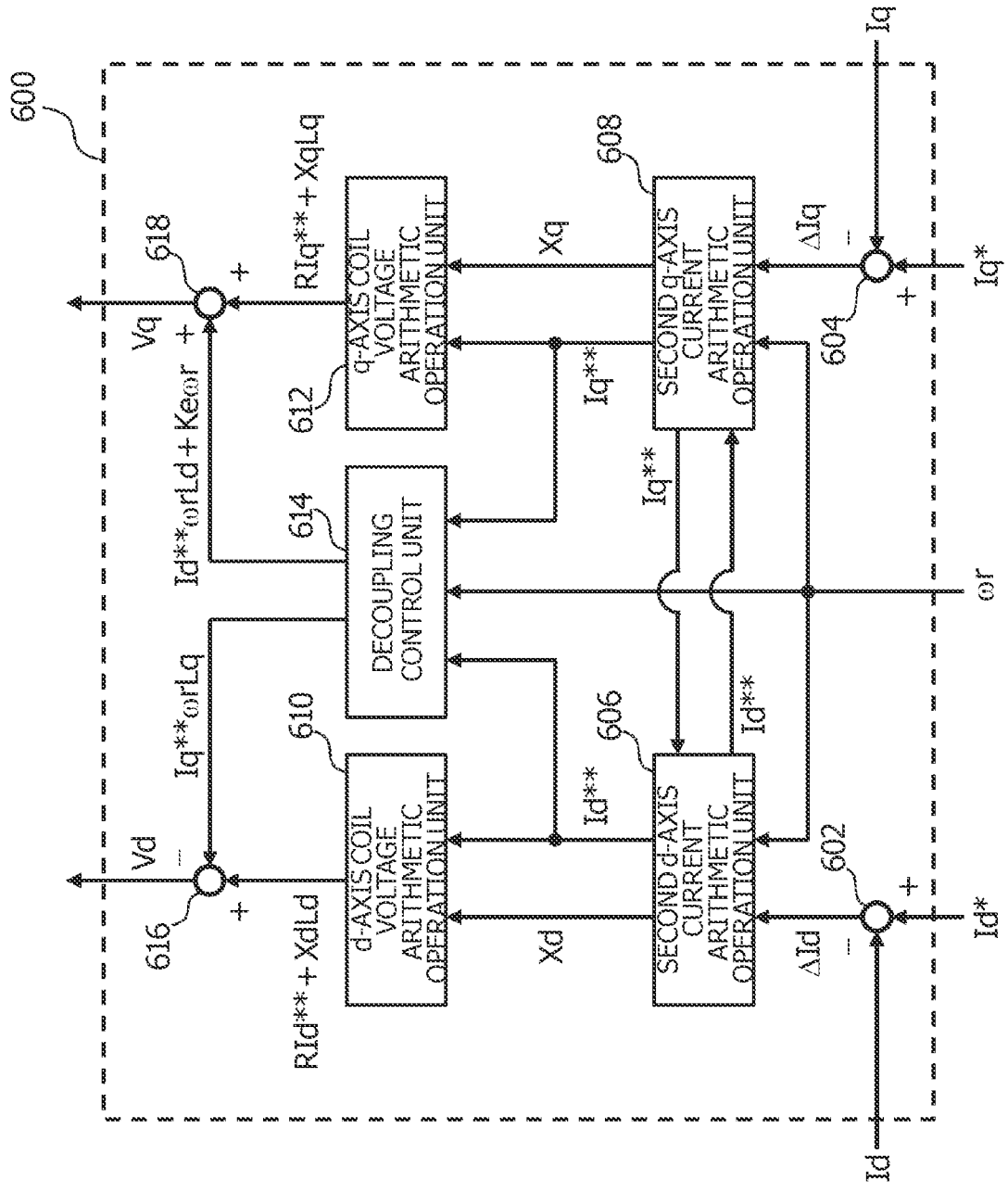
FIG. 5 is a configuration diagram illustrating an example of an internal configuration of a vector control unit in the controller.

Hereinafter, details of vector control unit 600 will be described. FIG. 5 is a configuration diagram illustrating an internal configuration of vector control unit 600.

Vector control unit 600 includes a d(q)-axis current deviation arithmetic operation unit 602 (604), a second d(q)-axis current arithmetic operation unit 606 (608), a d(q)-axis coil voltage arithmetic operation unit 610 (612), a decoupling control unit 614, and a d(q)-axis voltage arithmetic operation unit 616 (618).

The d(q)-axis current deviation arithmetic operation unit 602 (604) performs an arithmetic operation for a d(q)-axis current deviation $\Delta I_d$ ($\Delta I_q$) between a d(q)-axis current detection value $I_d$ ($I_q$) and a first d(q)-axis current command value $I_d^*$ ($I_q^*$) and outputs $\Delta I_d$ ($\Delta I_q$) to second d(q)-axis current arithmetic operation unit 606 (608).

Second d(q)-axis current arithmetic operation unit 606 (608) executes proportional integral (PI) control on the d(q)-axis current deviation $\Delta I_d$ ($\Delta I_q$), for example, to perform an arithmetic operation for the second d(q)-axis current command values. The second d(q)-axis current command values include proportional values $X_d$ ($X_q$) of the d (q) axis obtained through proportion (P) control and an integrated value $I_d^{}$ ($I_q^{}$) of the d (q) axis obtained through integral (I) control.

In the proportional control, a proportional value $X_d = \Delta I_d \omega_{cdACR}$ ($X_q = \Delta I_q \omega_{cqACR}$) of the d (q)-axis is obtained through the arithmetic operation by multiplying the d(q)-axis current deviation $\Delta I_d$ ($\Delta I_q$) by d(q)-axis control response angular frequency $\omega_{cdACR}$ ($\omega_{cqACR}$) for current control. In the integral control, the integrated value $I_d^{}$ ($I_q^{}$) is obtained through the arithmetic operation by multiplying $\Delta I_d$ ($\Delta I_q$) by the d(q)-axis control response angular frequency $\omega_{cdACR}$ ($\omega_{cqACR}$) as an integral gain and sequentially integrating the product. Here, integration can be understood as accumulating deviations at predetermined time intervals. Therefore, $I_d^{}$ ($I_q^{}$) that sets $\Delta I_d$ ($\Delta I_q$) to zero is obtained through the arithmetic operation in the integral control. In other words, $I_d^{}$ ($I_q^{}$) is for causing the d(q)-axis current detection value (d and q-axis actual current) $I_d$ ($I_q$) to approach the first d(q)-axis current command value $I_d^*$ ($I_q^*$).

Then, second d(q)-axis current arithmetic operation unit 606 (608) outputs the d(q)-axis integrated value $I_d^{}$ ($I_q^{}$) to d(q)-axis coil voltage arithmetic operation unit 610 (612) and decoupling control unit 614 and outputs the d(q)-axis proportional value $X_d$ ($X_q$) to d(q)-axis coil voltage arithmetic operation unit 610 (612). Also, second d(q)-axis current arithmetic operation unit 606 (608) outputs the d(q)-axis integrated value $I_d^{}$ ($I_q^{}$) to second q(d)-axis current arithmetic operation unit 608 (606).

The d(q)-axis coil voltage arithmetic operation unit 610 (612) multiples the d(q)-axis integrated value $I_d^{}$ ($I_q^{}$) by a resistance setting value R, which is an electric motor constant of motor 60, and thereby performs an arithmetic operation for $RI_d^{}$ ($RI_q^{}$). Also, d(q)-axis coil voltage arithmetic operation unit 610 (612) multiples the d(q)-axis proportional value $X_d$ ($X_q$) by a d(q)-axis inductance setting value $L_d$ ($L_q$), which is an electric motor constant of motor 60, and thereby performs an arithmetic operation for $X_d L_d = \Delta I_d \omega_{cdACR} L_d$ ($X_q L_q = \Delta I_q \omega_{cqACR} L_q$). Here, $X_d L_d$ ($X_q L_q$) corresponds to a value obtained by multiplying $\Delta I_d \omega_{cdACR} L_d/R$ ($\Delta I_q \omega_{cqACR} L_q/R$) by R. Therefore, the term $\omega_{cdACR} L_d/R$ ($\omega_{cqACR} L_q/R$) is equivalent to the proportional gain in the proportional control. Then, d(q)-axis coil voltage arithmetic operation unit 610 (612) outputs, to d(q)-axis voltage arithmetic operation unit 616 (618), a value $RI_d^{} + X_d L_d$ ($RI_q^{} + X_q L_q$) obtained by adding $X_d L_d$ ($X_q L_q$) to $RI_d^{}$ ($RI_q^{}$).

Decoupling control unit 614 performs an arithmetic operation for a decoupling term. When motor 60 rotates, then an inductive voltage is generated, and a mutual interference in which a d-axis current is affected by a q-axis current and a q-axis voltage is affected by a d-axis current and a field flux occurs. The decoupling term is for canceling such a mutual interference in advance.

More specifically, decoupling control unit 614 performs an arithmetic operation for a first decoupling term $I_q^{} \omega_r L_q$ by multiplying a q-axis integrated value $I_q^{}$ by the angular speed detection value $\omega_r$ and a q-axis inductance setting value $L_q$. Also, decoupling control unit 614 performs an arithmetic operation for a second decoupling term $I_d^{} \omega_r L_d + K_e \omega_r$ by adding a value, which is obtained by multiplying a d-axis integrated value $I_d^{}$ by $\omega_r$ and a d-axis inductance setting value $L_d$, to a value, which is obtained by multiplying an inductance voltage constant $K_e$ that is an electric motor constant of motor 60 by $\omega_r$. Then, decoupling control unit 614 outputs a first decoupling item $I_q^{} \omega_r L_q$ to d-axis voltage arithmetic operation unit 616 and outputs the second decoupling term $I_d^{} \omega_r L_d + K_e \omega_r$ to q-axis voltage arithmetic operation unit 618.

The d-axis voltage arithmetic operation unit 616 performs an arithmetic operation for a d-axis voltage $V_d$ (=$RI_d^{} + X_d L_d - I_q^{} \omega_r L_q$) by subtracting the first decoupling term $I_q^{} \omega_r^{} L_q$ from $RI_d^{**} + X_d L_d$.

The q-axis voltage arithmetic operation unit 618 performs an arithmetic operation for a q-axis voltage $V_q$ (=$RI_q^{} + X_q L_q + I_d^{} \omega_r L_d + K_e \omega_r$) by adding $RI_q^{} + X_q L_q$ to a second decoupling term $I_d^{} \omega_r L_d + K_e \omega_r$.

Hereinafter, d and q-axis voltages $V_d$ and $V_q$ obtained by d and q-axis voltage arithmetic operation units 616 and 618 will be referred to as the d and q-axis voltage command values $V_d$ and $V_q$. Note that when present values of the d and q-axis voltage command values are defined as $V_{d,t}$ and $V_{q,t}$, present values of the d- and q-axis current deviations are defined as $\Delta I_{d,t}$ and $\Delta I_{q,t}$, present values of the d and q-axis integrated values are defined as $I_{d,t}^{}$ and $I_{q,t}^{}$, and a present value of the angular speed detection value is defined as $\omega_{r,t}$, $V_{d,t}$ and $V_{q,t}$ are represented by (Expression 1) and (Expression 2) below, respectively.

$$V_{d,t} = RI_{d,t}^{} + \Delta I_{d,t} \omega_{cdACR} L_d - I_{q,t}^{} \omega_{r,t} L_q \quad \text{[Expression 1]}$$

$$V_{q,t} = RI_{q,t}^{} + \Delta I_{q,t} \omega_{cqACR} L_q + I_{d,t}^{} \omega_{r,t} L_d + K_e \omega_{r,t} \quad \text{[Expression 2]}$$

Then, d(q)-axis voltage arithmetic operation unit 616 (618) outputs a d(q)-axis voltage arithmetic operation value $V_d$ ($V_q$) to two-axis/three-phase conversion unit 700.

In this manner, the d and q-axis voltage command values $V_d$ and $V_q$ are output from vector control unit 600. Then, $V_d$ and $V_q$ are converted into the three-phase voltage command values Vu, Vv, and Vw by two-axis/three-phase conversion unit 700, and signal generation unit 800 thus generates PWM pulses in accordance with $V_d$ and $V_q$. Therefore, controller 80 performs an arithmetic operation for such $V_d$ and $V_q$ that cause the d and q-axis current detection values to approach the d and q-axis current command values through the feedback control including the integral control performed on the d and q-axis current deviations. Then, controller 80 controls the drive of motor 60 through control of (an output voltage of) inverter 70 on the basis of $V_d$ and $V_q$ obtained through the arithmetic operation.

Here, in aforementioned vector control unit 600, a feedback path for causing the d and q-axis current detection values to pass as the d and q-axis current deviations from the d and q-axis current command values through second d and q-axis current arithmetic operation units 606 and 608 is formed. On the other hand, a vector control unit that inputs d and q-axis current detection values as d and q-axis current deviations from d and q-axis current command values to second d and q-axis current arithmetic operation units and inputs the d and q-axis current detection values directly to a decoupling control unit is known in the related art. In other words, a feedback path that inputs the d and q-axis current detection values directly to the decoupling control unit is present in such a vector control unit in the related art. On the other hand, aforementioned vector control unit 600 enhances stability of current control when the motor rotation speed is in a high-rotation region, in particular, by omitting the feedback path for inputting the d and q-axis current detection values directly to the decoupling control unit. Vector control unit 600 from which the feedback path for inputting the d and q-axis current detection value directly to the decoupling control unit is omitted is known as a cascade-type vector control unit. Even when the microcomputer constituting a part of controller 80 is replaced with one with a long arithmetic operation cycle for cost reduction, for example, it is possible to stably perform current control in which vibrations of the d and q-axis current detection values are curbed, by employing the cascade-type vector control unit.

Incidentally, the output voltage of inverter 70 is limited to a DC voltage of in-vehicle battery B (hereinafter, simply referred to as a "power source voltage Ed") or less. In the PWM control in a case in which signal generation unit 800 uses a sine wave as a modulation wave, that is, in sine wave PWM control, the maximum value that absolute values of the three-phase voltage command values can take is ½ times DC voltage Ed (Ed/2). Therefore, when such three-phase voltage command values Vu, Vv, and Vw that exceed Ed/2 are obtained by two-axis/three-phase conversion unit 700, the output voltage of inverter 70 is limited to power source voltage Ed in the sine wave PWM control. This corresponds to the fact that a d(q)-axis voltage command value $V_d$ ($V_q$) that exceeds +Ed/2 or that is less than −Ed/2 has been obtained by vector control unit 600 through the arithmetic operation. In other words, a voltage saturation state in which the output voltage of inverter 70 is saturated occurs when the absolute value of $V_d$ ($V_q$) obtained by vector control unit 600 through the arithmetic operation exceeds Ed/2 in the sine wave PWM control. Therefore, a d-axis voltage or a q-axis voltage that is substantially equal to +Ed/2 or −Ed/2 is applied to motor 60 during the occurrence of the voltage saturation state.

Hereinafter, aforementioned Ed/2 will be referred to as d and q-axis voltage limit values $V_{dlmt}$ and $V_{qlmt}$ in the case in which controller 80 executes the sine wave PWM control. In other words, +Ed/2 will be referred to as d and q-axis voltage upper limit values $V_{dmax}$ and $V_{qmax}$, and −Ed/2 will be referred to as d and q-axis voltage lower limit values $V_{dmin}$ and $V_{qmin}$. Also, the d and q-axis voltages to be applied to motor 60 will be referred to as d and q-axis applied voltages $V_d^*$ and $V_q^*$.

Figure 6:
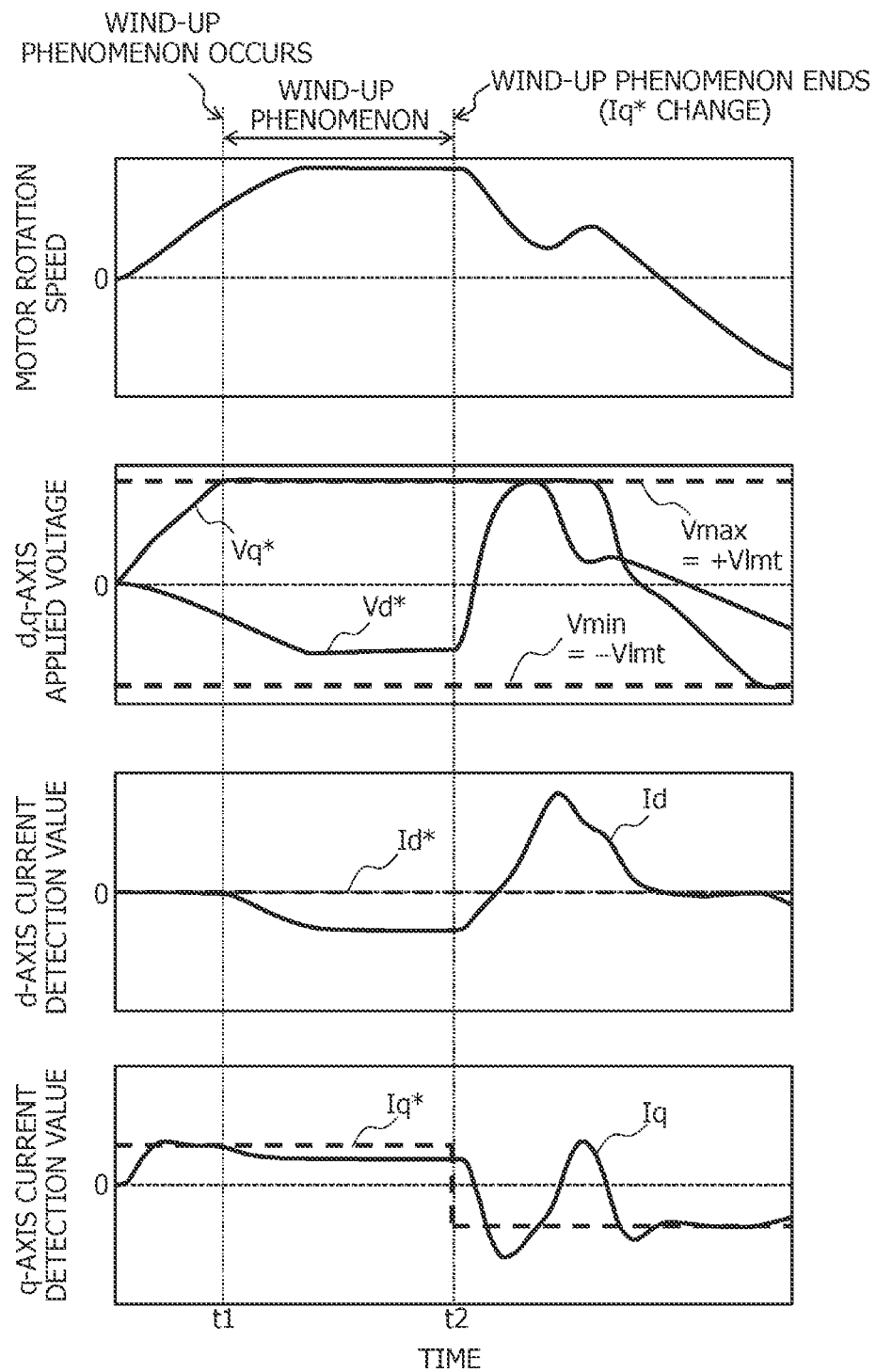
FIG. 6 is a time chart illustrating a result of control performed by a motor control device in the related art.
Figure 7:
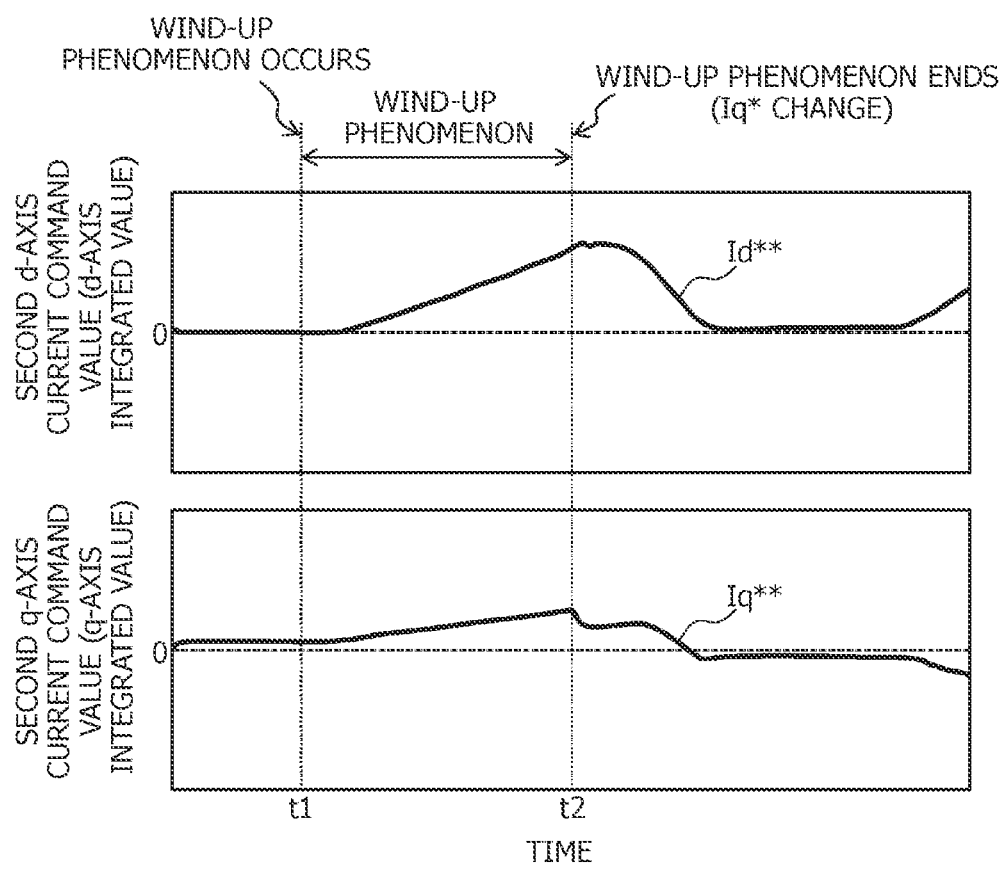
FIG. 7 is a time chart illustrating a temporal change in integrated value in the result of the control in FIG. 6.

The aforementioned problem, that is, the problem occurring in the controller in the related art in the voltage saturation state will be described with reference to FIGS. 6 and 7. Note that FIGS. 6 and 7 illustrate a case in which the q-axis voltage command value $V_q$ exceeding the q-axis voltage upper limit value $V_{qmax}$ has been obtained through the arithmetic operation, for example, and the voltage saturation state has thus occurred. However, the same applies to a case in which $V_q$ that is less than the q-axis voltage lower limit value $V_{qmin}$ has been obtained through the arithmetic operation, a case in which the d-axis voltage command value $V_d$ exceeding the d-axis voltage upper limit value $V_{dmax}$ has been obtained through the arithmetic operation, and a case in which the d-axis voltage command value $V_d$ that is less than the d-axis voltage lower limit value $V_{dmin}$ has been obtained through the arithmetic operation.

In FIG. 6, a voltage saturation state in which the q-axis applied voltage $V_q^*$ is saturated at the q-axis voltage upper limit value $V_{qmax}$ at a clock time t1 has been achieved. In other words, the q-axis voltage command value $V_q$ exceeding $V_{qmax}$ is obtained through the arithmetic operation at clock time t1 (not illustrated). Therefore, the drive control of motor 60 with $V_{qmax}$ that is different from $V_q$ obtained through the arithmetic operation is started at clock time t1. Therefore, $I_q$ does not follow $I_q^*$, and for example, the q-axis current detection value $I_q$ is below the first q-axis current command value $I_q^*$ (see FIG. 6), and the q-axis current deviation $\Delta I_q$ starts to increase.

When the integral control is continuously executed, d and q-axis integrated values $I_d^{}$ and $I_q^{}$ continuously change in the increasing direction or decreasing direction to cause the d and q-axis current deviations $\Delta I_d$ and $\Delta I_q$ to become zero unless $\Delta I_d$ and $\Delta I_q$ do not become zero. Therefore, if $\Delta I_q$ starts to increase as illustrated in FIG. 6, integral control for causing the q-axis current detection value $I_q$ to approach the first q-axis current command value $I_q^*$ is executed after clock time t1, and $I_q^{}$ then starts to increase (see FIG. 7). As is obvious from (Expression 2), the q-axis voltage command value $V_q$ increases as $\Delta I_q$ and $I_q^{}$ increase. In other words, such $V_q$ that causes $I_q$ to increase and approach $I_q^*$ is obtained through the arithmetic operation. More specifically, $V_q$ obtained through the arithmetic operation after clock time t1 is greater than the q-axis voltage command value $V_q$ obtained through the arithmetic operation at clock time t1 when the voltage saturation state occurs and is greater than $V_{qmax}$, of course. However, since the q-axis voltage that is greater than $V_{qmax}$ is not applied to motor 60, the q-axis applied voltage $V_q^*$ after clock time t1 is continuously saturated at $V_{qmax}$ and does not change. In other words, since $I_q^{**}$ that has increased is not reflected to $V_q^*$ after clock time t1, a so-called wind-up phenomenon in which $\Delta I_q$ does not become zero and $I_q$ cannot reach $I_q^*$ occurs.

Also, in the voltage saturation state, the rotation speed of motor 60 is also limited to a predetermined rotation speed (a maximum rotation speed, for example) after elapse of a predetermined time from clock time t1. In short, in the voltage saturation state illustrated in FIG. 6, the first q-axis current command value $I_q^*$ is excessively large with respect to the maximum rotation speed of motor 60, and controller 80 thus continuously performs an arithmetic operation for such q-axis voltage command value $V_q$ that require the maximum speed or more of motor 60.

As described above, the q-axis voltage command value $V_q$ obtained by executing the integral control for causing the q-axis current deviation $\Delta I_q$ to become zero is not reflected during the occurrence of the wind-up phenomenon, and the q-axis applied voltage $V_q^*$ does not change. Therefore, the q-axis integrated value $I_q^{**}$ continuously increases through the integral control, and $\Delta I_q$ is excessively accumulated during the occurrence of the wind-up phenomenon. On the other hand, the d-axis applied voltage $V_d^*$ is not saturated at the d-axis voltage limit value $V_{dlmt}$ as illustrated in FIG. 6. However, as is obvious from (Expression 1), the d-axis voltage command value $V_d$ is affected by $I_q^{**}$, and $V_d^*$ thus decreases as $I_q^{}$ increases at and after clock time t1**. Therefore, since the d-axis the current detection value $I_d$ starts to drop below the first d-axis current command value $I_d^*$, the d-axis current deviation $\Delta I_d$ increases. Thus, the d-axis integrated value $I_d^{}$ also increases (see FIG. 7**).

When the d and q-axis current deviations $\Delta I_d$ and $\Delta I_q$ are excessively accumulated through the integral control, there is a concern that the following problem may occur. For example, the first q-axis current command value $I_q^*$ has been changed at a clock time t2 to operate motor 60 in a rotation direction that is opposite from the rotation direction until then in FIG. 6 (command change). In this case, there is a concern that stability of current control in a transient state may deteriorate, for example, convergence (responsiveness) of the d and q-axis current detection values $I_d$ and $I_q$ with respect to the first d and q-axis current command values $I_d^*$ and $I_q^*$ after the command change deteriorates. As a result, it is not possible to control the torque of motor 60 and thereby to lower the rotation speed of motor 60 as desired. Therefore, there is a concern that first member 42A may unnecessarily collide with second member 42B in stopper mechanism 42 because, for example, VCR mechanism 26 causes overshooting with respect to the target compression ratio.

Such deterioration of stability of current control in the transient state is caused by the integral control that does not affect the d and q-axis applied voltages $V_d^*$ and $V_q^*$ being continuously executed during the occurrence of the wind-up phenomenon. More specifically, the wind-up phenomenon ends after the command change, and drive control of motor 60 that reflects the d and q-axis voltage command values $V_d$ and $V_q$ can be performed. However, it takes time to remove the influences of the d and q-axis integrated values $I_d^{}$ and $I_q^{}$ that have excessively changed during the occurrence of the wind-up phenomenon, after the command change. For example, it takes time to reduce $I_d^{}$ and $I_q^{}$ that have excessively increased from clock time t1 to clock time t2 in FIG. 7. Therefore, $V_d$ and $V_q$ are adversely affected until $I_d^{}$ and $I_q^{}$ that have excessively increased are reduced, and $V_d^*$ and $V_q^*$ become unstable at and after clock time t2. Therefore, there is a concern that the responsiveness may deteriorate since it takes time for the d and q-axis current deviations $\Delta I_d$ and $\Delta I_q$ to become zero.

Thus, controller 80 according to the first embodiment sets a predetermined range for the d and q-axis integrated values $I_d^{}$ and $I_q^{}$ in the integral control to improve stability of current control in the transient state. Then, when $I_d^{}$ and $I_q^{}$ become outside the predetermined range, controller 80 limits $I_d^{}$ and $I_q^{}$ within the predetermined range. In short, since $I_d^{}$ and $I_q^{}$ can excessively change during the occurrence of the wind-up phenomenon, $I_d^{}$ and $I_q^{}$ is limited within the predetermined range to prevent them from excessively changing. To do so, second d(q)-axis current arithmetic operation unit 606 (608) according to the first embodiment is configured to perform the arithmetic operation for integration upper and lower limit values defining the aforementioned predetermined range in addition to the arithmetic operation for $I_d^{}$ and $I_q^{}$ and the like.

Figure 8:
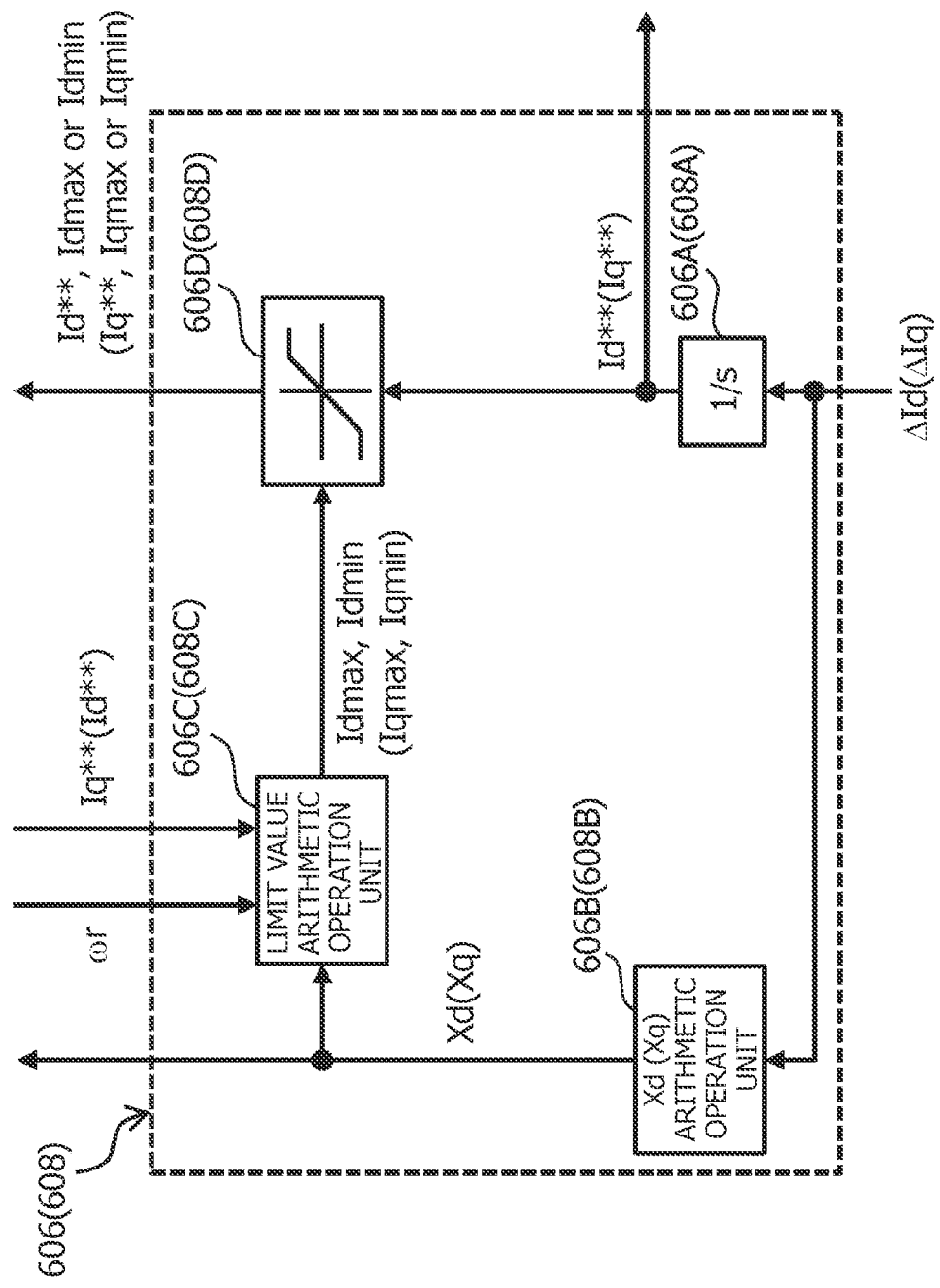
FIG. 8 is a configuration diagram illustrating an example of an internal configuration of second d(q)-axis current command value arithmetic operation unit according to a first embodiment.

More specifically, second d(q)-axis current arithmetic operation unit 606 (608) has an integral operation unit 606A (608A), an $X_d$ ($X_q$) arithmetic operation unit 606B (608B), a limit value arithmetic operation unit 606C (608C), and an integration limiting unit 606D (608D) as illustrated in FIG. 8. Note that since second d-axis current arithmetic operation unit 606 and second q-axis current arithmetic operation unit 608 have the same configuration, second d-axis current arithmetic operation unit 606 will be mainly described below.

Integral operation unit 606A is represented as 1/s meaning integration in FIG. 8 and multiples the d-axis current deviation $\Delta I_d$ by an integration gain ($\omega_{cdACR}$) and sequentially integrates the product as described above. The d-axis integrated value $I_d^{}$ obtained by integral operation unit 606A through the arithmetic operation is output to integration limiting unit 606D. Also, integral operation unit 606A outputs $I_d^{}$ obtained through the arithmetic operation to limiting value arithmetic operation unit 608C in first q-axis current arithmetic operation unit 608.

$X_d$ arithmetic operation unit 608B performs an arithmetic operation for the d-axis proportional value $X_d$ ($=\Delta I_d \omega_{cdACR}$) by multiplying the d-axis current deviation $\Delta I_d$ by the d-axis control response angular frequency $\omega_{cdACR}$ as described above and outputs $X_d$ to d-axis coil voltage arithmetic operation unit 610 and limit value arithmetic operation unit 606C.

Limit value arithmetic operation unit 606C is adapted such that the d-axis proportional value $X_d$, the q-axis integrated value $I_q^{}$ obtained by integral operation unit 608A in second q-axis current arithmetic operation unit 608 through the arithmetic operation, and the angular speed detection value $\omega_r$ are input thereto and are stored therein. Then, limit value arithmetic operation unit 606C performs an arithmetic operation for d-axis integration upper and lower limit values (an upper limit value $I_{dmax}$ and a lower limit value $I_{dmin}$) defining the predetermined range as will be described later in detail and outputs $I_{dmax}$ and $I_{dmin}$ obtained through the arithmetic operation to integration limiting unit 606D**.

The d-axis integrated value $I_d^{}$, the d-axis integration upper limit value $I_{dmax}$, and the d-axis integration lower limit value $I_{dmin}$ are input to integration limiting unit 606D. Then, integration limiting unit 606D compares input $I_d^{}$ with $I_{dmax}$ and $I_{dmin}$ and determines outputs to d-axis coil voltage arithmetic operation unit 610 and decoupling control unit 614 on the basis of the comparison result. More specifically, $I_{dmax}$ is output when $I_d^{}$ exceeds $I_{dmax}$. Also, $I_{dmin}$ is output when $I_d^{}$ is less than $I_{dmin}$.

In short, when the input d-axis integrated value $I_d^{}$ is outside the predetermined range defined by the d-axis integration upper limit value $I_{dmax}$ and the d-axis integration lower limit value $I_{dmin}$ (that is, $I_d^{} > I_{dmax}$ or $I_d^{} < I_{dmin}$), the d-axis integrated value actually output is limited within the predetermined range. Also, the same applies to second q-axis current arithmetic operation unit 608, and when the q-axis integrated value $I_q^{}$ is outside the predetermined range defined by a q-axis integration upper limit value $I_{qmax}$ and a q-axis integration lower limit value $I_{qmin}$, a q-axis integrated value is limited within the predetermined range. Therefore, the d(q)-axis integrated value $I_d^{}$ ($I_q^{}$) is limited within the predetermined range through the cooperation of limit value arithmetic operation unit 606C (608C) and integration limiting unit 606D (608D).

On the other hand, integration limiting unit 606D outputs the d-axis integrated value $I_d^{}$ as it is to d-axis coil voltage arithmetic operation unit 610 and decoupling control unit 614 if the input d-axis integrated value $I_d^{}$ is within the predetermined range (that is, $I_{dmin} \leq I_d^{**} \leq I_{dmax}$).

More specifically, limit value arithmetic operation unit 606C performs the arithmetic operation for the present value of the d-axis integration upper limit value $I_{dmax}$ using the d-axis voltage upper limit value $V_{dmax}$, the resistance setting value R, the d and q-axis inductance setting values $L_d$ and $L_q$, stored input values, that is, a previous value of $X_d$ ($=\Delta I_d \omega_{cdACR}$), a previous value of the q-axis integrated value $I_q^{}$, and a previous value of the angular speed detection value $\omega_r$. More specifically, when the present value of the d-axis integration upper limit value is defined as $I_{dmax,t}$, the previous value of the d-axis current deviation is defined as $\Delta I_{d,t-1}$, the previous value of the q-axis integrated value is defined as $I_{q,t-1}^{}$, and the previous value of the angular speed detection value is defined as $\omega_{r,t-1}$, $I_{dmax,t}$ is represented by (Expression 3) below.

[Expression 3]

$$I_{dmax,t} = \frac{V_{dmax} - \Delta I_{d,t-1}\omega_{cdACR}L_d + I_{q,t-1}^{**}\omega_{r,t-1}L_q}{R} \quad (3)$$

As represented by (Expression 3), the present value $I_{dmax,t}$ of the d-axis integration upper limit value means the d-axis integrated value obtained by substituting $V_{dmax}$, $\Delta I_{d,t-1}$, $I_{q,t-1}^{}$, and $\omega_{r,t-1}$ for $V_{d,t}$, $\Delta I_{d,t}$, $I_{q,t}^{}$, and $\omega_{r,t}$ in (Expression 1) and transforming the result. In other words, when it is assumed that the present value of the d-axis integrated value is $I_{d,t}^{}$, $I_{dmax,t}$ defines the upper limit value of the predetermined range for $I_{d,t}^{}$.

The present value $I_{dmin,t}$ of the d-axis integration lower limit value is similar to that in (Expression 3) other than that the d-axis voltage lower limit value $V_{dmin}$ is substituted for $V_{d,t}$ in (Expression 1) and is represented by (Expression 4) below. Therefore, $I_{dmin,t}$ defines the lower limit value of the predetermined range for $I_{d,t}^{**}$.

[Expression 4]

$$I_{dmin,t} = \frac{V_{dmin} - \Delta I_{d,t-1}\omega_{cdACR}L_d + I_{q,t-1}^{**}\omega_{r,t-1}L_q}{R} \quad (4)$$

Also, limit value arithmetic operation unit 608C performs an arithmetic operation for the present value of the q-axis integration upper limit value $I_{qmax}$ using the q-axis voltage upper limit value $V_{qmax}$, the resistance setting value R, the d and q-axis inductance setting values $L_d$ and $L_q$, the inductive voltage constant $K_e$, the stored input values, that is, the previous value of $X_q$ ($=\Delta I_q \omega_{cqACR}$), the previous value of the d-axis integrated value $I_d^{}$, and the previous value of the angular speed detection value $\omega_r$. More specifically, when the present value of the q-axis integration upper limit value is defined as $I_{qmax,t}$, the previous value of the q-axis current deviation is defined as $\Delta I_{q,t-1}$, and the previous value of the d-axis integrated value is defined as $I_{d,t-1}^{}$, $I_{dmax,t}$ is represented by (Expression 5) below.

[Expression 5]

$$I_{qmax,t} = \frac{V_{qmax} - \Delta I_{q,t-1}\omega_{cqACR}L_q - I_{d,t-1}^{**}\omega_{r,t-1}L_d - K_e\omega_{r,t-1}}{R} \quad (5)$$

As represented by (Expression 5), the present value $I_{qmax,t}$ of the q-axis integration upper limit value means the q-axis integrated value obtained by substituting $V_{qmax}$, $\Delta I_{q,t-1}$, $I_{d,t-1}^{}$, and $\omega_{r,t-1}$ for $V_{q,t}$, $\Delta_{q,t}$, $I_{d,t}^{}$, and $\omega_{r,t}$ in (Expression 2), respectively, and transforming the result. In other words, when the present value of the q-axis integrated value is defined as $I_{q,t}^{}$, $I_{qmax,t}$ defines the upper limit value of the predetermined range for $I_{q,t}^{}$.

The present value $I_{qmin,t}$ of the q-axis integration lower limit value is similar to that in (Expression 5) other than that the q-axis voltage lower limit value $V_{qmin}$ is substituted for $V_{q,t}$ in (Expression 2) and is represented by (Expression 6) below. Therefore, the present value $I_{qmin,t}$ of the q-axis integration lower limit value defines the lower limit value of the predetermined range for $I_{q,t}^{**}$.

[Expression 6]

$$I_{qmin,t} = \frac{V_{qmin} - \Delta I_{q,t-1}\omega_{cqACR}L_q - I_{d,t-1}^{**}\omega_{r,t-1}L_d - K_e\omega_{r,t-1}}{R} \quad (6)$$

In short, when such a present value $I_{d,t}^{}$ ($I_{q,t}^{}$) of the d(q)-axis integrated value that does not satisfy an inequality $I_{dmin,t} \leq I_{d,t}^{} \leq I_{dmax,t}$ ($I_{qmin,t} \leq I_{q,t}^{} \leq I_{qmax,t}$) representing the predetermined range is input, the integration limiting unit 606D (608D) actually outputs the d(q)-axis integrated value limited to satisfy the above inequality.

Note that each inequality described above is represented by (Expression 7) or (Expression 8) below.

[Expression 7]

$$\frac{V_{dmin} - \Delta I_{d,t-1}\omega_{cdACR}L_d + I_{q,t-1}^{**}\omega_{r,t-1}L_q}{R} \leq \quad (7)$$

$$I_{d,t}^{} \leq \frac{V_{dmax} - \Delta I_{d,t-1}\omega_{cdACR}L_d + I_{q,t-1}^{}\omega_{r,t-1}L_q}{R}$$

[Expression 8]

$$\frac{V_{qmin} - \Delta I_{q,t-1}\omega_{cqACR}L_q - I_{d,t-1}^{**}\omega_{r,t-1}L_d - K_e\omega_{r,t-1}}{R} \leq \quad (8)$$

$$I_{q,t}^{} \leq \frac{V_{qmax} - \Delta I_{q,t-1}\omega_{cqACR}L_q - I_{d,t-1}^{}\omega_{r,t-1}L_d - K_e\omega_{r,t-1}}{R}$$

An example of vector control processing executed by processor 80A of controller 80 configured as described above will be described with reference to FIGS. 9 and 10. The vector control processing is executed every predetermined cycle and is triggered by the present value $\omega_{r,t}$ of the angular speed detection value, the present values $I_{d,t}^*$ and $I_{q,t}^*$ of the first d and q-axis current command values, and the present values $I_{d,t}$ and $I_{q,t}$ of the d and q-axis current detection values being input.

In Step 1, processor 80A performs an arithmetic operation for the present values $\Delta I_{d,t}$ and $\Delta I_{q,t}$ of the d and q-axis current deviations by subtracting $I_{d,t}$ and $I_{q,t}$ from $I_{d,t}^*$ and $I_{q,t}^*$, respectively.

In Step 2, processor 80A performs an arithmetic operation for the present values ($=\Delta I_{d,t}\omega_{cdACR}$, and $\Delta I_{q,t}\omega_{cqACR}$) of the d and q-axis proportional values $X_d$ and $X_q$ on the basis of $\Delta I_{d,t}$ and $\Delta_{q,t}$ and the d and q-axis control response angular frequencies $\omega_{cdACR}$ and $\omega_{cqACR}$. Also, processor 80A performs an arithmetic operation for the present values $I_{d,t}^{}$ and $I_{q,t}^{}$ of the d and q-axis integrated values through execution of integral control.

In Step 3, processor 80A performs an arithmetic operation for the present values $I_{dmax,t}$ and $I_{qmax,t}$ of the d and q-axis integration upper limit values and the present values $I_{dmin,t}$ and $I_{qmin,t}$ of the d and q-axis integration lower limit values in accordance with (Expression 3) to (Expression 6). $\Delta I_{d,t-1}$, $\Delta_{q,t-1}$, $\Delta_{d,t-1}^{}$, $I_{q,t-1}^{}$, and $\omega_{r,t-1}$ used in the arithmetic operations for $I_{dmax,t}$ and $I_{qmax,t}$ and $I_{dmin,t}$ and $I_{qmin,t}$ are previous values of the d-axis current deviation, the q-axis current deviation, the d-axis integrated value, the q-axis integrated value, and the angular speed detection value as described above, respectively, and are variables used to perform the arithmetic operations for the d and q-axis voltage command values $V_d$ and $V_q$ in the previous vector control processing.

Figure 10:
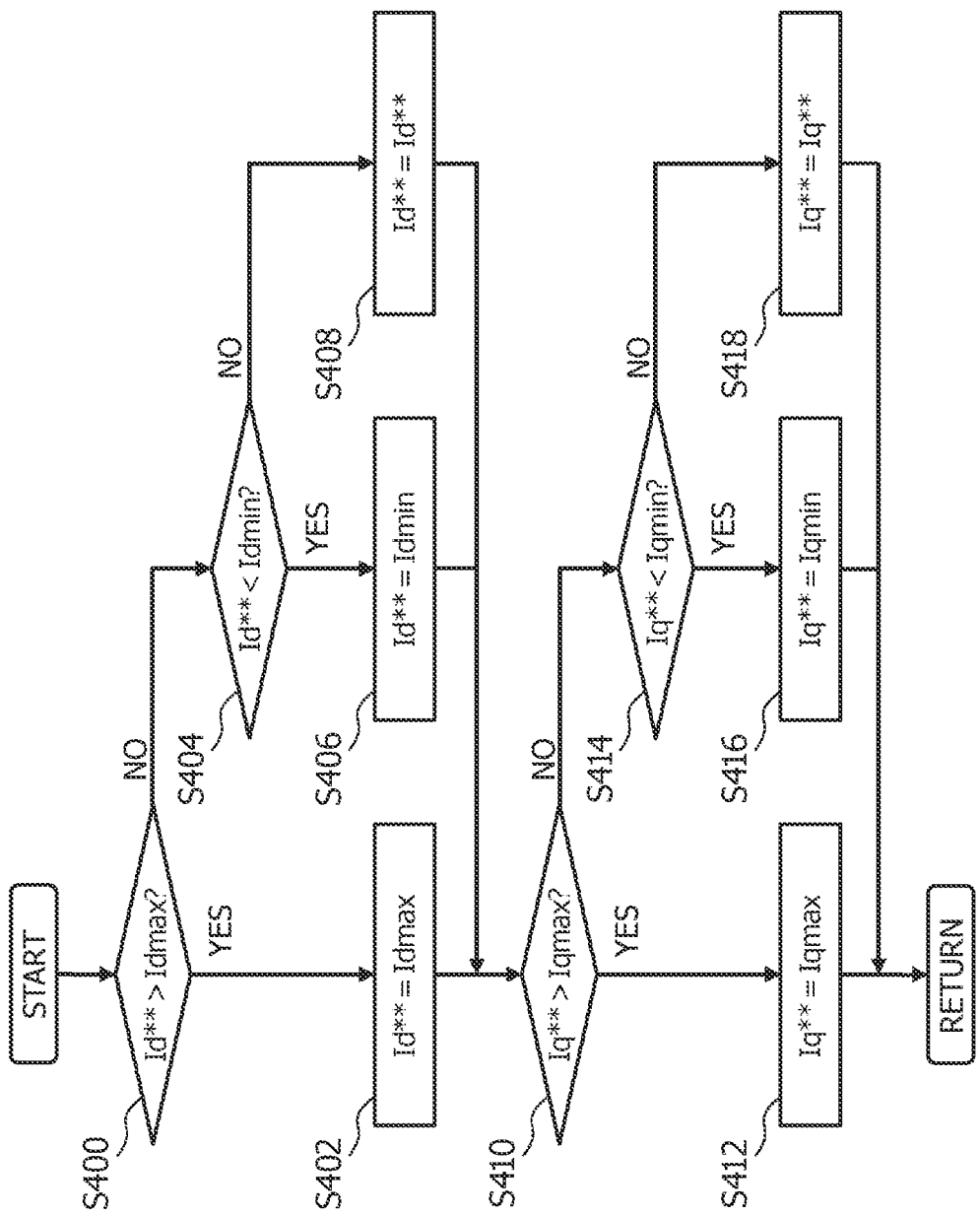
FIG. 10 is a flowchart illustrating an example of integrated value determination processing according to the first embodiment.

In Step 4, processor 80A executes integrated value determination processing illustrated in FIG. 10.

In Step 400, processor 80A determines whether or not $I_{d,t}^{}$ obtained through the arithmetic operation in Step 2 exceeds $I_{dmax,t}$ obtained through the arithmetic operation in Step 3. If $I_{d,t}^{}$ is determined to exceed $I_{dmax,t}$, then processor 80A advances the processing to Step 402.

In Step 402, processor 80A determines the d-axis integrated value as $I_{dmax,t}$ ($I_d^{}=I_{dmax}$) and advances the processing to Step 410**.

On the other hand, if $I_{d,t}^{}$ is determined to be equal to or less than $I_{dmax,t}$ in Step 400, then processor 80A advances the processing to Step 404**.

In Step 404, processor 80A determines whether or not $I_{d,t}^{}$ obtained through the arithmetic operation in Step 2 is less than $I_{dmin,t}$ obtained through the arithmetic operation in Step 3. Then, if $I_{d,t}^{}$ is determined to be less than $I_{dmin,t}$, processor 80A advances the processing to Step 406.

In Step 406, processor 80A determines the d-axis integrated value as $I_{dmin,t}$ ($I_d^{}=I_{dmin}$) and advances the processing to Step 410**.

Also, if $I_{d,t}^{}$ is determined to be equal to or greater than $I_{dmin,t}$ in Step 400, then processor 80A advances the processing to Step 408. In Step 414, processor 80A determines the d-axis integrated value as $I_{d,t}^{}$ obtained through the arithmetic operation in Step 2 (($I_d^{}=I_d^{}$)) and advances the processing to Step 410.

The processing in Steps 410 to 418 is processing to determine the q-axis integrated value similarly to Steps 400 to 408, and description thereof will be omitted. Processor 80A determines the q-axis integrated value in Step 412, 416 or 418 and then returns the processing to Step 5.

In Step 5, processor 80A performs an arithmetic operation for the present values of the d and q-axis voltage command values (hereinafter, simply referred to as "$V_{d,t}$ and $V_{q,t}$") first.

$V_{d,t}$ is obtained through an arithmetic operation using the resistance setting value R, the d-axis control response angular frequency $\omega_{cdACR}$, the d and q-axis inductance setting values $L_d$ and $L_q$, the present value $\omega_{r,t}$ of the angular speed detection value, the d-axis current deviation $\Delta I_{d,t}$ obtained through the arithmetic operation in Step 1, and the d-axis integrated value ($I_{d,t}^{}$, $I_{dmax,t}$, or $I_{dmin,t}$) and the q-axis integrated value ($I_{q,t}^{}$, $I_{qmax,t}$ or $I_{qmin,t}$) determined in Step 4 in accordance with (Expression 1).

$V_{q,t}$ is obtained through an arithmetic operation using the resistance setting value R, the q-axis control response angular frequency $\omega_{cqACR}$, the d and q-axis inductance setting values $L_d$ and $L_q$, the inductive voltage constant $K_e$, the present value $\omega_{r,t}$ of the angular speed detection value, the q-axis current deviation $\Delta I_{q,t}$ obtained through the arithmetic operation in Step 1, and the d-axis integrated value ($I_{d,t}^{}$, $I_{dmax,t}$, or $I_{dmin,t}$) and the q-axis integrated value ($I_{q,t}^{}$, $I_{qmax,t}$, or $I_{qmin,t}$) determined in Step 4 in accordance with (Expression 2).

When $V_{d,t}$ and $V_{q,t}$ are obtained through the arithmetic operations, then processor 80A ends the vector control processing. Thereafter, processor 80A performs 2-axis/three-phase conversion on $V_{d,t}$ and $V_{q,t}$ to generate the three-phase voltages Vu, Vv, and Vw and generates PWM pulses to drive switching elements 70A to 70F on the basis of the three-phase voltages Vu, Vv and Vw. In this manner, the voltages are applied via inverter 70, and the drive of motor 60 is controlled. However, if an absolute value of $V_{d,t}$ or $V_{q,t}$ exceeds the d-axis voltage limit value $V_{dlmt}$ or the q-axis voltage limit value $V_{qlmt}$, the output voltage of inverter 70 is saturated, and the d-axis voltage or the q-axis voltage corresponding to $V_{dlmt}$ or $V_{qlmt}$ is applied to motor 60.

According to controller 80 in the first embodiment described above, the d and q-axis integrated values $I_d^{}$ and $I_q^{}$ obtained through the arithmetic operation in the integral control are limited within the predetermined range when $I_d^{}$ and $I_q^{}$ are outside the predetermined range. In other words, since excessive changes in $I_d^{}$ and $I_q^{}$ are curbed, excessive accumulation of the d and q-axis current deviations $\Delta I_d$ and $\Delta I_q$ during occurrence of the wind-up phenomenon, in particular, is curbed. After the first d and q-axis current command values $I_d^*$ and $I_q^*$ are thus changed (command change) and the wind-up phenomenon ends, it is possible to curb deterioration of responsiveness due to excessive accumulation of $\Delta I_d$ and $\Delta I_d$. Therefore, in the first embodiment in which $I_d^{}$ and $I_q^{}$ are limited, it is possible to shorten the time required to cause the d and q-axis current detection values $I_d$ and $I_q$ to approach $I_d^*$ and $I_q^*$ after the command change, as compared with a case in which $I_d^{**}$ and $I_q^*$ are not limited. Therefore, it is possible to improve stability of the current control in the transient state after the wind-up phenomenon ends. This results in improvement in stability of torque control for motor 60, such as rapid lowering of the rotation speed of motor 60.

Here, as is obvious from (Expression 1) and (Expression 2), changes in the d and q-axis integrated value $I_{d}$ and $I_q^{}$ l affect the d and q-axis voltage command values $V_d$ and $V_q$. As described above with reference to FIGS. 6 and 7, the q-axis current deviation $\Delta I_q$ does not become zero during occurrence of the wind-up phenomenon in the related art, $I_q^{}$ increases to cause $\Delta I_q$ to become zero. Therefore, in a case in which $I_d^{}$ and $I_q^{**}$ are not limited within the aforementioned predetermined range, the q-axis voltage command value $V_q$ that is greater than the q-axis applied voltage $V_q^*$ ($=V_{qmax}$) during the occurrence of the wind-up phenomenon is continuously obtained through the arithmetic operation in accordance with the increase in $I_q^{**}$.

On the other hand, controller 80 according to the first embodiment can further obtain effects and advantages as follows. Here, a case in which the previous value $V_{q,t-1}$ of the q-axis voltage command value has exceeded the q-axis voltage upper limit value $V_{qmax}$ and the q-axis applied voltage $V_q^*$ has been saturated at $V_{qmax}$ will be described. In this case, when the present value $I_{q,t}^{}$ of the q-axis integrated value exceeds the present value $I_{qmax,t}$ of the q-axis integration upper limit value, $I_{q,t}^{}$ is limited to $I_{qmax,t}$. $I_{qmax,t}$ is obtained through an arithmetic operation using $V_{qmax}$ and variables $\Delta I_{q,t-1}$, $I_{d,t-1}$, and $\omega_{r,t-1}$ used to obtain the previous value $V_{q,t-1}$ of the q-axis voltage command value exceeding $V_{qmax}$ through the arithmetic operation in accordance with (Expression 5). Thereafter, the present value $V_{q,t}$ of the q-axis voltage command value is obtained through the arithmetic operation using $I_{qmax,t}$ in accordance with (Expression 2). Here, the present value $V_{q,t}$ of the q-axis voltage command value obtained through the arithmetic operation using $I_{qmax,t}$ is defined as V1, and the present value $V_{q,t}$ of the q-axis voltage command value obtained through the arithmetic operation using $I_{q,t}$ before the limiting is defined as V2. As is obvious from (Expression 2), if $I_{q,t}>I_{qmax,t}$ is satisfied, V1 is less than V2. Also, if differences between the present value $\Delta I_{q,t}$ of the q-axis current deviation, the present value $I_{d,t}$ of the d-axis integrated value, and the present value $\omega_{r,t}$ of the angular speed detection value and the previous values thereof from among the variables in (Expression 2) are small, V1 is a value that is close to the q-axis voltage upper limit value $V_{qmax}$. In other words, when the q-axis integrated value $I_q**$ is limited within the predetermined range, the difference between the q-axis applied voltage $V_q*$ saturated at $V_{qmax}$ and the q-axis voltage command value $V_q$ (=V1) decreases. The above point is similarly applied to a case in which the q-axis integrated value $I_q$ is limited to the q-axis integration lower limit value $I_{qmin,t}$ and a case in which the d-axis integrated value $I_d$ is limited to the d-axis integration upper limit value $I_{dmax,t}$ or the d-axis integration lower limit value $I_{dmin,t}$. In short, the fact that the d and q-axis integrated values $I_d$ and $I_q$ are limited within the predetermined range (that is, (Expression 7) and (Expression 8) are satisfied) during occurrence of the wind-up phenomenon is synonymous with the fact that the differences between the d and q-axis applied voltages $V_d*$ and $V_q*$ (=$V_{dlmt}$ and $V_{qlmt}$) and the d and q-axis voltage command values $V_d$ and $V_q$ are reduced. Therefore, excessive changes in d and q-axis integrated values $I_d$ and $I_q$ are cured, and significant separation between the operation amounts ($V_d$ and $V_q$) and the control amounts ($V_d*$ and $V_q*$) in the voltage saturation state is curbed.

Figure 11:
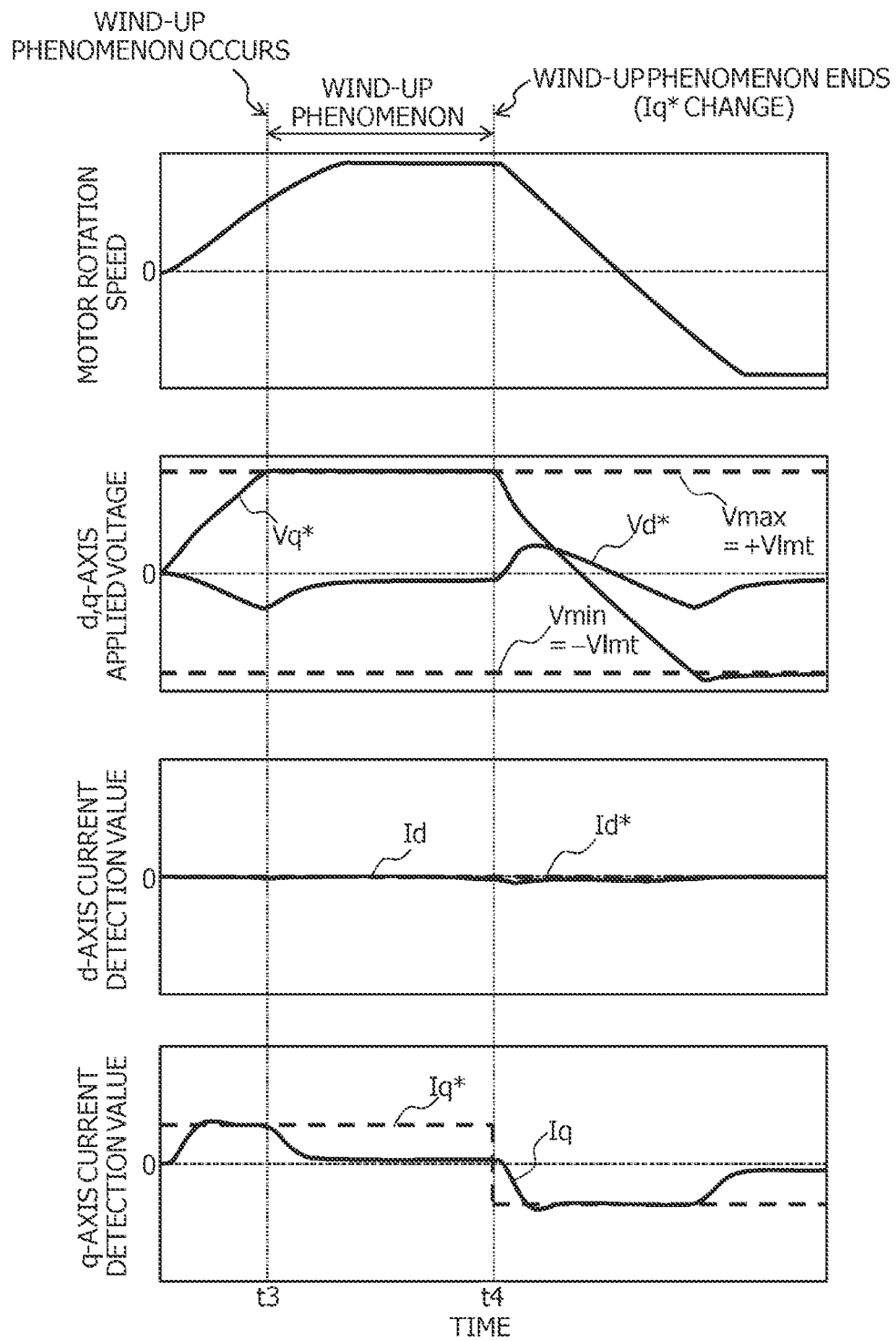
FIG. 11 is a time chart illustrating an example of a result of control according to the first embodiment.
Figure 12:
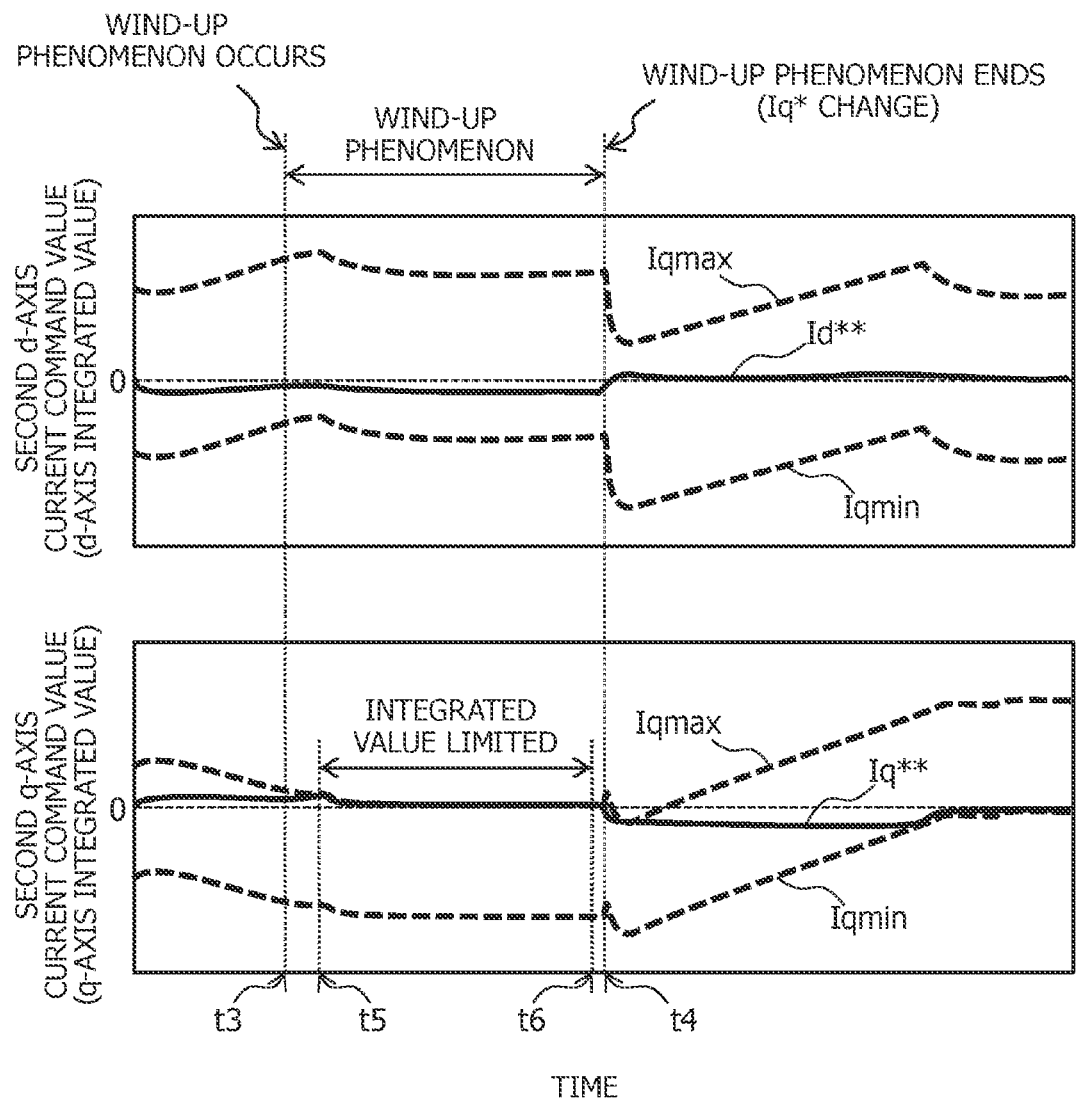
FIG. 12 is a time chart illustrating an example of a temporal change in integrated value in the result of the control in FIG. 11.

A result of the control performed by controller 80 according to the first embodiment will be described with reference to FIGS. 11 and 12. In FIG. 11, such a q-axis voltage command value $V_q$ that exceeds the q-axis voltage upper limit value $V_{qmax}$ is obtained through an arithmetic operation at a clock time t3, and a voltage saturation state in which the output voltage of inverter 70 is saturated has occurred. Therefore, the q-axis applied voltage $V_q*$ becomes $V_{qmax}$ at clock time t3. Thereafter, the first q-axis current command value $I_q*$ is changed to such a value that causes the rotation direction of motor 60 to rotate in the opposite direction at a clock time t4 (command change). In other words, a wind-up phenomenon in which the q-axis current deviation $\Delta I_q$ does not become zero occurs from clock time t3 to clock time t4.

At and after clock time t3, an arithmetic operation for such a q-axis integrated value $I_q$ that increases similarly to that in FIG. 7 is started to cause the q-axis current deviation $\Delta I_q$ to become zero. However, when $I_q$ exceeding the q-axis integration upper limit value $I_{qmax}$ is obtained through integral control at clock times t5 to t6 as illustrated in FIG. 12, then the q-axis integrated value is limited to $I_{qmax}$ (integrated value limiting). In other words, since $I_q**$ is limited within the predetermined range to reduce the difference between $V_q*$ and $V_q$ during occurrence of the wind-up phenomenon at clock times t5 to t6, excessive accumulation of $\Delta I_q$ is curbed. Therefore, since the time required to cause the d and q-axis current detection values Id and Iq to approach the first d and q-axis current command values Id* and Iq* after the change is shortened at and after clock time t4 at which the command is changed in FIG. 11, stability of current control in the transient state is improved as compared with that in FIG. 6. Also, it is possible to quickly lower the rotation speed of motor 60 to obtain a desired rotation speed as illustrated in FIG. 11 and thereby to improve stability of torque control for motor 60.

Note that although the d and q-axis voltage limit values $V_{dlmt}$ and $V_{qlmt}$ are assumed to be Ed/2 in the aforementioned first embodiment, $V_{dlmt}$ and $V_{qlmt}$ are not limited thereto. For example, $V_{dlmt}$ and $V_{qlmt}$ may be set to be equal to or less than Ed/2 in accordance with performance, the maximum rotation speed, and the like of motor 60 used. In this case, a voltage limiting unit is preferably provided on the downstream side of d and q-axis voltage arithmetic operation units 616 and 618 in vector control unit 600, for example. The voltage limiting unit outputs set $V_{dlmt}$ and $V_{qlmt}$ instead of $V_d$ and $V_q$ when absolute values of $V_d$ and $V_q$ obtained through the arithmetic operation exceed the set d and q-axis voltage limit values $V_{dlmt}$ and $V_{qlmt}$, for example. Since this leads to occurrence of a voltage saturation state in which the d and q-axis applied voltages $V_d*$ and $V_q*$ are saturated at set $V_{dlmt}$ and $V_{qlmt}$, it is possible to apply controller 80 according to the first embodiment.

Also, although the case in which controller 80 executes the sine wave PWM control has been described above, the invention is not limited thereto. For example, controller 80 may PWM control of a so-called third harmonic wave superimposition scheme in which signal generation unit 800 uses a sine wave with a third harmonic wave superimposed thereon as a modulation wave.

It is known that in the PWM control of the third harmonic wave superimposition scheme, it is possible to cause a PWM pulse width to increase and to extend ON times of switching elements 70A to 70F as compared with the sine wave PWM control. Therefore, it is possible to set a proportion (voltage utilization rate) of a basic wave voltage that can be output with respect to current voltage Ed to be higher in the PWM control of the third harmonic wave superimposition scheme than in the case of the sine wave PWM control. More specifically, in the PWM control of the third harmonic wave superimposition scheme, it is possible to output the basic wave voltage (amplitude) that is $2/\sqrt{3}$ (=about 1.15) times the basic wave voltage (amplitude) of the sine wave PWM control. In this manner, while the d and q-axis voltage limit values $V_{dlmt}$ and $V_{qlmt}$ are Ed/2 in the sine wave PWM control, it is also possible to employ the PWM control of the third harmonic wave superimposition scheme in the first embodiment with $V_{dlmt}$ and $V_{qlmt}$ set to $(2/\sqrt{3}) \times (Ed/2)=Ed/\sqrt{3}$. However, even in the case in which the PWM control of the third harmonic wave superimposition scheme is executed, $V_{dlmt}$ and $V_{qlmt}$ may be set to be equal to or less than $Ed/\sqrt{3}$ in accordance with the performance, the maximum rotation speed, and the like of motor 60 used. A voltage limiting unit similar to the aforementioned voltage limiting unit is preferably provided in this case as well.

Also, as is obvious from (Expression 7) and (Expression 8), for example, the d and q-axis integration upper and lower limit values $I_{dmax}$, $I_{qmax}$, $I_{dmin}$, and $I_{qmin}$, are affected by the d and q-axis current deviations $\Delta I_d$ and $\Delta I_q$, that is, the d and q-axis current detection values $I_d$ and $I_q$. Therefore, in a case in which noise or the like is superimposed on the q-axis current detection value $I_q$, for example, there is a concern that waveforms of $I_{qmax}$ and $I_{qmin}$, obtained through the arithmetic operation may vibrate (the same applies to $I_{dmax}$ and the like). Here, the d and q-axis inductances $L_d$ and $L_q$ used to calculate the d and q-axis integration upper and lower limit values and the d and q-axis voltage command values $V_d$ and $V_q$ are values set in advance when motor 60 is designed (design values). However, in a case in which the aforementioned problem in which the d and q-axis integration upper and lower limit values vibrate occurs, $L_d$ and $L_q$ to calculate the d and q-axis integration upper and lower limit values may be set to be smaller than the design values. Since how large the term of $I_{d,t-1}\omega_{r,t-1}L_d$ is in (Expression 8) changes in this manner, for example, influences of the noise and the like that may be received by the term of $\Delta I_{q,t-1}\omega_{cqACR}L_q$ is offset. It is thus possible to curb vibration of the waveforms of the d and q-axis integration upper and lower limit values. To do so, limit value arithmetic operation unit 606C (608C) may be configured to compare a difference between the calculated maximum value and minimum value of the d(q)-axis integration upper and lower limit value with a threshold value for comparison, for example. More specifically, limit value arithmetic operation unit 606C (608C**) may be configured to set $L_d$ and $L_q$ to be less than the design values in a case in which the difference between the maximum value and the minimum value exceeding the threshold value for comparison is detected a predetermined number of times or more within a predetermined time. Here, if $L_d$ and $L_q$ are set to be excessively small, there is a concern of an adverse influence on the predetermined range, such as the predetermined range being excessively narrow or wide. Thus, an allowable range may be defined in advance for how wide the predetermined range is to be, through an actual machine test or the like. In a case in which how wide the predetermined range is deviated from the allowable range, reducing $L_d$ and $L_q$ is stopped. However, $L_d$ and $L_q$ may be changed to zero in a case in which the vibrations of the waveforms of $I_{dmax}$, $I_{qmax}$, $I_{dmin}$, and $L_{qmin}$ do not stop regardless of the reducing of $L_d$ and $L_q$.

Next, a second embodiment will be described. Controller 80 according to the second embodiment executes the PWM control of the third harmonic wave superimposition scheme. In other words, signal generation unit 800 uses a modulation wave in which a third harmonic wave is superimposed on a sine wave. Also, controller 80 according to the second embodiment is configured to be able to execute so-called overmodulation control, which is control in a region in which a modulation rate M is equal to or greater than 1, to virtually use a voltage that is equal to or greater than the DC voltage Ed as the output voltage of inverter 70. Note that the "modulation rate" is defined as a value obtained by dividing a peak of the amplitudes of the three-phase voltages by the DC voltage Ed in the specification.

As described above, in the PWM control of the third harmonic wave superimposition scheme, it is possible to enhance the voltage utilization rate as compared with that in the sine wave PWM control and to output the basic wave voltage that is $2/\sqrt{3}$ (=about 1.15) times the basic wave voltage in the sine wave PWM control. Here, so-called one-pulse control in which a rectangular wave is output instead of a modulation wave is known as control to improve the voltage utilization rate. According to the one-pulse control, it is possible to output the basic wave voltage that is $4/\pi$ (=about 1.27) times the basic wave voltage in the sine wave PWM control. According to the PWM control of the third harmonic wave superimposition scheme, it is possible to further increase the voltage utilization rate through execution of the overmodulation control in which modulation rate M is increased to be greater than 1, and it is possible to cause the waveform of the basic wave voltage to have substantially a rectangular wave shape to cause the basic wave voltage to approach the one in the aforementioned one-pulse control.

In consideration of the above description, control with modulation rate M of 1 in the PWM control of the third harmonic wave superimposition scheme is defined as control in a state in which the d and q-axis applied voltages $V_d^*$ and $V_q^*$ are equal to $1.15\times Ed/2$ or $-1.15\times Ed$. In other words, the control with modulation rate M of one is executed when the absolute values of the d and q-axis voltage command values $V_d$ and $V_q$ obtained by vector control unit 600 through the arithmetic operation are equal to $1.15\times Ed/2$. Therefore, the fact that the absolute values of the d and q-axis voltage command values $V_d$ and $V_q$ are greater than $1.15\times Ed/2$ means that the d and q-axis voltages for overmodulation control have been obtained through the arithmetic operation.

Also, the d and q-axis voltage limit values $V_{dlmt}$ and $V_{qlmt}$ in the PWM control of the third harmonic wave superimposition scheme capable of executing overmodulation control are set to $4/\pi$ (=about $1.27)\times Ed/2$, for example, in consideration of the basic wave voltage that can be output in the one-pulse control in the specification. In other words, the d and q-axis voltage upper limit values $V_{dmax}$ and $V_{qmax}$ are set to $1.27\times Ed/2$, and the d and q-axis voltage lower limit values $V_{dmin}$ and $V_{qmin}$ are set to $-1.27\times Ed/2$. Therefore, according to the overmodulation control, the voltage saturation state in which the output voltage of inverter 70 is saturated is achieved in a case in which the q-axis voltage command value $V_q$ exceeding $V_{qmax}$ is obtained through the arithmetic operation, for example (that is, the q-axis applied voltage $V_q^*=V_{qmax}$).

Also, a region satisfying equal to or greater than $1.15\times Ed/2$ and equal to or less than $1.27\times Ed/2$ (equal to or greater than $-1.27\times Ed/2$ and equal to or less than $-1.15\times Ed/2$) will be referred to as an overmodulation control region in the specification. In other words, $1.15\times Ed/2$ is a lower limit value of the overmodulation control region, and $1.27\times Ed/2$ is an upper limit value of the overmodulation control region. Therefore, controller 80 is configured to be able to execute the overmodulation control for inverter 70 in which the output voltage of inverter 70 is controlled on the basis of the d and q-axis voltage command values $V_d$ and $V_q$ obtained through the arithmetic operation when $V_d$ and $V_q$ fall within the overmodulation control region, in the following description.

Here, it is known that in the overmodulation control, the ON times of switching elements 70A to 70F are extended as compared with those in the control in a region in which modulation rate M is equal to or less than 1. Since this enables the inverter 70 to increase the output voltage, it is possible to increase the maximum rotation speed of motor 60 by about 10%, for example, as compared with that in the control in which the modulation rate M is one.

However, in the overmodulation control, the number of PWM pulses decreases as compared with that in the control in the region in which modulation rate M is equal to or less than 1, high-frequency components are thus superimposed on the currents (that is, phase current detection values Iu, Iv, and Iw) flowing through motor 60, and the waveforms thereof are distorted. This results in distortion of the waveforms of the d and q-axis current detection values $I_d$ and $I_q$ as well. Therefore, there is a concern that stability of current control may deteriorate as in the control result illustrated in FIG. 13, for example. Note that the time chart for the q-axis voltage illustrated in FIG. 13 illustrates a temporal change in q-axis voltage command value $V_q$ obtained by q-axis voltage arithmetic operation unit 618 through an arithmetic operation, unlike FIGS. 6 and 11 illustrating temporal changes in d and q-axis applied voltages $V_d^*$ and $V_q^*$.

Figure 13:
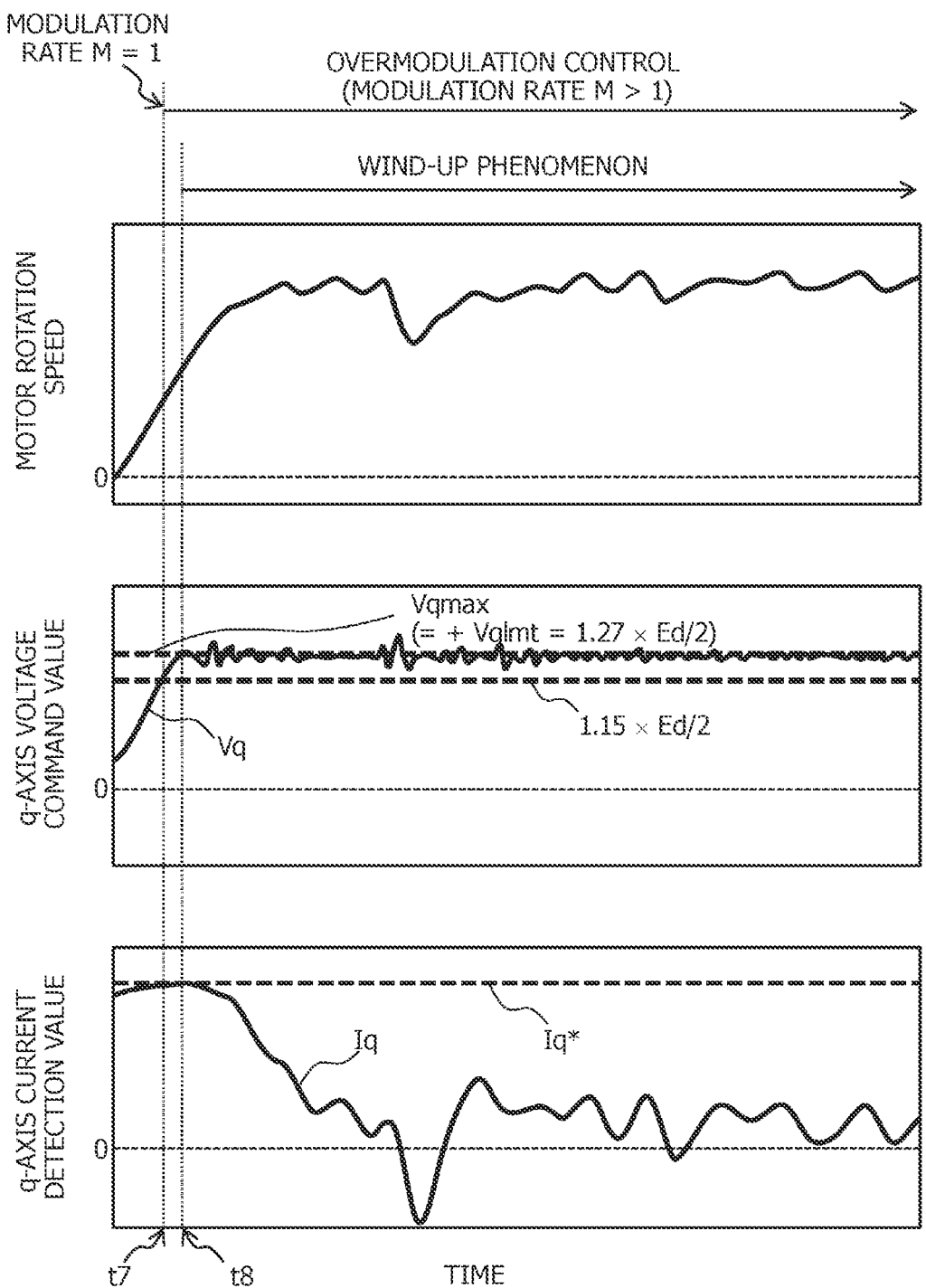
FIG. 13 is a diagram for explaining a problem occurring in a case in which overmodulation control is executed.

In FIG. 13, such a q-axis voltage command value $V_q$ (>1.15×Ed/2) that requires control in a region in which modulation rate M exceeds 1 (M>1) is obtained through the arithmetic operation at a clock time t7, and overmodulation control is executed to obtain a desired rotation speed as a motor rotation speed. Also, in FIG. 13, $V_q$ exceeding $V_{qmax}$ is obtained through an arithmetic operation at and after a clock time t8, and a voltage saturation state in which the q-axis applied voltage $V_q^*$ is saturated at $V_{qmax}$ occurs. Therefore, the wind-up phenomenon in which the q-axis current deviation $\Delta I_q$ between the q-axis current detection value $I_q$ and the first q-axis current command value $I_q^*$ does not become zero occurs.

During the occurrence of the wind-up phenomenon in the overmodulation control, the waveform of the q-axis current detection value $I_q$ starts to be distorted with a start of distortion of the waveforms of the phase current detection values Iu, Iv, and Iw. Here, an excessive increase in q-axis integrated value $I_q^{}$ due to the occurrence of the wind-up phenomenon is curbed by the configuration that is similar to that in the first embodiment (not illustrated). However, a high-frequency component is superimposed on the q-axis current deviation $\Delta I_q$ as well with the distortion of the waveform of the q-axis current detection value $I_q$, and a change in q-axis integrated value $I_q^{}$ with time increases. Also, since the waveform of the d-axis current detection value $I_d$, which is not illustrated, is also distorted similarly to $I_q$, $V_q$ is affected by a temporal change in d-axis integrated value $I_d^{**}$ with the distortion of the waveform of Id, as is obvious from (Expression 2). Therefore, since voltage ripple, which is a high-frequency component, is superimposed on $V_q$ obtained through the arithmetic operation, the waveform of $V_q$ vibrates on both positive and negative sides around $V_{qmax}$ at the center. Therefore, since the q-axis applied voltage Vq* is saturated at Vqmax or becomes less than Vqmax in practice, there is a concern that phase currents Iu, Iv, and Iw with the waveforms distorted due to the overmodulation control may be adversely affected and the waveforms of phase currents Iu, Iv, and Iw may be further distorted. In this manner, the rotation speed of motor 60 is not stabilized as a result of deterioration of stability of current control in the transient state until the desired motor rotation speed is obtained after the occurrence of the wind-up phenomenon in the overmodulation control. Thus, there is a concern that a speed of a change in compression ratio using VCR mechanism 26 may not be stabilized.

Figure 14:
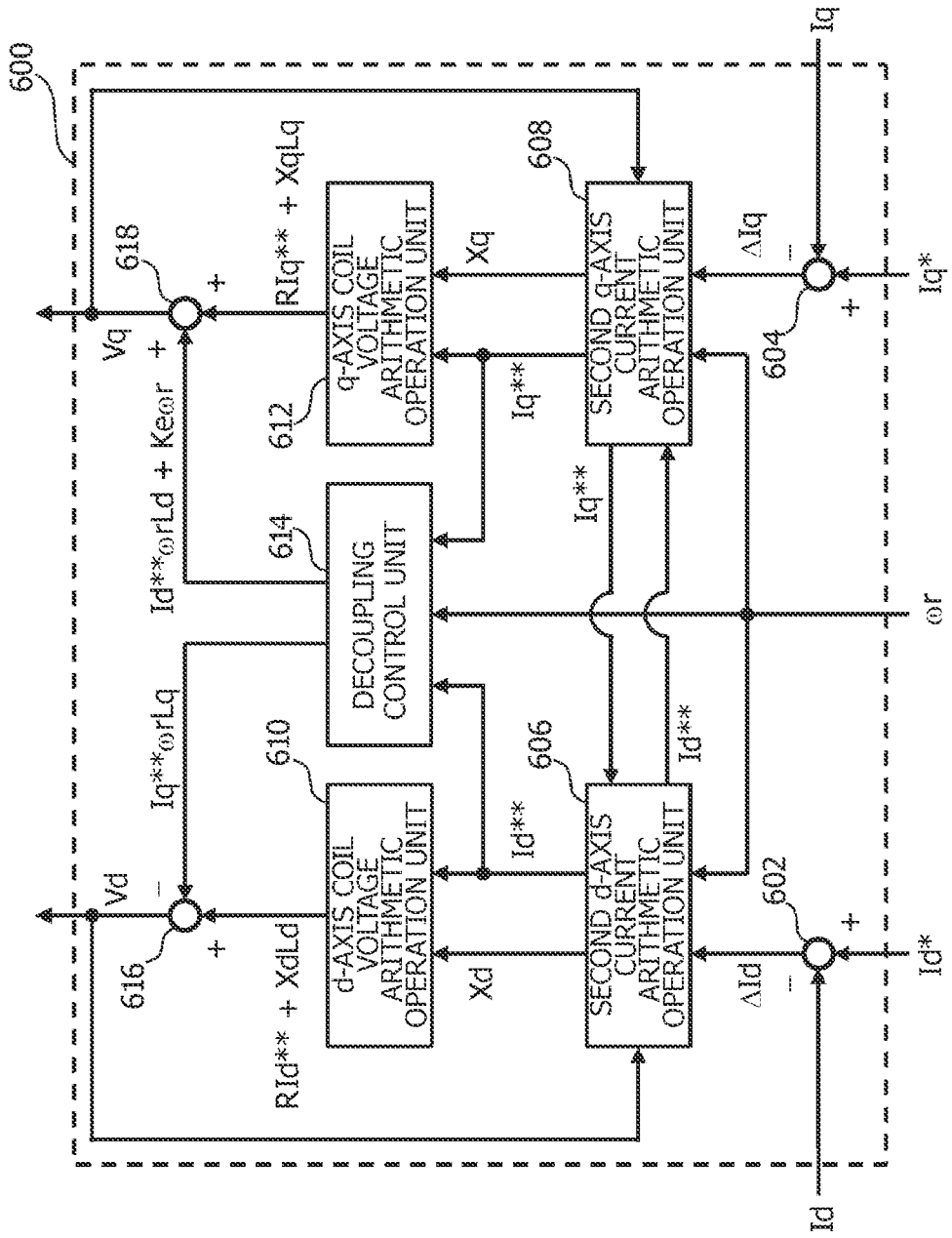
FIG. 14 is a configuration diagram illustrating an example of an internal configuration of a vector control unit in a motor control device according to a second embodiment.

Thus, according to the second embodiment, d(q)-axis voltage arithmetic operation unit 616 (618) outputs the d(q)-axis voltage command value Vd (Vq) obtained through the arithmetic operation to second d(q)-axis current arithmetic operation unit 606 (608) in order to improve stability of current control in the transient state illustrated in FIG. 13 (see FIG. 14). In addition to this, a low-pass filter processing unit 606E (608E) is provided between integral operation unit 606A (608A) and integration limiting unit 606D (608D) in second d(q)-axis current arithmetic operation unit 606 (608) (see FIG. 15). Although low-pass filter processing unit 606E of second d-axis current arithmetic operation unit 606 will be described below, the same applies to low-pass filter processing unit 608E of second q-axis current arithmetic operation unit 608.

Low-pass filter (hereinafter, also simply referred to as an "LPF") processing unit 606E executes filtering processing for smoothing a temporal change in $I_d^{}$ by allowing only frequency components of equal to or less than a predetermined frequency in d-axis integrated value $I_d^{}$ output from integral operation unit 606A to pass therethrough. Such filtering processing is executed by, for example, software. More specifically, LPF processing unit 606E receives an input of d-axis voltage command value $V_d$ obtained by d-axis voltage arithmetic operation unit 616 through an arithmetic operation and stores $V_d$ first. In other words, input $V_d$ is $V_d$ ($V_d$ previous value) obtained through an arithmetic operation in previous vector control processing. Then, LPF processing unit 606E compares an absolute value of the $V_d$ previous value with the d-axis voltage limit value $V_{dlmt}$, and when the absolute value of the $V_d$ previous value exceeds the d-axis voltage limit value $V_{dlmt}$ (=1.27×Ed/2), LPF processing unit 606E executes the filtering processing. In other words, LPF processing unit 606E (608E) executes the filtering processing when the output voltage of inverter 70 is saturated. In this manner, changes in d and q-axis integrated values $I_d^{}$ and $I_q^{}$ with time during the occurrence of the wind-up phenomenon in the overmodulation control are curbed.

On the other hand, LPF processing unit 606E does not execute the filtering processing when the absolute value of the $V_d$ previous value is equal to or less than the d-axis voltage limit value $V_{dlmt}$. In other words, d-axis integrated value $I_d^{**}$ is output as it is to integration limiting unit 606D when the voltage saturation state has not occurred and the wind-up phenomenon has not occurred.

According to controller 80 in the second embodiment, the temporal changes in d and q-axis integrated values $I_d^{}$ and $I_q^{}$ (that is, the d(q)-axis integrated value before limiting) are smoothed by LPF processing units 606E and 608E during the occurrence of the voltage saturation state. Also, controller 80 limits the d and q-axis integrated values $I_d^{}$ and $I_q^{}$ within a predetermined range similarly to the first embodiment. In this manner, it is possible to curb the temporal changes in $I_d^{}$ and $I_q^{}$ that accompany the superimposition of the high-frequency components on the d and q-axis current deviations $\Delta I_d$ and $\Delta I_q$ during the occurrence of the wind-up phenomenon in the overmodulation control while limiting $I_d^{}$ and $I_q^{}$ within the predetermined range. Also, since the d and q-axis voltage command values $V_d$ and $V_q$ are obtained through the arithmetic operation using $I_d^{}$ and $I_q^{}$ and the like with curbed temporal changes, it is possible to curb superimposition of voltage ripple on $V_d$ and $V_q$. Since further distortion of the waveforms of phase currents Iu, Iv, and Iw in the overmodulation control is curbed, distortion of the waveforms of the d and q-axis current detection values $I_d$ and $I_q$ is curbed. It is thus possible to improve stability of current control in the transient state until a desired motor rotation speed is obtained during occurrence of the wind-up phenomenon in the overmodulation control.

Figure 16:
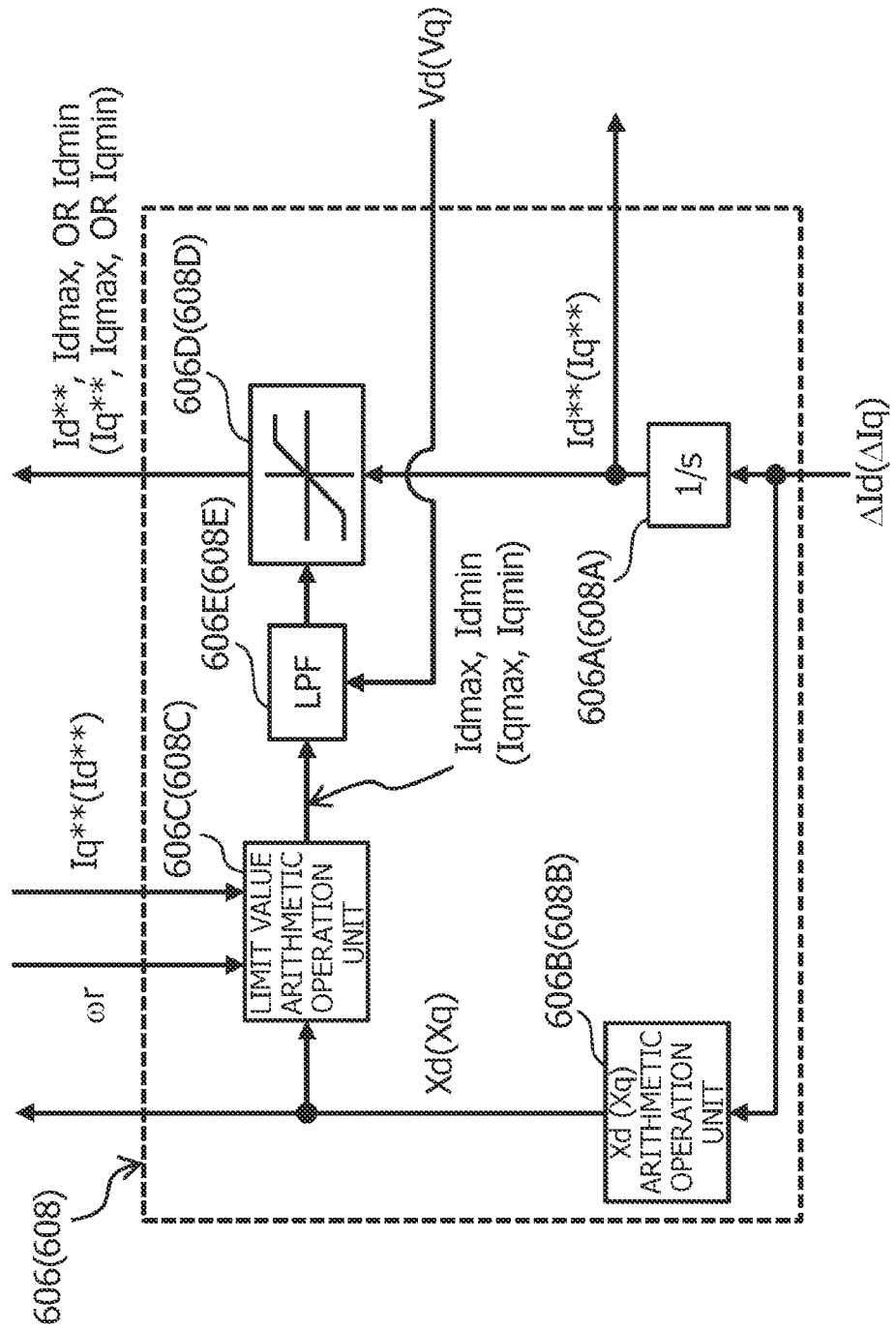
FIG. 16 is a diagram for explaining a first modification example of the second embodiment.

Here, LPF processing unit 606E (608E) is not limited to being provided between integral operation unit 606A (608A) and integration limiting unit 606D (608D). According to a first modification example of the second embodiment, LPF processing unit 606E (608E) may be provided between limit value arithmetic operation unit 606C (608C) and integration limiting unit 606D and (608D) as illustrated in FIG. 16, for example. In this case, temporal changes in the d(q)-axis integration upper limit value $I_{dmax}$ ($I_{qmax}$) and the d(q)-axis integration lower limit value $I_{dmin}$ ($I_{qmin}$) are smoothed. As is obvious from (Expression 3) to (Expression 6), $I_{dmax}$ ($I_{qmax}$) and $I_{dmin}$ ($I_{qmin}$) are affected by the d(q)-axis current deviation $\Delta I_d$ ($\Delta I_q$) with a high-frequency component superimposed thereon. Therefore, effects similar to those in the case in which the filtering processing is performed on the output of integral operation unit 606A (608A) is obtained by curbing the temporal changes in $I_{dmax}$ ($I_{qmax}$) and $I_{dmin}$ ($I_{qmin}$).

Figure 17:
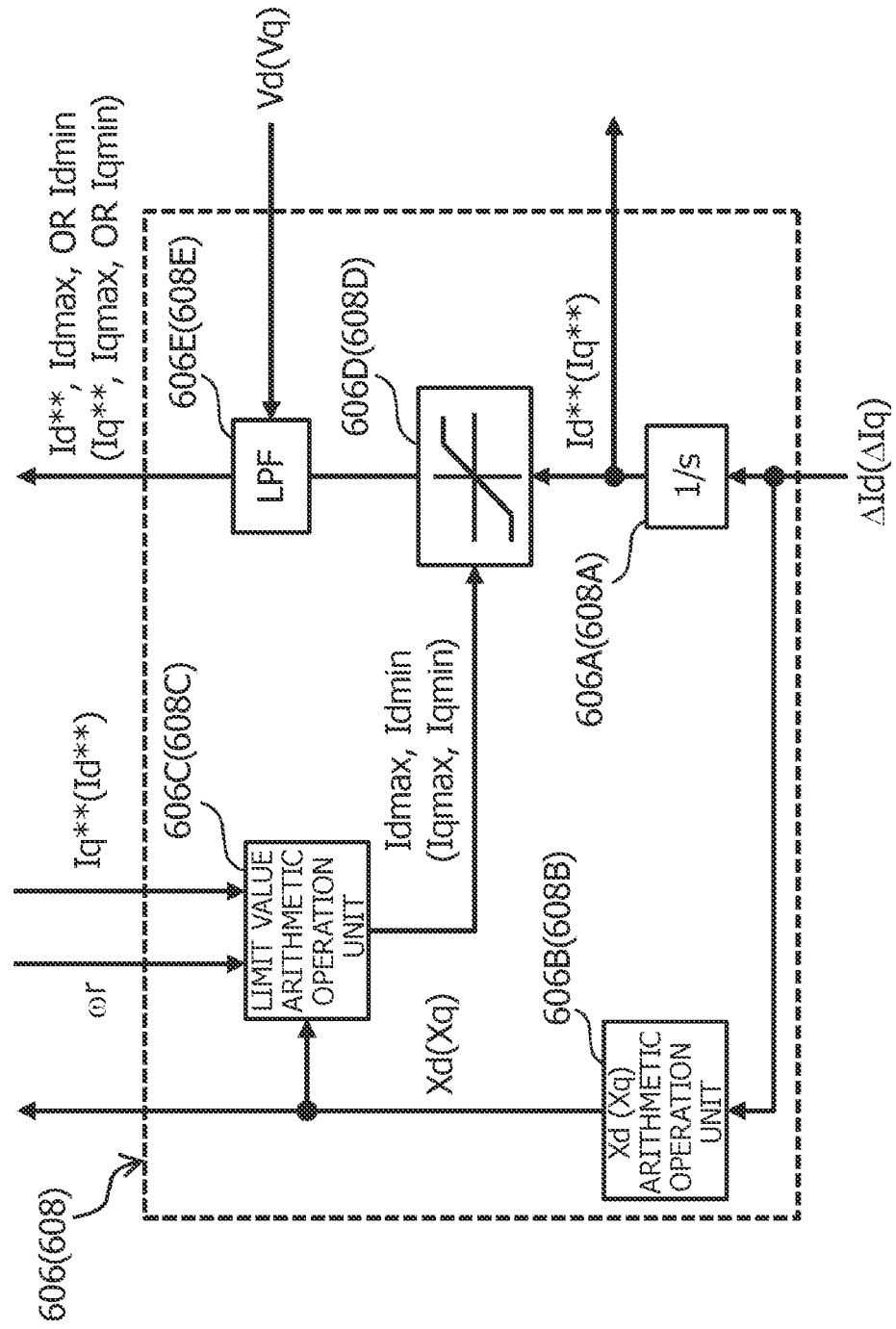
FIG. 17 is a diagram for explaining a second modification example of the second embodiment.

Also, according to a second modification example of the second embodiment, LPF processing unit 606E (608E) may be provided on the downstream side of integration limiting unit 606D (608D) as illustrated in FIG. 17, for example. In other words, according to the second modification example, the filtering processing is performed on the d and q-axis integrated values $I_d^{}$ and $I_q^{}$ obtained by integral operation units 606A and 608A through an arithmetic operation when $I_d^{}$ and $I_q^{}$ fall within the predetermined range. Also, when the d and q-axis integrated values $I_d^{}$ and $I_q^{}$ are outside the predetermined range, the filtering processing is performed on the d(q)-axis integration upper limit value $I_{dmax}$ ($I_{qmax}$) and the d(q)-axis integration lower limit value $I_{dmin}$ ($I_{qmin}$) (that is, the d(q)-axis integrated value after the limiting). Therefore, since the temporal changes in $I_d^{}$ ($I_q^{}$), $I_{dmax}$ ($I_{qmax}$), or $I_{dmin}$ ($I_{qmin}$) are smoothed in the second modification example as well, effects that are similar to those in the first modification example are obtained.

However, the invention is not limited to execution of only one kind of the aforementioned filtering processing. In other words, the filtering processing may be performed on the d(q)-axis integrated value before the limiting and the d(q)-axis integration upper and lower limit values or the d(q)-axis integrated value after the limiting. Also, the filtering processing may be performed on the d(q)-axis integration upper and lower limit values and the d(q)-axis integrated values after the limiting. Furthermore, the filtering processing may be performed on all of the d(q)-axis integrated values before the limiting, the d(q)-axis integration upper and lower limit values, and the d(q)-axis integrated values after the limiting.

Note that LPF processing unit 606E (608E) is not limited to execution of the filtering processing during occurrence of the wind-up phenomenon in the overmodulation control. The waveforms of phase currents Iu, Iv, and Iw start to be distorted after the overmodulation control is started. Thus, 1.15×Ed/2 may be used instead of $V_{dlmt}$ ($V_{qlmt}$) as the threshold value to be compared with the absolute value of the $V_d$ previous value ($V_q$ previous value), for example. In other words, LPF processing unit 606E (608E) may execute the filtering processing when the absolute value of the $V_d$ previous value ($V_q$ previous value) exceeds 1.15×Ed/2, that is, during the execution of the overmodulation control.

Figure 15:
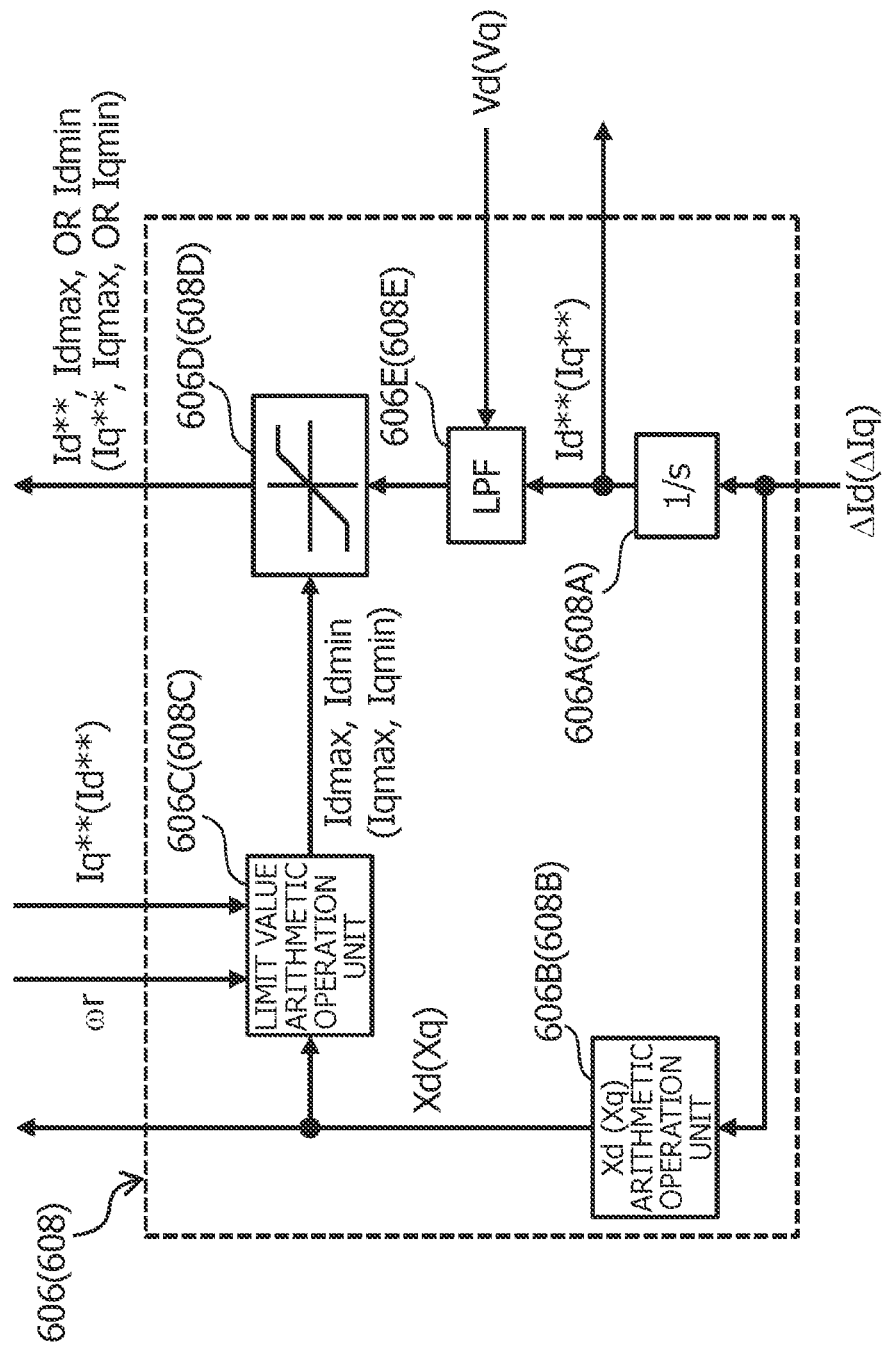
FIG. 15 is a configuration diagram illustrating an example of an internal configuration of a second command current arithmetic operation unit according to the second embodiment.

In the second embodiment, LPF processing unit 606E (608E) is provided as illustrated in FIGS. 15 to 17, and the filtering processing is thereby performed on the d and q-axis integrated values $I_d^{}$ and $I_q^{}$ or the d and q-axis integration upper and lower limit values $I_{dmax}$, $I_{dmin}$, $I_{qmax}$, and $I_{qmin}$. In this manner, superimposition of voltage ripple on the d and q-axis voltage command values $V_d$ and $V_q$ is curbed, and distortion of the waveforms of phase currents Iu, Iv, and Iw is curbed. However, the present invention is not limited thereto, and it is possible to curb the voltage ripple of the d and q-axis voltage command values $V_d$ and $V_q$ without providing LPF processing unit 606E (608E) in a third modification example of the second embodiment, which will be described below.

Figure 18:
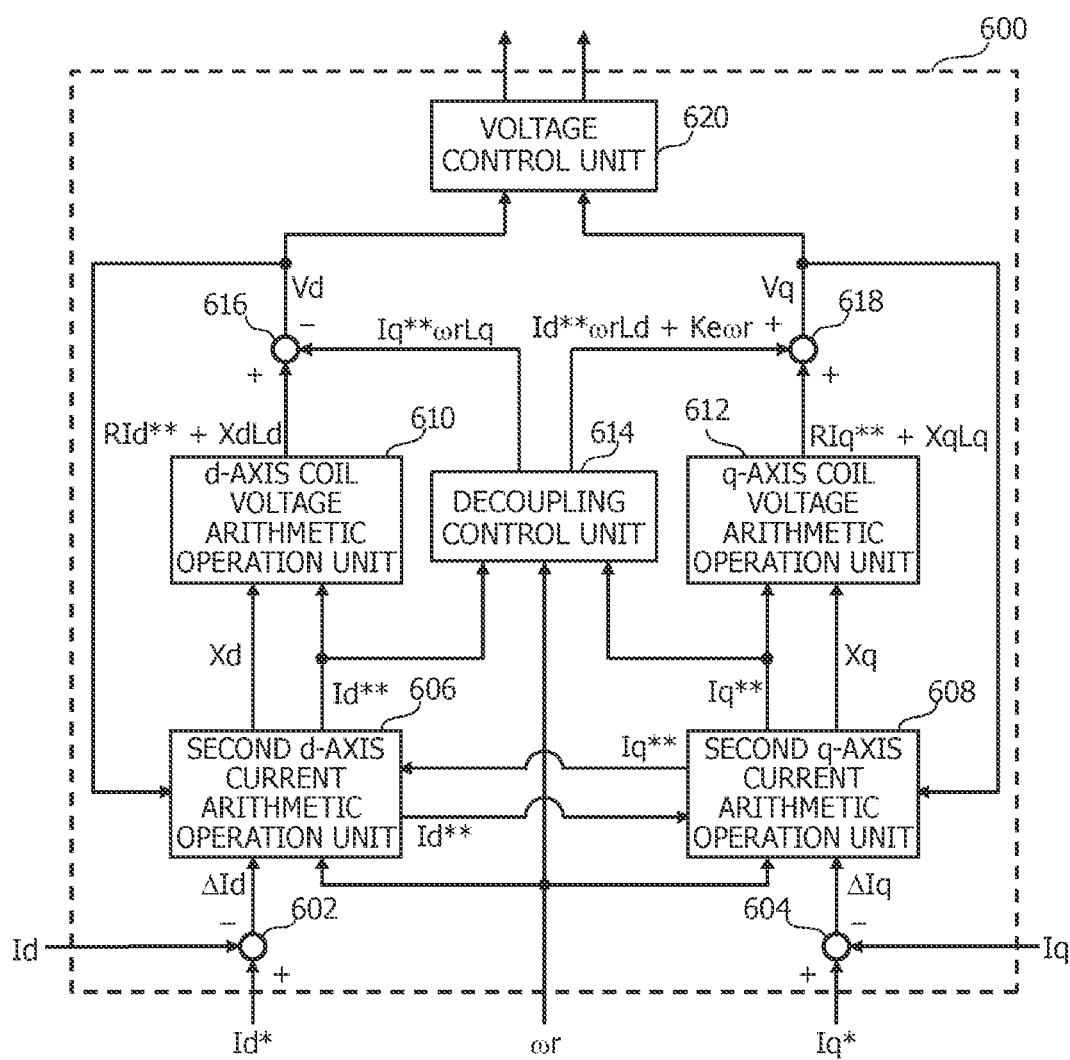
FIG. 18 is a diagram for explaining a third modification example of the second embodiment.

According to the third modification example, a voltage limiting unit 620 is provided on the most downstream side of vector control unit 600 as illustrated in FIG. 18. Voltage limiting unit 620 is adapted to compare each of the d and q-axis voltage command values $V_d$ and $V_q$ obtained by d and q-axis voltage arithmetic operation units 616 and 618 through the arithmetic operation with the d and q-axis voltage limit values $V_{dlmt}$ and $V_{qlmt}$ (=1.27×Ed/2).

Voltage limiting unit 620 outputs $V_q$ as it is when the q-axis voltage command value $V_q$ is equal to or less than the q-axis voltage upper limit value $V_{qmax}$ or equal to or greater than the q-axis voltage lower limit value $V_{qmin}$, for example. On the other hand, voltage limiting unit 620 outputs $V_{qmax}$ or $V_{qmin}$ as the d and q-axis voltage command values when $V_q$ exceeds $V_{qmax}$ or is less than $V_{qlmt}$.

In short, vector control unit 600 is caused to output $V_q$ that is equal to or less than $V_{qmax}$ and equal to or greater than $V_{qmin}$ by voltage limiting unit 620. Therefore, it is possible to cause $V_{qmax}$ or $V_{qmin}$, which is the q-axis applied voltage $V_q^*$ saturated during the occurrence of the wind-up phenomenon in the overmodulation control, to coincide with the output result of vector control unit 600. In other words, controller 80 controls inverter 70 on the basis of the d and q-axis voltage upper limit values $V_{dmax}$ and $V_{qmax}$ when $V_d$ and $V_q$ exceed $V_{dmax}$ and $V_{qmax}$. Also, controller 80 controls inverter 70 on the basis of the d and q-axis voltage lower limit values $V_{dmin}$, and $V_{qmin}$ when $V_d$ and $V_q$ are below $V_{dmin}$ and $V_{qmin}$.

Figure 19:
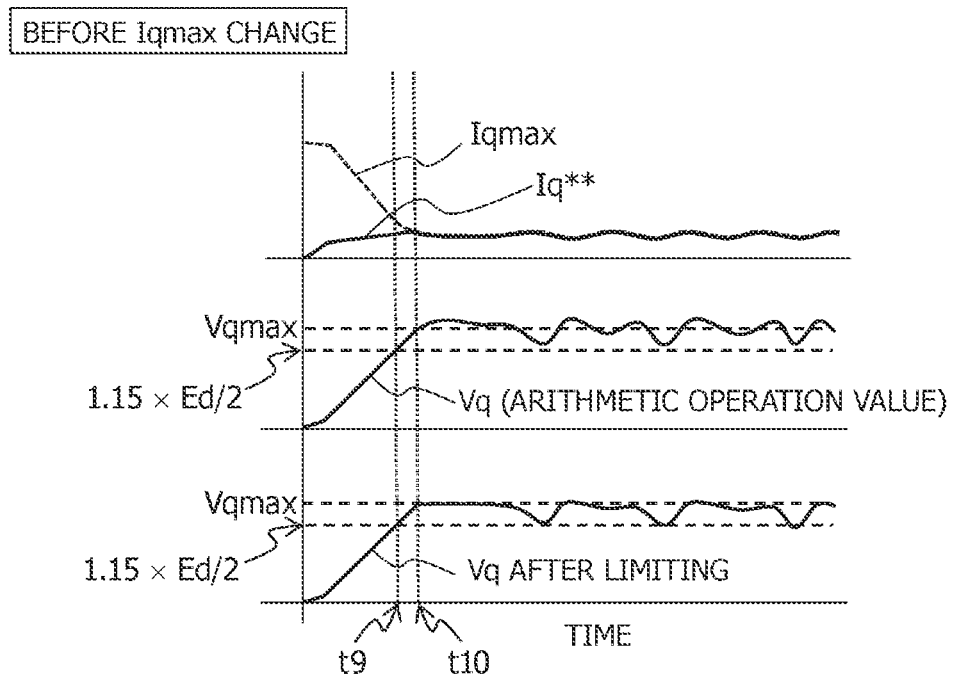
FIG. 19 is a time chart illustrating an example of a result of control before an integration limit value is changed.

However, even when voltage limiting unit 620 is provided, there is a concern that voltage ripple may be superimposed on the d and q-axis voltage command values $V_d$ and $V_q$ as will be described below. For example, it is assumed that $V_q$ exceeding 1.15×Ed/2, for example, is obtained through an arithmetic operation at a clock time t9, and overmodulation control is started as illustrated in FIG. 19. It is also assumed that $V_q$ exceeding the q-axis voltage upper limit value $V_{qmax}$ is obtained through an arithmetic operation at a clock time t10, and the wind-up phenomenon occurs. In this case, the waveform of the q-axis current detection value $I_q$ starts to be distorted, and a high-frequency component is superimposed on the q-axis current deviation $\Delta I_q$. Here, although the q-axis integrated value $I_q^{**}$ is limited to the q-axis integration upper limit value $I_{qmax}$, such voltage ripple that vibrates on both positive and negative sides around $V_{qmax}$ at the center is superimposed on $V_q$, which is an arithmetic operation value, with the distortion of the waveform of $I_q$ and the superimposition of the high-frequency component on $\Delta I_q$. Although $V_q$ exceeding $V_{qmax}$ is prevented from being output from vector control unit 600 by voltage limiting unit 620, there is a concern that the voltage ripple may be superimposed on the waveform of $V_q$ after the limiting performed by voltage limiting unit 620 at $V_{qmax}$ or less (see FIG. 19).

Thus, according to the third modification example, the predetermined range defined by the d(q)-axis integration upper limit value $I_{dmax}$ ($I_{qmax}$) and the d(q)-axis integration lower limit value $I_{dmin}$ ($I_{qmin}$) is corrected to be widened, in addition to the provision of voltage limiting unit 620. More specifically, according to the third modification example, limit value arithmetic operation unit 606C (608C) is configured to correct the predetermined range by increasing $I_{dmax}$ ($I_{qmax}$) obtained through the arithmetic operation by a first predetermined value α and reducing $I_{dmax}$ ($I_{qmin}$) obtained through the arithmetic operation by the first predetermined value α.

Figure 20:
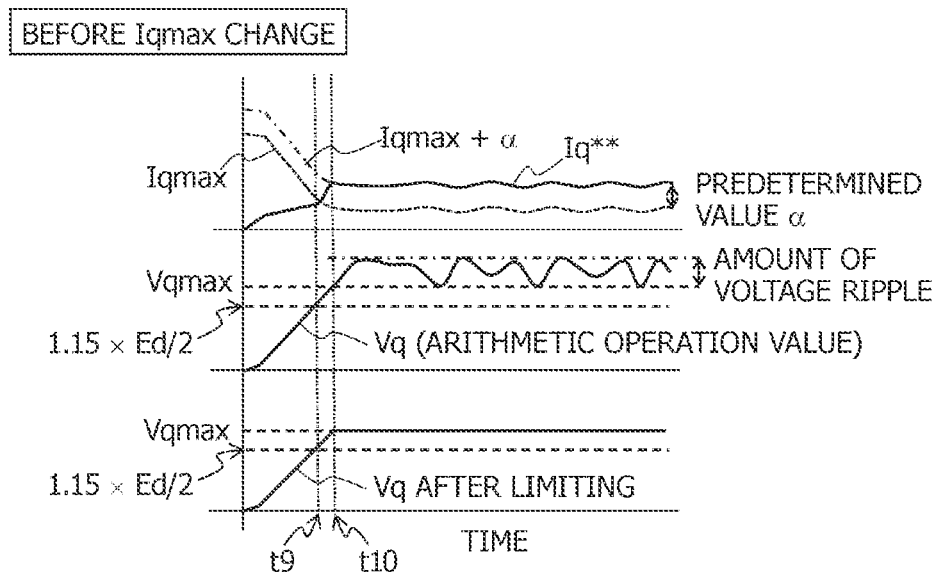
FIG. 20 is a time chart illustrating an example of a result of control after the integration limit value is changed.

For example, FIG. 20 illustrates a case in which limit value arithmetic operation unit 608C for the q-axis integration upper and lower limit values adds the first predetermined value α to $I_{qmax}$. In other words, $I_{qmax}$ has increased by the first predetermined value α as compared with $I_{qmax}$ before the change (FIG. 19) in FIG. 20. In this manner, $I_{qmax}+α$ is determined as the q-axis integrated value when the q-axis integrated value $I_q^{**}$ obtained by integral operation unit 608A through the arithmetic operation exceeds $I_{qmax}+α$. Therefore, the q-axis voltage command value $V_q$ obtained through the arithmetic operation using $I_{qmax}+\alpha$ is a value that is greater than that in a case in which the q-axis integrated value is limited by $I_{qmax}$. $V_q$ is equal to or greater than the q-axis voltage upper limit value $V_{qmax}$ and has a waveform with voltage ripple superimposed thereon depending on adjustment of the first predetermined value $\alpha$ (see FIG. 20). Also, since $V_q$ is limited to $V_{qmax}$ by voltage limiting unit 620, $V_q$ after the limiting becomes a constant value ($V_{qmax}$).

In regard to setting of the first predetermined value $\alpha$, the amount of voltage ripple of the d and q-axis voltage command values $V_d$ and $V_q$ during occurrence of the wind-up phenomenon ($V_d$ and $V_q$ in the voltage saturation state) is measured in advance through an actual machine test, for example, first. Here, the amount of voltage ripple is a difference between $V_d$ and $V_q$ obtained through the arithmetic operation and the d and q-axis voltage limit values $V_{dlmt}$ and $V_{qlmt}$, and more specifically, a difference between the peak of $V_q$ illustrated in FIG. 20 and $V_{qmax}$. Also, the first predetermined value $\alpha$ is preferably set to be equal to or greater than a value obtained by dividing the amount of voltage ripple measured in advance by the resistance setting value R ($\alpha \geq$ the amount of voltage ripple/R). In other words, the amount of voltage ripple/R is a lower limit value that can be set as the first predetermined value $\alpha$. In short, controller 80 corrects the predetermined range obtained in accordance with (Expression 3) to (Expression 6) (that is, the predetermined range obtained through the arithmetic operations) to be widened, in consideration of the difference between the d and q-axis voltage command values obtained through the arithmetic operation and the d and q-axis voltage limit values.

Also, since the predetermined range becomes wide as the first predetermined value $\alpha$ is caused to increase, the d and q-axis integrated values increase or decreases as compared with those before the predetermined range is widened. Therefore, response of current control after the command change (after the wind-up phenomenon) is delayed as mentioned in the first embodiment. Therefore, a relationship between the first predetermined value $\alpha$ and a response delay time may be inspected in advance in an actual machine test, for example, and the upper limit value that can be set as the first predetermined value $\alpha$ may be set in consideration of an allowable response delay time.

In this manner, it is possible to cause the d and q-axis voltage command values $V_d$ and $V_q$ that are equal to or greater than $V_{dmax}$ and $V_{qmax}$ and equal to or less than $V_{dmin}$ and $V_{qmin}$, and have waveforms with voltage ripple superimposed thereof, to be obtained through the arithmetic operation, by widening the predetermined range for the d and q-axis integrated values. It is thus possible by voltage limiting unit 620 to set $V_d$ and $V_q$ after the limiting to be constant values with no voltage ripple. In short, it is possible to curb the superimposition of voltage ripple on $V_d$ and $V_q$ by widening the predetermined range in addition to the provision of voltage limiting unit 620. It is thus possible to curb further generation of distortion of the waveforms of phase currents Iu, Iv, and Iw during the occurrence of the wind-up phenomenon in the overmodulation control. Therefore, it is possible to improve stability of current control similarly to the case in which LPF processing units 606E and 608E are provided.

Incidentally, the wind-up phenomenon in the overmodulation control occurs when the d(q)-axis voltage command value $V_d$ ($V_q$) exceeding $V_{dmax}$ ($V_{qmax}$) ($=+1.27\times$Ed/2) or $V_d$ ($V_q$) that is less than $V_{dmin}$ ($V_{qmin}$) ($=-1.27\times$Ed/2) is obtained through the arithmetic operation as described above. This means that the d and q-axis voltage command values $V_d$ and $V_q$ that are equal to or greater than $+1.15\times$Ed/2 or equal to or less than $-1.15\times$Ed/2 are obtained through the arithmetic operation, that is, $V_d$ and $V_q$ falling within the overmodulation control region is allowed without any limitations. This is one of the reasons for the occurrence of distortion of the waveform of the q-axis current detection value $I_q$ as illustrated in FIG. 13.

Figure 21:
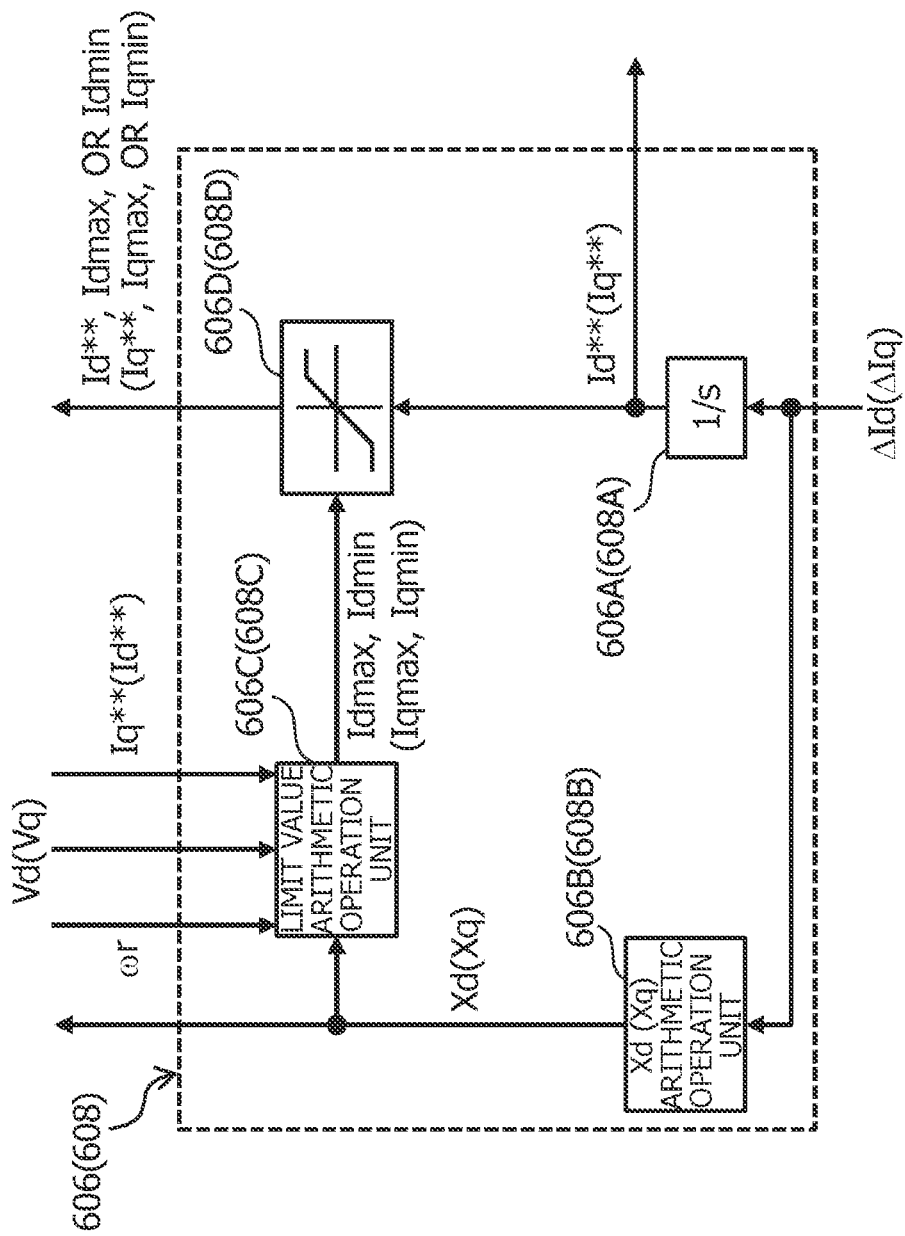
FIG. 21 is a configuration diagram illustrating an example of an internal configuration of a second d(q)-axis current arithmetic operation unit according to a third embodiment.

Thus, controller 80 according to a third embodiment is adapted such that the d and q-axis voltage command values $V_d$ and $V_q$ gradually fall within the overmodulation control region. To do so, voltage limiting unit 620 that is similar to the one in the third modification example of the second embodiment is provided on the most downstream side of vector control unit 600 first (see FIG. 18). Also, $V_d$ and $V_q$ obtained by d and q-axis voltage arithmetic operation units 616 and 618 through arithmetic operations, respectively, are input to limit value arithmetic operation units 606C and 698C as illustrated in FIG. 21.

Although voltage limiting unit 620 is basically similar to that described in the aforementioned third modification example, voltage limiting unit 620 in the third embodiment can change, with time, the d and q-axis voltage limit values $V_{dlmt}$ and $V_{qlmt}$ to be compared with the d and q-axis voltage command values $V_d$ and $V_q$. More specifically, the range of the change in $V_{dlmt}$ and $V_{qlmt}$ is defined by a first limit value that is smaller than $1.15\times$Ed/2, which is the lower limit value of the overmodulation control region, and a second limit value that is greater than $1.15\times$Ed/2. The first limit value is for defining the lower limit value of $V_{dlmt}$ ($V_{qlmt}$) and is set to, for example, Ed/2. Also, the second limit value is for defining the upper limit value of $V_{dlmt}$ and $V_{qlmt}$ and is set to, for example, $1.27\times$Ed/2, which is the upper limit value of the overmodulation control region.

The d and q-axis voltage limit values $V_{dlmt}$ and $V_{qlmt}$ are changed as follows, for example. Although the second q-axis current arithmetic operation unit 608 will be mainly described below, the same applies to the second d-axis current arithmetic operation unit 606. In the third embodiment, limit value arithmetic operation unit 608C of second q-axis current arithmetic operation unit 608 compares the q-axis voltage command value $V_q$ obtained through the arithmetic operation in the previous vector control, that is, the $V_q$ previous value with $V_{qlmt}$ first. Here, an initial value of $V_{qlmt}$ is set to the first limit value. In a case in which limit value arithmetic operation unit 608C determines that an absolute value of the $V_q$ previous value exceeds $V_{qlmt}$, voltage limiting unit 620 outputs the first limit value instead of the $V_q$ previous value in the previous vector control. In other words, a voltage saturation state in which the q-axis applied voltage $V_q^*$ is saturated at the first limit value has occurred. Also, limit value arithmetic operation unit 608C causes $V_{qlmt}$ to increase from the first limit value toward the second limit value by a second predetermined value when the absolute value of the $V_q$ previous value exceeds $V_{qlmt}$. $V_{qlmt}$ of voltage limiting unit 620 is adapted to change in conjunction with an increase in $V_{qlmt}$ in limit value arithmetic operation unit 608C. Therefore, voltage limiting unit 620 compares the $V_q$ present value with $V_{qlmt}$ after the increase in the present vector control. In this manner, when the $V_q$ present value exceeds $V_{qlmt}$ after the increase, $V_{qlmt}$ after the increase is output, and the voltage saturation state in which the q-axis applied voltage $V_q^*$ is saturated at $V_{qlmt}$ after the increase is continued. Thereafter, the change in $V_{qlmt}$ ends when the $V_q$ previous value continuously exceeds $V_{qlmt}$ after the increase and $V_{qlmt}$ becomes equal to the second limit value in limit value arithmetic operation unit 608C.

In short, limit value arithmetic operation unit 606C (608C) causes absolute values of $V_{dmax}$ ($V_{qmax}$) and $V_{dmin}$ ($V_{qmin}$) to increase by the second predetermined value toward the second limit value using the first limit value as an initial value every time the d(q)-axis voltage command value $V_d$ ($V_q$) obtained through the arithmetic operation exceeds the d(q)-axis voltage upper limit value $V_{dmax}$ ($V_{qmax}$). Similarly, the absolute values of $V_{dmax}$ ($V_{qmax}$) and $V_{dmin}$ ($V_{qmin}$) increase by the second predetermined value toward the second limit value using the first limit value as an initial value every time $V_d$ and $V_q$ obtained through the arithmetic operation are below the d(q)-axis voltage lower limit values $V_{dmin}$ ($V_{qmin}$). In this manner, it is possible to cause $V_d$ ($V_q$) to be finally saturated at the second limit value with $V_d$ ($V_q$) caused to be saturated at $V_{dmax}$ ($V_{qmax}$) that has been caused to increase or $V_{dmin}$ ($V_{qmin}$) that has been reduced, until the maximum rotation speed of motor 60 in the overmodulation control illustrated in FIG. 13 is obtained. In other words, $V_d$ ($V_q$), which are the results of the arithmetic operation performed by vector control unit 600, are caused to be saturated at $V_{dlmt}$ ($V_{qlmt}$) to which $V_d$ ($V_q$) is to be changed, until the output voltage of inverter 70 is saturated and the wind-up phenomenon in the overmodulation control occurs. This enables $V_d$ ($V_q$) to gradually enter the overmodulation control region. On the other hand, limit value arithmetic operation unit 606C (608C) maintains $V_{dmax}$ ($V_{qmax}$) and $V_{dmin}$ ($V_{min}$) as they are when $V_d$ ($V_q$) obtained through the arithmetic operation is equal to or greater than $V_{dmin}$ ($V_{qmin}$) and equal to or less than $V_{dmax}$ ($V_{qmax}$).

Figure 22:
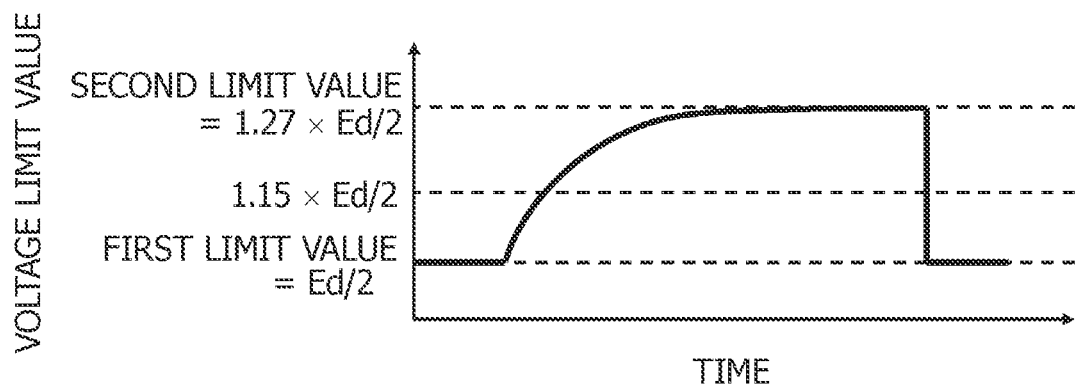
FIG. 22 is a time chart illustrating an example of a temporal change in voltage limit value according to the third embodiment.
Figure 23:
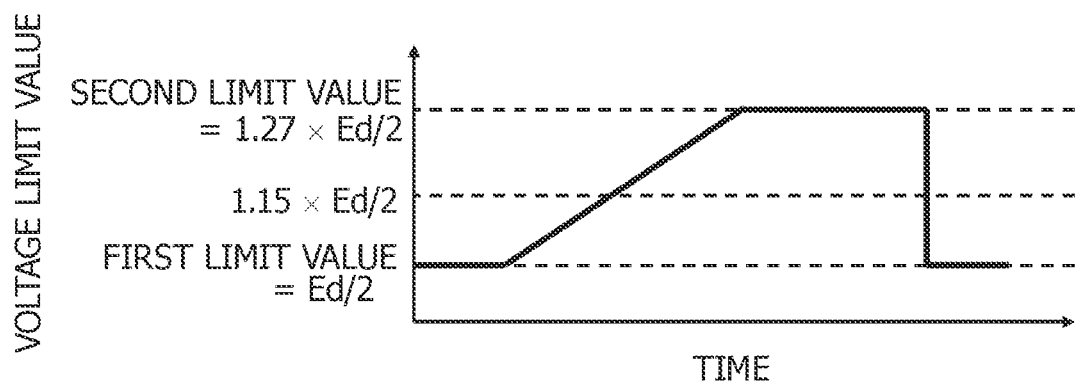
FIG. 23 is a time chart illustrating another example of the temporal change in the voltage limit value.

The d(q)-axis voltage limit value $V_{dlmt}$ ($V_{qlmt}$) may be caused to increase to have a temporal change with a predetermined time constant from the first limit value (=Ed/2) toward the second limit value (=1.27×Ed/2) through 1.15× Ed/2 as illustrated in FIG. 22, for example. As the predetermined time constant, a time constant in consideration of a time constant (=inverses $\omega_{cdACR}^{-1}$ and $\omega_{cdACR}^{-1}$ of the d and q-axis control response angular frequencies) of controller 80 (current control performed by vector control unit 600) is employed. For example, the predetermined time constant may be about four times the time constant of controller 80. However, $V_{dlmt}$ ($V_{qlmt}$) are not limited thereto and may be changed to vary in proportion to the time as illustrated in FIG. 23, for example. More specifically, a temporal change rate (inclination) of $V_{dlmt}$ ($V_{qlmt}$) with which the d and q-axis current detection value $I_d$ and $I_q$ do not become unstable while the change in $V_{dlmt}$ ($V_{qlmt}$) from the first limit value to the second limit value is obtained in advance in an actual machine test or the like. Then, $V_{dlmt}$ ($V_{qlmt}$) may be caused to increase with a temporal change with the preset inclination (obtained inclination). Note that the d and q-axis voltage lower limit values $V_{dmin}$ and $V_{qmin}$ are equivalent to $-V_{dlmt}$ and $-V_{qlmt}$ and decrease as $V_{dlmt}$ and $V_{qlmt}$ increase as illustrated in FIGS. 22 and 23.

Also, since the d(q)-axis voltage command value $V_d$ ($V_q$) is caused to be saturated at the d(q)-axis voltage limit value $V_{dlmt}$ ($V_{qlmt}$) after the change as described above, a wind-up phenomenon in which the d(q)-axis current deviation $\Delta I_d$ ($\Delta I_q$) does not become zero occurs. Therefore, the d(q)-axis integrated value $I_d^{}$ ($I_q^{}$) excessively increases or decreases. Thus, according to the third embodiment, limit value arithmetic operation unit 606C (608C) uses $V_{dlmt}$ ($V_{qlmt}$) changed or maintained to obtain the d(q)-axis integration upper and lower limit values $I_{dmax}$ ($I_{qmax}$) and $I_{dmin}$ ($I_{qmin}$). In this manner, the predetermined range is also changed with the change in $V_{dlmt}$ ($V_{qlmt}$). When $I_q^{**}$ exceeds $I_{qmax}$ obtained through an arithmetic operation using $V_{qlmt}$ after the change, for example, $I_{qmax}$ becomes the q-axis integrated value. Therefore, it is also possible to curb an excessive change in d(q)-axis integrated value when the d(q)-axis voltage command value $V_d$ ($V_q$) is caused to increase while being saturated. In this manner, the d(q)-axis voltage limit value that is changed depending on a time is used to perform the arithmetic operation for the d(q)-axis integration upper and lower limit values $I_{dmax}$ ($I_{qmax}$) and $I_{dmin}$($I_{qmin}$). In other words, $V_{dmax}$, $V_{qmax}$, $V_{dmin}$, and $V_{qmin}$ in (Expression 3) to (Expression 8) are changed to the voltage limit values with the element of the time t added thereto, that is, the changed or maintained d and q-axis voltage limit values ($V_{dmax,t}$, $V_{qmax,t}$, $V_{dmin,t}$, and $V_{qmin,t}$) in the third embodiment.

Effects and advantages of controller 80 according to the third embodiment described above will be described with reference to FIGS. 24 and 25.

Figure 24:
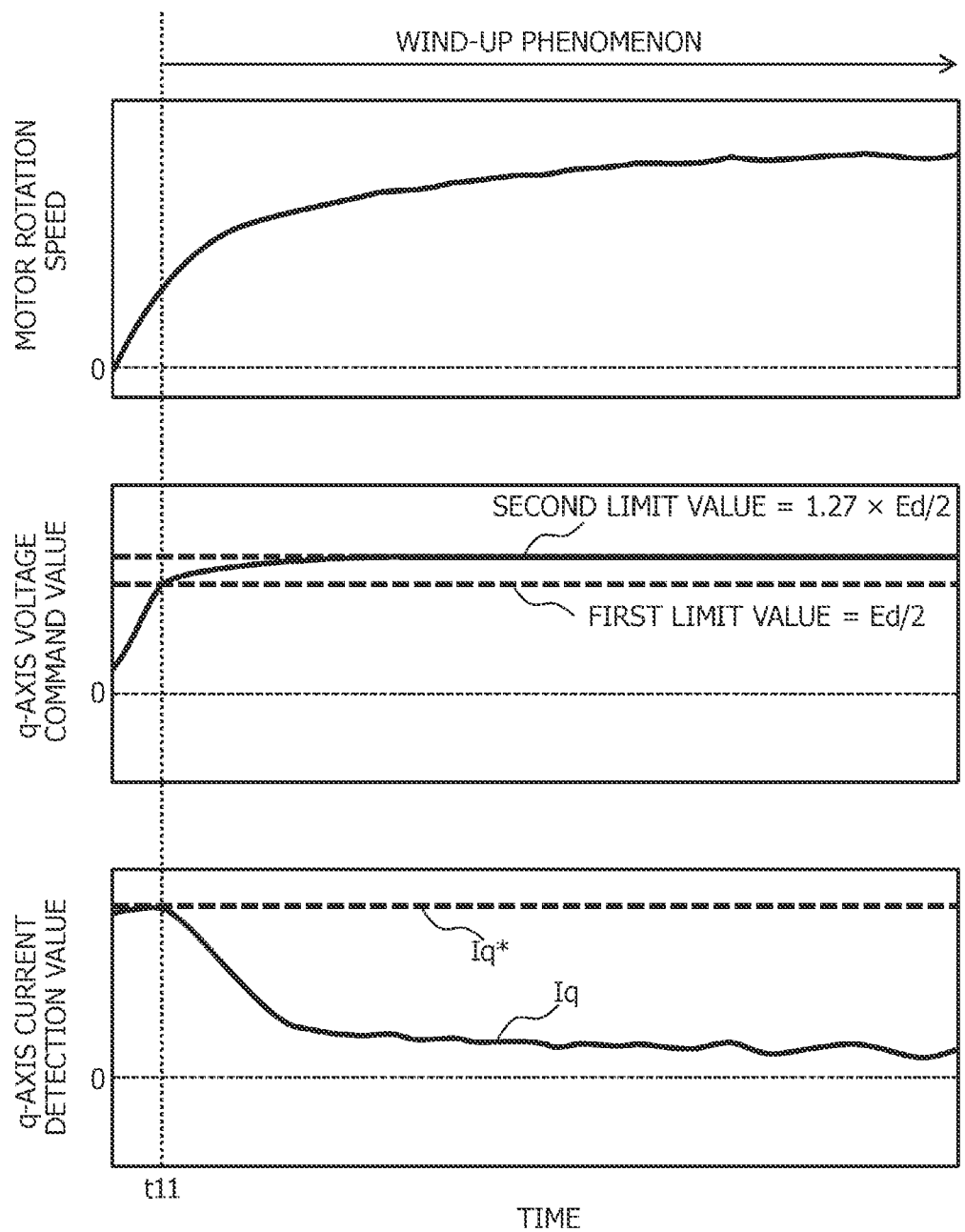
FIG. 24 is a time chart illustrating an example of a result of control according to the third embodiment.

In FIG. 24, vector control unit 600 performs an arithmetic operation for the q-axis voltage command value $V_q$ exceeding the first limit value at clock time t11. In this case, $V_q$ is limited to the first limit value, a voltage saturation state in which the q-axis applied voltage $V_q^*$ is saturated at the first limit value is caused, and the wind-up phenomenon occurs. Therefore, the d and q-axis voltage limit values $V_{dlmt}$ and $V_{qlmt}$ used to perform an arithmetic operation for the integration limit values and to determine the voltage command values after clock time t11 are changed to values increasing from the first limit value by the second predetermined value. Note that in FIG. 24, $V_{qlmt}$ and $V_{qlmt}$ are assumed to be changed in accordance with FIG. 22. Thereafter, if $V_q$ obtained through the arithmetic operation continuously exceeds $V_{qlmt}$, $V_q$ output from vector control unit 600 exhibits a temporal change that is similar to the increase in $V_{qlmt}$. In this manner, $V_q$ reaches the second limit value while being saturated at $V_{qlmt}$ after the increase.

Figure 25:
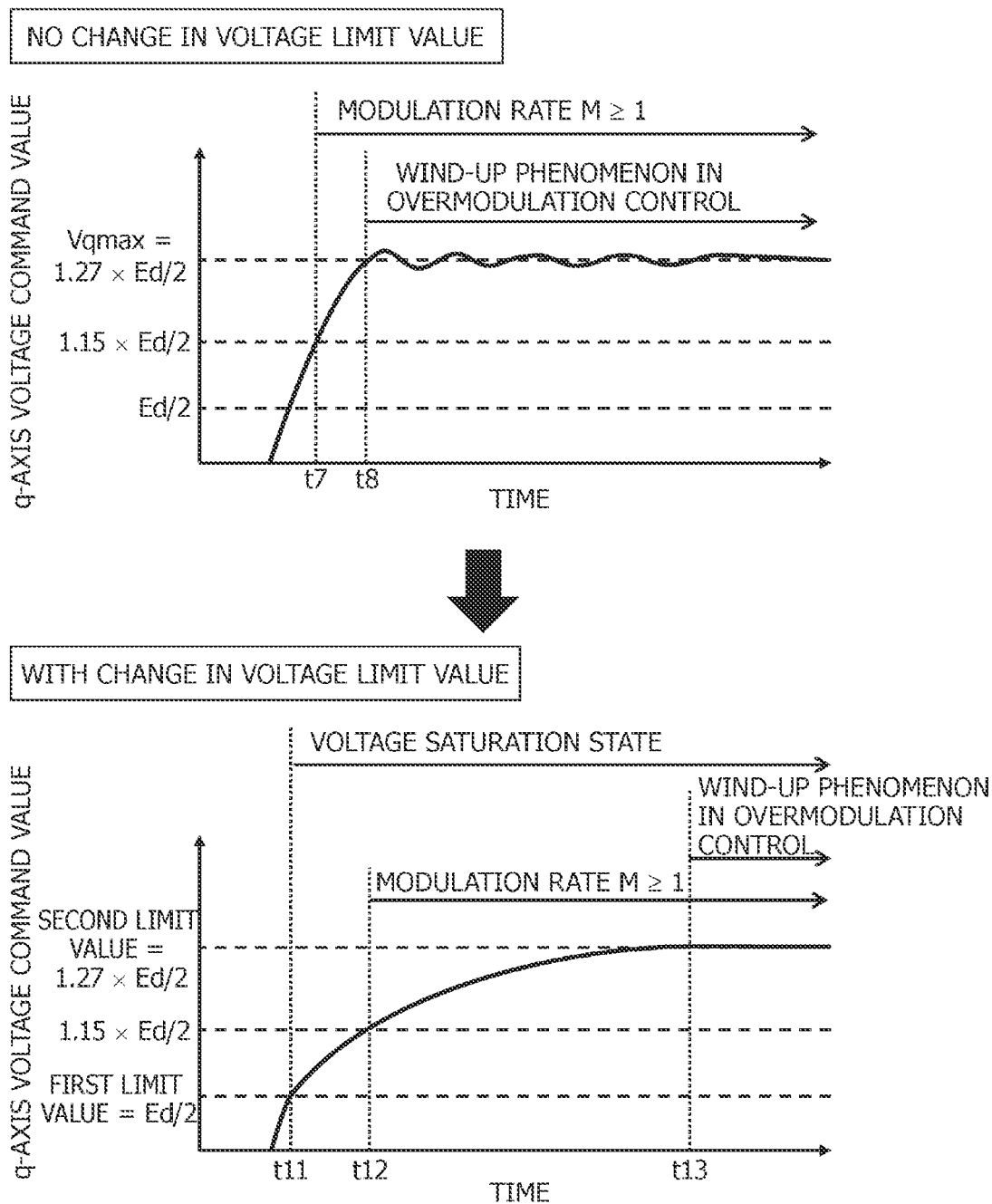
FIG. 25 is a diagram for comparing the result of control with the result of control illustrated in FIG. 13.

More specifically, it is possible to execute the overmodulation control with the voltage saturation state in which the q-axis voltage command value $V_q$ is saturated at the q-axis voltage upper limit value $V_{qmax}$ that is changed along time being caused and to cause the wind-up phenomenon in the overmodulation control at and after clock time t11. It is thus possible to curb sudden occurrence of the wind-up phenomenon in the overmodulation control. In this regard, description will be given with reference to FIG. 25 in which the control result of the overmodulation control (with no change in voltage limit values) illustrated in FIG. 13 is compared with the control result in the third embodiment (with a change in voltage limit values). In FIG. 25, in a case in which the voltage limit values are not changed, the overmodulation control is executed at clock time t7, and then the wind-up phenomenon in the overmodulation control occurs at clock time t8. On the other hand, in a case in which the voltage limit values are changed, $V_q$ is saturated at the first limit value at clock time t11 first. Thereafter, the overmodulation control is executed at a clock time t12, and the wind-up phenomenon in the overmodulation control occurs at a clock time t13. In other words, it is possible to ascertain that the occurrence of the wind-up phenomenon in the overmodulation control can be temporally delayed in the case in which the voltage limit values are changed as compared with the case in which the voltage limit values are not changed. Also, $V_q$ changes with a change in voltage limit value ($V_{qmax}$) after the voltage saturation state is caused at clock time t11 in the case in which the voltage limit values are changed. Therefore, it is possible to allow $V_q$ to gradually enter the overmodulation control region and thereby to temporally delay the execution of the overmodulation control as well. In particular, it is possible to extend the time until the wind-up phenomenon occurs after the execution of the overmodulation control to be long enough to curb further distortion of the waveforms of phase currents Iu, Iv, and Iw in the case in which the voltage limit values are changed as compared with the case in which the voltage limit values are not changed (see FIG. 25).

In this manner, according to controller 80 in the third embodiment, $V_{dlmt}$ and $V_{qlmt}$ are changed to gradually increase when the arithmetic operation for such d and q-axis voltage command values $V_d$ and $V_q$ that require the overmodulation control and the occurrence of the wind-up phenomenon are performed. In this manner, the overmodulation control is executed with $V_d$ and $V_q$ being caused to be saturated at $V_{dlmt}$ and $V_{qlmt}$ that is gradually changed until the wind-up phenomenon in the overmodulation control occurs. In other words, since $V_d$ and $V_q$ gradually enter the overmodulation region while being limited, further distortion of the waveforms of phase currents Iu, Iv, and Iw is curbed, and distortion of the waveforms of the d and q-axis current detection values is and $I_q$ can be curbed. It is thus possible to improve stability of current control in the transient state until a desired motor rotation speed is obtained during the occurrence of the wind-up phenomenon in the overmodulation region.

Also, the third embodiment and the second embodiment described above may be combined. Hereinafter, vector control processing that controller 80 according to a fourth embodiment, which is a combination of the second embodiment and the third embodiment, will be described with reference to FIGS. 26 to 29. Note that FIGS. 26 to 29 illustrate vector control processing in a case in which LPF processing unit 606E (608E) is provided between integral operation unit 606A (608A) and integration limiting unit 606D (608D) (see FIG. 15). Therefore, the d(q)-axis voltage command value $V_d$ ($V_q$) obtained by d(q)-axis voltage arithmetic operation unit 616 (618) through an arithmetic operation is output to limit value arithmetic operation unit 606C (608C) and LPF processing unit 606E (608E).

Figure 26:
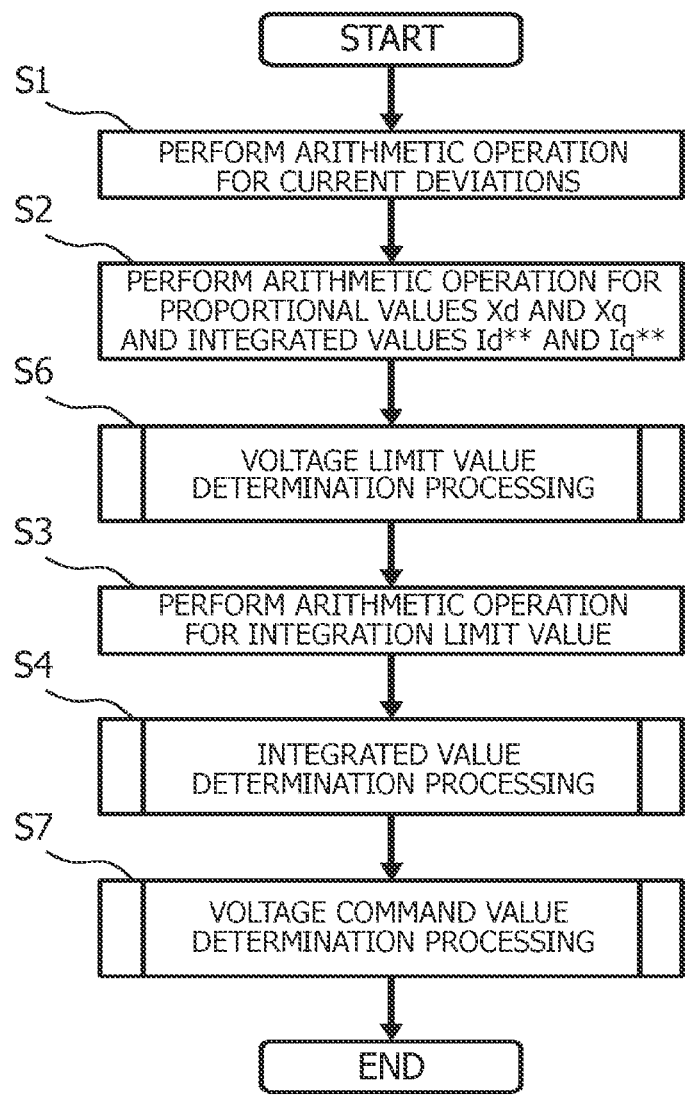
FIG. 26 is a flowchart illustrating an example of vector control processing according to a fourth embodiment.

The vector control processing according to the fourth embodiment is different from the vector control processing illustrated in FIG. 9 in the following points. As illustrated in FIG. 26, voltage limit value determination processing in Step 6 is newly inserted between Step 2 and Step 3, and Step 5 is changed to voltage command value determination processing in Step 7.

Figure 27:
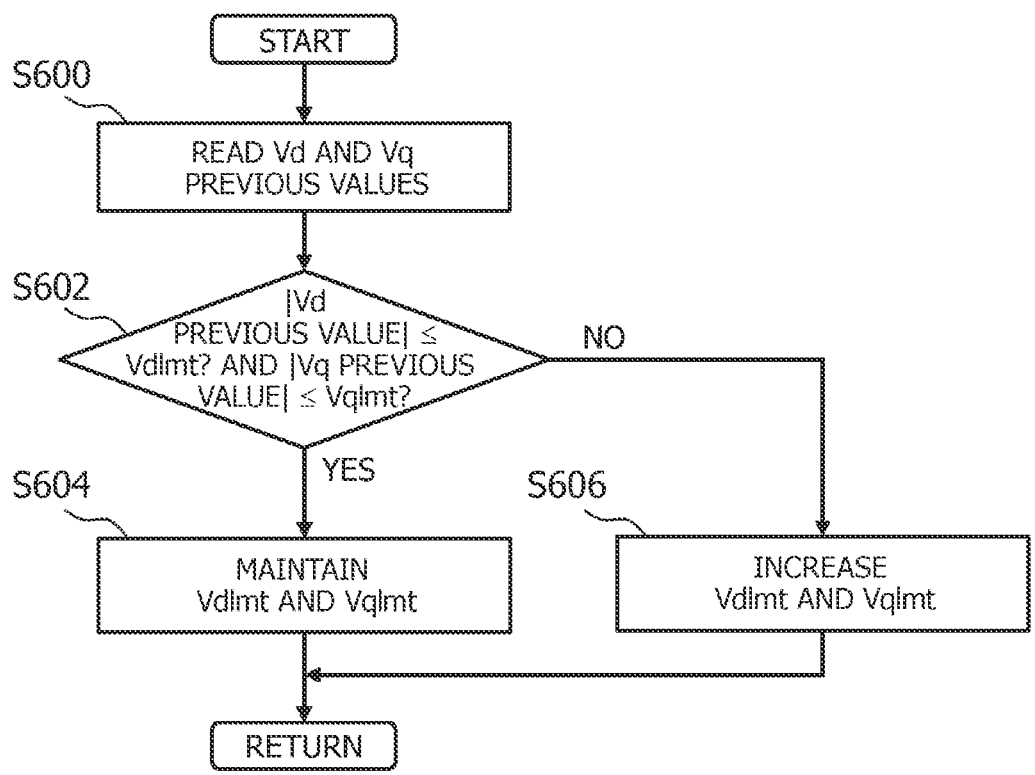
FIG. 27 is a flowchart illustrating an example of voltage limit value determination processing according to the fourth embodiment.

Processor 80A ends the processing in Step 2 and then executes the voltage limit value determination processing illustrated in FIG. 27 in Step 6.

In Step 600, processor 80A reads the d and q-axis voltage command values $V_d$ and $V_q$ obtained through the arithmetic operation and stored in Step 7, which will be described later, that is, the $V_d$ previous value and the $V_q$ previous value determined in the voltage command value determination processing in the previous vector control processing.

In Step 602, processor 80A determines whether or not the absolute value of the $V_d$ previous value (|$V_d$ previous value|) is equal to or less than the d-axis voltage limit value $V_{dlmt}$ and the absolute value of the $V_q$ previous value (|$V_q$ previous value|) is equal to or less than the q-axis voltage limit value $V_{qlmt}$. Note that in the first vector control processing, $V_{dlmt}$ and $V_{qlmt}$ in Step 602 are set to the first limit value (Ed/2, for example). Also, in the first vector control processing, the $V_d$ previous value and the $V_q$ previous value have not been determined, and the $V_d$ previous value and the $V_q$ previous value are thus set to an initial value (zero, for example).

If processor 80A determines that |$V_d$ previous value| is equal to or less than $V_{dlmt}$ and |$V_q$ previous value| is equal to or less than $V_{qlmt}$ in Step 602, processor 80A advances the processing to Step 604. In Step 604, processor 80A maintains $V_{dlmt}$ and $V_{qlmt}$ as they are and returns the processing to Step 3. In other words, $V_{dlmt}$ and $V_{qlmt}$ are not changed in Step 604.

On the other hand, when |$V_d$ previous value| exceeds $V_{dlmt}$ or |$V_q$ previous value| exceeds $V_{qlmt}$ in Step 602, processor 80A determines that a voltage saturation state has occurred in the previous vector control processing and advances the processing to Step 606.

In Step 606, processor 80A causes $V_{dlmt}$ and $V_{qlmt}$ used in Step 602 and Step 7, which will be described later, to increase by the second predetermined value in accordance with FIG. 22 or 23 and returns the processing to Step 3. When $V_{dlmt}$ and $V_{qlmt}$ are caused to increase in Step 606, $V_{dlmt}$ and $V_{qlmt}$ used in the following processing are $V_{dlmt}$ and $V_{qlmt}$ that have been caused to increase.

In Step 3, processor 80A performs an arithmetic operation for present values of the d and q-axis integration upper and lower limit values $I_{dmax}$, $I_{qmax}$, $I_{dmin}$, and $I_{qmin}$ using $V_{dlmt}$, $V_{dlmt}$, and the like maintained or changed in Step 6.

Figure 28:
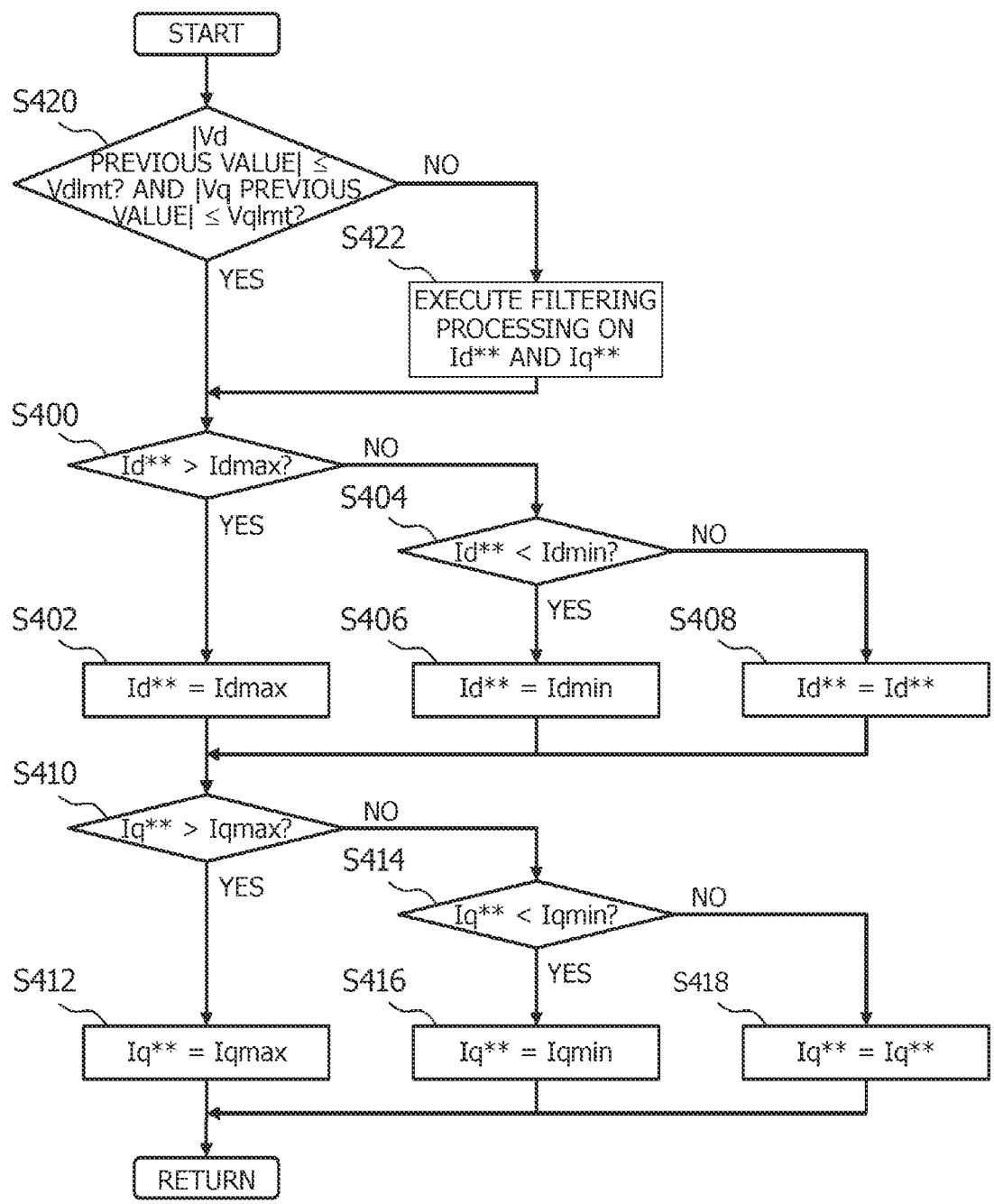
FIG. 28 is a flowchart illustrating an example of integrated value determination processing according to the fourth embodiment.

In Step 4, processor 80A executes integrated value determination processing illustrated in FIG. 28. The integrated value determination processing is different from the integrated value determination processing illustrated in FIG. 10 in that Steps 420 and 422 are inserted before Step 400.

In Step 420, processor 80A executes determination similar to that in Step 602 to determine whether or not to execute the aforementioned filtering processing performed by LPF processing unit 606E (608E). Here, $V_{dlmt}$ and $V_{qlmt}$ used in Step 420 are $V_{dlmt}$ and $V_{qlmt}$ used in Step 602 regardless of whether $V_{dlmt}$ and $V_{qlmt}$ have been maintained or changed in Step 6. In other words, in Step 420, processor 80A compares each of |$V_d$ previous value| and |$V_q$ previous value| with each of $V_{dlmt}$ and $V_{qlmt}$ used in Step 602.

In Step 420, processor 80A determines that the voltage saturation state has occurred when |$V_d$ previous value| exceeds $V_{dlmt}$ or |$V_q$ previous value| exceeds $V_{qlmt}$ and advances the processing to Step 422.

In Step 422, processor 80A executes the aforementioned filtering processing performed by LPF processing units 606E and 608E on the d and q-axis integrated values $I_d^{}$ and $I_q^{}$ obtained through the arithmetic operation in Step 2 and advances the processing to Step 400. Therefore, in the processing in and after Step 400, $I_d^{}$ ($I_q^{}$) on which the filtering processing has been performed is compared with the d(q)-axis integration upper limit value $I_{dmax}$ ($I_{qmax}$) and the d(q)-axis integration lower limit value $I_{dmin}$ ($I_{min}$), and the d(q)-axis integrated value is thereby determined.

On the other hand, when |$V_d$ previous value| is equal to or less than $V_{dlmt}$ and |$V_q$ previous value| is equal to or less than $V_{qlmt}$ in Step 420, processor 80A advances the processing to Step 400 without executing the filtering processing. In this case, in the processing in and after Step 400, the d and q-axis integrated values $I_d^{}$ and $I_q^{}$ obtained in the arithmetic operation in Step 2 are compared with the d(q)-axis integration upper limit value $I_{dmax}$ ($I_{qmax}$) and the d(q)-axis integration lower limit value $I_{dmin}$ ($I_{qmin}$), and the d(q)-axis integrated value is thereby determined.

Thereafter, processor 80A determines the q-axis integrated value in Step 412, 416 or 418 and then returns the processing to Step 7.

Figure 29:
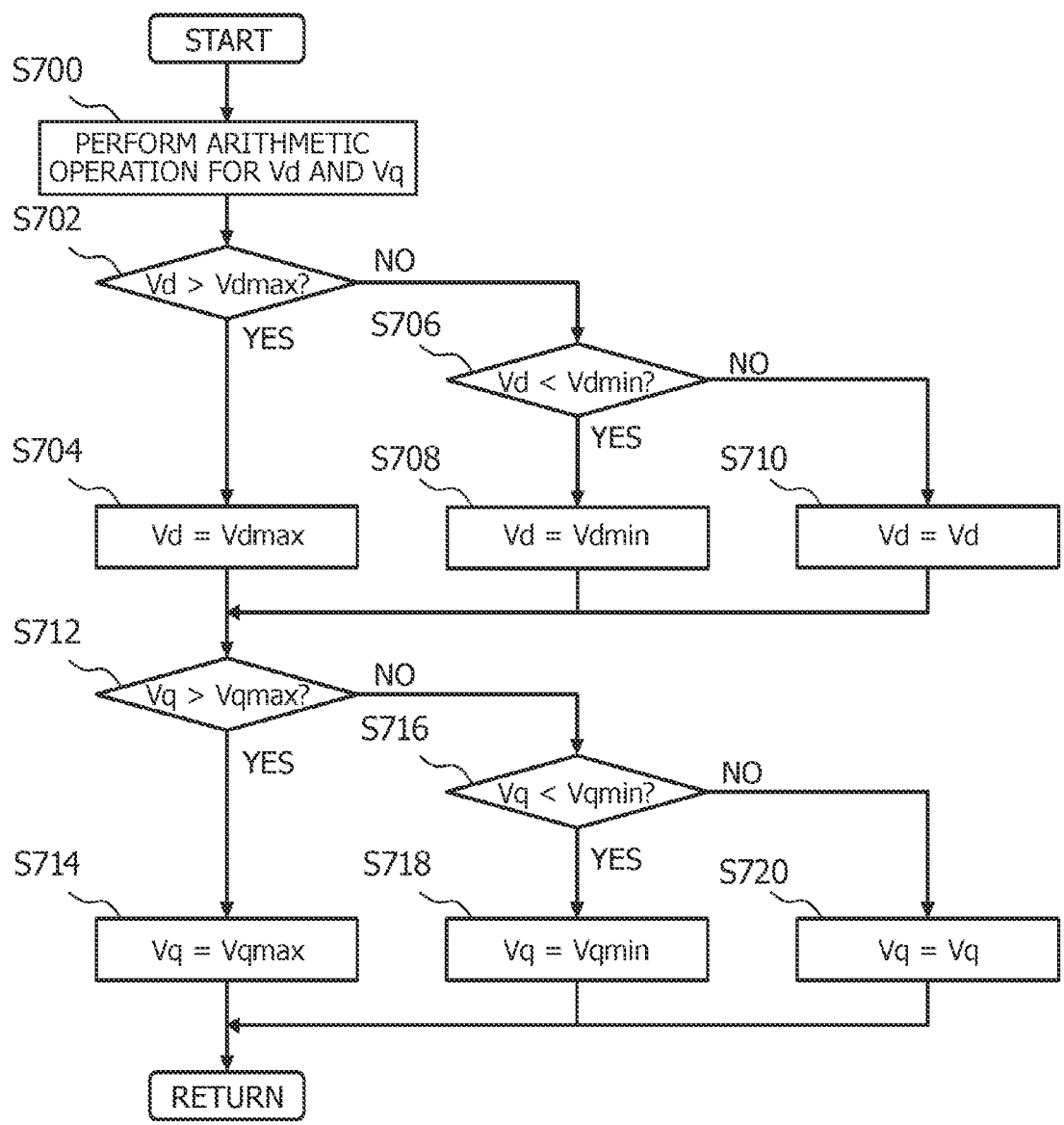
FIG. 29 is a flowchart illustrating an example of voltage command value determination processing according to the fourth embodiment.

In Step 7, processor 80A executes the voltage command value determination processing illustrated in FIG. 29.

Figure 9:
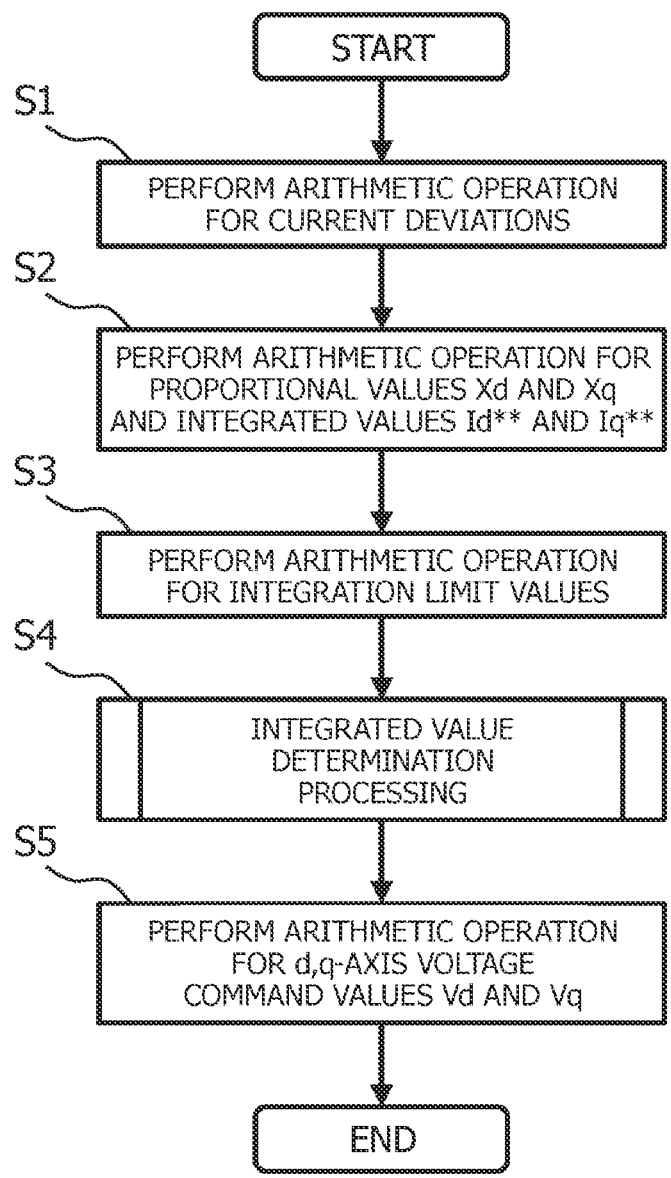
FIG. 9 is a flowchart illustrating an example of vector control processing according to the first embodiment.

In Step 700, processor 80A performs an arithmetic operation for the present values $V_{d,t}$ and $V_{q,t}$ of the d and q-axis voltage command values similarly to Step 5 illustrated in FIG. 9. Note that in the fourth embodiment, the filtering processing may be executed on the d and q-axis integrated values $I_d^{}$ and $I_q^{}$ in Step 422. In this case, $I_d^{}$ and $I_q^{}$ on which the filtering processing has been performed are used to perform the arithmetic operation for $V_{d,t}$ and $V_{q,t}$.

In Step 702, processor 80A determines whether or not $V_{d,t}$ obtained through the arithmetic operation in Step 700 has exceeded the d-axis voltage upper limit value $V_{dmax}$ ($=+V_{dlmt}$). As described above, $V_{dlmt}$ and $V_{qlmt}$ maintained or changed in Step 6 are used as $V_{dlmt}$ and $V_{qlmt}$ in Step 7. Therefore, in a case in which $V_{dlmt}$ has been changed in Step 6, whether or not $V_{d,t}$ has exceeded $V_{dmax}$ after the change, that is, $V_{dmax}$ that has been caused to increase in accordance with FIG. 22 or 23 is determined in Step 702.

If processor 80A determines that $V_{d,t}$ has exceeded $V_{dmax}$ in Step 702, then processor 80A advances the processing to Step 704.

In Step 704, processor 80A limits the present value of the d-axis voltage command value that is to be finally output to $V_{dmax}$ ($V_d=V_{dmax}$). Therefore, since the voltage saturation state in which the d-axis voltage command value is saturated at $V_{dmax}$ after the increase occurs, the wind-up phenomenon continues.

On the other hand, if processor 80A determines that $V_{d,t}$ is equal to or less than $V_{dmax}$ in Step 702, processor 80A advances the processing to Step 706.

In Step 706, processor 80A determines whether or not $V_{d,t}$ is less than the d-axis voltage lower limit value $V_{dmin}$ ($=-V_{dlmt}$). As described above, in the case in which $V_{dlmt}$ has been changed in Step 6, the d-axis voltage lower limit value $V_{dmin}$ decreases. If processor 80A determines that $V_{d,t}$ is less than $V_{dmin}$, then processor 80A advances the processing to Step 708.

In Step 708, processor 80A limits the present value of the d-axis voltage command value to be finally output to $V_{dmin}$ ($V_d=V_{dmin}$) Therefore, since the voltage saturation state in which the d-axis voltage command value is saturated at $V_{dmin}$ after the decrease occurs, the wind-up phenomenon continues.

On the other hand, if processor 80A determines that $V_{d,t}$ is equal to or greater than $V_{dmin}$ in Step 706, processor 80A advances the processing to Step 710.

In Step 710, processor 80A outputs $V_d$ obtained through the arithmetic operation in Step 700 as it is ($V_d=V_d$). In other words, $V_d$ that is equal to or less than $V_{dmax}$ maintained or changed in Step 6 and that is equal to or greater than $V_{dmin}$ maintained or changed in Step 6 is output in the present vector control. Therefore, the voltage saturation state does not occur.

The processing in Steps 712 to 720 are processing for determining the final q-axis voltage command value $V_{q,t}$ similarly to Steps 702 to 710, and description thereof will be omitted. Processor 80A determines $V_{q,t}$ in Step 714, 718, or 720 and then causes the vector control processing to end. Thereafter, processor 80A generates PWM pulses for driving switching elements 70A to 70F on the basis of the d and q-axis voltage command values $V_{d,t}$ and $V_{q,t}$ determined in Step 7 as described above. In this manner, the voltage is applied via inverter 70, and motor 60 is thereby driven.

Note that the fourth embodiment in the case in which LPF processing unit 606E (608E) is provided between integral operation unit 606A (608A) and integration limiting unit 606D (608D) has been described above. In a case in which LPF processing unit 606E (608E) is present between limit value arithmetic operation unit 606C (608C) and integration limiting unit 606D (608D), the processing in Step 422 illustrated in FIG. 28 is changed to processing of performing the filtering processing on the d(q)-axis integration upper and lower limit values $I_{dmax}$ ($I_{qmax}$) and $I_{dmin}$ ($I_{qmin}$). It is thus possible to combine the first modification example of the second embodiment with the third embodiment.

Also, in a case in which LPF processing unit 606E (608E) is present on the downstream side beyond integration limiting unit 606D (608D), Steps 420 and 422 on the upstream side beyond Step 400 illustrated in FIG. 28 are moved to the downstream side beyond Steps 412, 416, and 418. It is thus possible to combine the second modification example of the second embodiment with the third embodiment. In this case, the processing in Step 422 is changed to processing for performing the filtering processing on the d(q)-axis integrated value finally determined. In other words, the filtering processing is performed on the d(q)-axis integrated value obtained by integration limiting unit 606D (608D) through the arithmetic operation (the d(q)-axis integrated value before the limiting) or the d(q)-axis integrated value limited within the predetermined range (the d(q)-axis integrated value after the limiting).

However, the invention is not limited to the execution of only one kind of the filtering processing described in the second embodiment. In other words, the filtering processing may be performed on the d(q)-axis integrated value before the limiting and the d(q)-axis integration upper and lower limit values or the d(q)-axis integrated value after the limiting. Also, the filtering processing may be performed on the d(q)-axis integration upper and lower limit values and the d(q)-axis integrated value after the limiting. Moreover, the filtering processing may be performed on all of the d(q)-axis integrated value before the limiting, the d(q)-axis integration upper and lower limit values, and the d(q)-axis integrated value after the limiting.

In addition, it is also possible to combine the third modification example of the second embodiment with the third embodiment. Therefore, the processing in Steps 420 and 422 illustrated in FIG. 28 is deleted, and the processing in Step 3 illustrated in FIG. 26 is changed to processing of adding the first predetermined value α to the d(q)-axis integration upper limit values $I_{dmax}$ ($I_{qmax}$) obtained through the arithmetic operation and subtracting the first predetermined value α from the d(q)-axis integration lower limit values $I_{dmin}$ and $I_{qmin}$ obtained through the arithmetic operation, in addition to the arithmetic operation for $I_{dmax}$ ($I_{qmax}$) and $I_{dmin}$ ($I_{qmin}$).

According to controller 80 in the fourth embodiment described above, the d and q-axis voltage command values $V_d$ and $V_q$ gradually enter the overmodulation region while being limited similarly to the third embodiment. Also, it is possible to temporally delay the execution of the overmodulation control and the occurrence of the wind-up phenomenon in the overmodulation control. Therefore, further distortion of the waveforms of phase currents Iu, Iv, and Iw is curbed, and distortion of the waveforms of the d and q-axis current detection values $I_d$ and $I_q$ can be curbed.

Also, $V_{dlmt}$ ($V_{qlmt}$) after the change is used to perform the arithmetic operation for the d(q)-axis integration upper and lower limit values $I_{dmax}$ ($I_{qmax}$) and $I_{dmin}$ ($I_{qmin}$) in the fourth embodiment as well as described above in the third embodiment. Therefore, it is also possible to curb an excessive change in d(q)-axis integrated value when the d(q)-axis voltage command value $V_d$ ($V_q$) increases while being saturated. Moreover, according to the fourth embodiment, the filtering processing or the predetermined range enlarging processing is performed when the voltage saturation state that accompanies the change in d(q)-axis voltage limit values $V_{dlmt}$ and $V_{qlmt}$ along time occurs. Therefore, it is possible to further improve the effect of curbing distortion of the waveforms of the d and q-axis current detection values $I_d$ and $I_q$ in the fourth embodiment.

Moreover, although each of the above embodiments has been described on the assumption that controller 80 executes proportional integral control on the d and q-axis current deviation, the present invention is not limited thereto. For example, controller 80 may be configured to execute derivative control (that is, PID control) in addition to the proportional integral control.

Note that those skilled in the art will be able to easily understand that new embodiments can be created by omitting, combining, or replacing some of a variety of technical ideas of the above embodiments.

REFERENCE SYMBOL LIST

46 VCR controller (motor control device)
60 Motor (three-phase brushless motor)
70 Inverter (power converter)
80 Controller
600 Vector control unit
602 d-axis current deviation arithmetic operation unit
604 q-axis current deviation arithmetic operation unit
606 second d-axis current arithmetic operation unit
608 second q-axis current arithmetic operation unit
606A (608A) Integral operation unit
606C (608C) Limit value arithmetic operation unit
606D (608D) Integration limiting unit
606E (608E) LPF processing unit
616 d-axis voltage arithmetic operation unit
618 q-axis voltage arithmetic operation unit
620 Voltage limiting unit

The invention claimed is:

1. A motor control device comprising:
a power converter that converts DC into AC and supplies the AC to a three-phase brushless motor; and
a controller that performs an arithmetic operation for voltage command values of d and q axes of the three-phase brushless motor through feedback control including integral control performed on current deviations between current detection values and current command values of the d and q axes and controls the power converter on the basis of the voltage command values, wherein
the controller limits an integrated value in the integral control within a predetermined range, and
the controller performs an arithmetic operation for the predetermined range in accordance with the current deviation, the integrated value, an electric motor constant of the three-phase brushless motor, an angular speed detection value of the three-phase brushless motor, control response angular frequencies of the d and q axes, and voltage upper limit values and voltage lower limit values of the d and q axes set on the basis of a power source voltage of the power converter.

2. The motor control device according to claim 1, wherein in a case in which the controller is configured to be able to execute overmodulation control for the power converter on the basis of the voltage command values obtained through the arithmetic operation when the voltage command values fall within an overmodulation control region, the controller executes filtering processing for smoothing a temporal change in the integrated value.

3. The motor control device according to claim 1, wherein in a case in which the controller is configured to be able to execute overmodulation control for the power converter on the basis of the voltage command values obtained through the arithmetic operation when the voltage command values fall within an overmodulation control region, the controller executes filtering processing for smoothing temporal changes in integration upper and lower limit values defining the predetermined range.

4. The motor control device according to claim 1, wherein in a case in which the controller is configured to be able to execute overmodulation control for the power converter on the basis of the voltage command values obtained through the arithmetic operation when the voltage command values fall within an overmodulation control region, the controller executes filtering processing for smoothing a temporal change in the integrated value limited within the predetermined range.

5. The motor control device according to claim 1, wherein in a case in which the controller is configured to be able to execute overmodulation control for the power converter on the basis of the voltage command values obtained through the arithmetic operation when the voltage command values fall within an overmodulation control region, the controller
controls the power converter on the basis of the voltage upper limit values when the voltage command values obtained through the arithmetic operations exceed the voltage upper limit values, and controls the power converter on the basis of the voltage lower limit values when the voltage command values obtained through the arithmetic operation are below the voltage lower limit values, and
corrects the predetermined range obtained through the arithmetic operation to be widened in consideration of differences between the voltage upper limit values or the voltage lower limit values and the voltage command values obtained through the arithmetic operation.

6. The motor control device according to claim 1,
wherein in a case in which the controller is configured to be able to execute overmodulation control for the power converter on the basis of the voltage command values obtained through the arithmetic operation when the voltage command values fall within an overmodulation control region, the controller
causes absolute values of the voltage upper limit values and the voltage lower limit values to increase by a predetermined value toward a second limit value that is an upper limit value of the overmodulation control region with a first limit value which is smaller than a lower limit value of the overmodulation control region defined as an initial value every time the voltage command values obtained through the arithmetic operation exceed the voltage upper limit values or every time the voltage command values obtained through the arithmetic operation are below the voltage lower limit values, and
controls the power converter on the basis of the voltage upper limit values when the voltage command values obtained through the arithmetic operation exceed the voltage upper limit values and controls the power converter on the basis of the voltage lower limit values when the voltage command values obtained through the arithmetic operation are below the voltage lower limit values.

7. A motor control method comprising, by a controller that performs an arithmetic operation for voltage command values of d and q axes of a three-phase brushless motor through feedback control including integral control performed on current deviations between current detection values and current command values of the d and q axes and controls, on the basis of the voltage command values, a power converter that converts DC into AC and supplies the AC to the three-phase brushless motor;

limiting an integrated value in the integral control within a predetermined range when the arithmetic operation for the voltage command values is performed, wherein the controller performs an arithmetic operation for the predetermined range in accordance with the current deviation, the integrated value, an electric motor constant of the three-phase brushless motor, an angular speed detection value of the three-phase brushless motor, control response angular frequencies of the d and q axes, and voltage upper limit values and voltage lower limit values of the d and q axes set on the basis of a power source voltage of the power converter.

8. The motor control method according to claim 7, wherein in a case in which the controller is configured to be able to execute overmodulation control for the power converter on the basis of the voltage command values obtained through the arithmetic operation when the voltage command values fall within an overmodulation control region, the controller executes filtering processing for smoothing a temporal change in the integrated value.

9. The motor control method according to claim 7, wherein in a case in which the controller is configured to be able to execute overmodulation control for the power converter on the basis of the voltage command values obtained through the arithmetic operation when the voltage command values fall within an overmodulation control region, the controller executes filtering processing for smoothing temporal changes in integration upper and lower limit values defining the predetermined range.

10. The motor control method according to claim 7, wherein in a case in which the controller is configured to be able to execute overmodulation control for the power converter on the basis of the voltage command values obtained through the arithmetic operation when the voltage command values fall within an overmodulation control region, the controller executes filtering processing for smoothing a temporal change in the integrated value limited within the predetermined range.

11. The motor control method according to claim 7, wherein in a case in which the controller is configured to be able to execute overmodulation control for the power converter on the basis of the voltage command values obtained through the arithmetic operation when the voltage command values fall within an overmodulation control region, the controller controls the power converter on the basis of the voltage upper limit values when the voltage command values obtained through the arithmetic operations exceed the voltage upper limit values, and controls the power converter on the basis of the voltage lower limit values when the voltage command values obtained through the arithmetic operation are below the voltage lower limit values, and corrects the predetermined range obtained through the arithmetic operation to be widened in consideration of differences between the voltage upper limit values or the voltage lower limit values and the voltage command values obtained through the arithmetic operation.

12. The motor control method according to claim 7, wherein in a case in which the controller is configured to be able to execute overmodulation control for the power converter on the basis of the voltage command values obtained through the arithmetic operation when the voltage command values fall within an overmodulation control region, the controller causes absolute values of the voltage upper limit values and the voltage lower limit values to increase by a predetermined value toward a second limit value that is an upper limit value of the overmodulation control region with a first limit value which is smaller than a lower limit value of the overmodulation control region defined as an initial value every time the voltage command values obtained through the arithmetic operation exceed the voltage upper limit values or every time the voltage command values obtained through the arithmetic operation are below the voltage lower limit values, and controls the power converter on the basis of the voltage upper limit values when the voltage command values obtained through the arithmetic operation exceed the voltage upper limit values and controls the power converter on the basis of the voltage lower limit values when the voltage command values obtained through the arithmetic operation are below the voltage lower limit values.

* * * * *